US012639217B2

(12) United States Patent
Kanno et al.

(10) Patent No.: US 12,639,217 B2
(45) Date of Patent: May 26, 2026

(54) MEMORY SYSTEM

(71) Applicant: Kioxia Corporation, Tokyo (JP)

(72) Inventors: Shinichi Kanno, Tokyo (JP); Yuki Sasaki, Kamakura (JP); Kensaku Yamaguchi, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/821,905

(22) Filed: Aug. 30, 2024

(65) Prior Publication Data

US 2025/0094345 A1 Mar. 20, 2025

(30) Foreign Application Priority Data

Sep. 14, 2023 (JP) ................................. 2023-149121

(51) Int. Cl.
*G06F 12/02* (2006.01)

(52) U.S. Cl.
CPC ...... *G06F 12/0292* (2013.01); *G06F 12/0246* (2013.01)

(58) Field of Classification Search
CPC ............. G06F 12/0292; G06F 12/0246; G06F 11/1441; G06F 11/1446; G06F 2212/1008; G06F 2212/1024; G06F 2212/1032; G06F 2212/7208; G06F 2212/7201; G06F 2212/7204; G06F 2212/7205; G06F 3/065
USPC ....................................................... 711/206
See application file for complete search history.

(56) References Cited

U.S. PATENT DOCUMENTS

| | | | |
|---|---|---|---|
| 9,946,489 B2 | 4/2018 | Dreyer | |
| 10,496,533 B1 | 12/2019 | Bahirat | |
| 10,713,157 B2 | 7/2020 | Widder | |
| 10,776,153 B2 | 9/2020 | Kanno | |
| 10,990,526 B1 | 4/2021 | Lam | |
| 11,237,959 B2 | 2/2022 | Helmick | |
| 2017/0322888 A1* | 11/2017 | Booth ................. | G06F 12/1009 |
| 2019/0026224 A1* | 1/2019 | Koo ...................... | G06F 9/4406 |
| 2021/0073139 A1* | 3/2021 | Sheridan ............. | G06F 12/0646 |
| 2023/0065617 A1* | 3/2023 | Guan .................. | G06F 12/1009 |

* cited by examiner

*Primary Examiner* — Jared I Rutz
*Assistant Examiner* — Wei Ma
(74) *Attorney, Agent, or Firm* — Kim & Stewart LLP

(57) ABSTRACT

A memory system includes a non-volatile memory and a controller that is configured to: write N pieces of address translation information repeatedly in a first block according to a first order; write the N pieces of address translation information repeatedly in a second block of the non-volatile memory according to a second order that is offset from the first order by N/2; write an update log in the first and second blocks each time one of the N pieces is written; and in response to power to the memory system being restored after shutdown, read from the first block, N/2 pieces of address translation information and N/2 update logs last written thereinto, read from the second block, N/2 pieces of address translation information and N/2 update logs last written thereinto, and reconstruct a logical-to-physical address translation table from the information read from the non-volatile memory.

20 Claims, 26 Drawing Sheets

UPDATE LOG +x

| LOG #0 | LOG #1 | LOG #2 | LOG #3 | . . . | LOG #m |
|--------|--------|--------|--------|-------|--------|

| IDENTIFIER | LBA (LOWER BIT PORTION ONLY) | PBA |
|------------|------------------------------|-----|

*FIG. 12*

UPDATE LOG +x

| LOG #0 | LOG #1 | LOG #2 | LOG #3 | ... | LOG #m |
|---|---|---|---|---|---|

| IDENTIFIER | LBA (LOWER BIT PORTION ONLY) | NEW PBA | LENGTH (THE NUMBER OF SECTORS, FOR EXAMPLE) | OLD PBA |
|---|---|---|---|---|

| | PRIMARY L2P FLASH BLOCK (Primary L2P FB) | |
|---|---|---|
| P0 | L2P FRAGMENT #0 | UPDATE LOG +0 |
| P1 | L2P FRAGMENT #1 | UPDATE LOG +1 |
| P2 | L2P FRAGMENT #2 | UPDATE LOG +2 |
| P3 | L2P FRAGMENT #3 | UPDATE LOG +3 |
| P4 | L2P FRAGMENT #0 | UPDATE LOG +4 |
| P5 | L2P FRAGMENT #1 | UPDATE LOG +5 |
| P6 | L2P FRAGMENT #2 | UPDATE LOG +6 |
| P7 | L2P FRAGMENT #3 | UPDATE LOG +7 |

FIG. 14B 62-01

| | SECONDARY L2P FLASH BLOCK (Secondary L2P FB) | | |
|---|---|---|---|
| P0 | L2P FRAGMENT #0 | L2P FRAGMENT #1 | L2P FRAGMENT #2 |
| P1 | L2P FRAGMENT #3 | UPDATE LOG +1 | |
| P2 | L2P FRAGMENT #0 | UPDATE LOG +2 | |
| P3 | L2P FRAGMENT #1 | UPDATE LOG +3 | |
| P4 | L2P FRAGMENT #2 | UPDATE LOG +4 | |
| P5 | L2P FRAGMENT #3 | UPDATE LOG +5 | |
| P6 | L2P FRAGMENT #0 | UPDATE LOG +6 | |
| P7 | L2P FRAGMENT #1 | UPDATE LOG +7 | |

PRIMARY L2P FLASH BLOCK (Primary L2P FB)

| | | |
|---|---|---|
| P0 | L2P FRAGMENT #0 | UPDATE LOG +0 |
| P1 | L2P FRAGMENT #1 | UPDATE LOG +1 |
| P2 | L2P FRAGMENT #2 | UPDATE LOG +2 |
| P3 | L2P FRAGMENT #3 | UPDATE LOG +3 |
| P4 | L2P FRAGMENT #0 | UPDATE LOG +4 |
| P5 | L2P FRAGMENT #1 | UPDATE LOG +5 |
| P6 | L2P FRAGMENT #2 | UPDATE LOG +6 |
| P7 | L2P FRAGMENT #3 | UPDATE LOG +7 |
| P8 | LOST LBA LIST | |

SECONDARY L2P FLASH BLOCK (Secondary L2P FB)

| | | | |
|---|---|---|---|
| P0 | L2P FRAGMENT #0 | L2P FRAGMENT #1 | L2P FRAGMENT #2 |
| P1 | L2P FRAGMENT #3 | UPDATE LOG +1 | |
| P2 | L2P FRAGMENT #0 | UPDATE LOG +2 | |
| P3 | L2P FRAGMENT #1 | UPDATE LOG +3 | |
| P4 | L2P FRAGMENT #2 | UPDATE LOG +4 | |
| P5 | L2P FRAGMENT #3 | UPDATE LOG +5 | |
| P6 | L2P FRAGMENT #0 | UPDATE LOG +6 | |
| P7 | L2P FRAGMENT #1 | UPDATE LOG +7 | |
| P8 | LOST LBA LIST | | |

Figure 27:
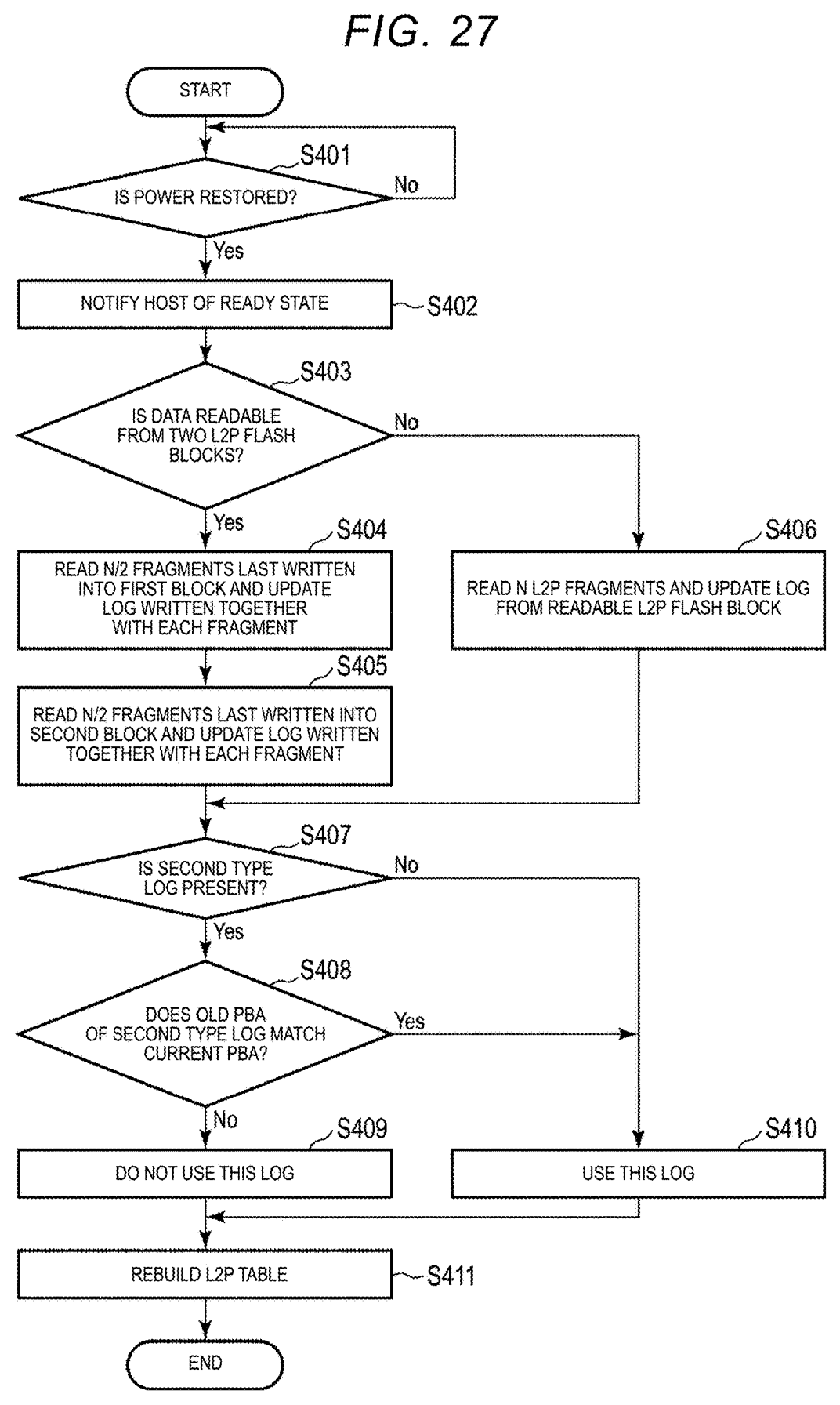

START

S401
IS POWER RESTORED? — No

↓ Yes

NOTIFY HOST OF READY STATE — S402

S403
IS DATA READABLE FROM TWO L2P FLASH BLOCKS? — No

↓ Yes

S404
READ N/2 FRAGMENTS LAST WRITTEN INTO FIRST BLOCK AND UPDATE LOG WRITTEN TOGETHER WITH EACH FRAGMENT

S406
READ N L2P FRAGMENTS AND UPDATE LOG FROM READABLE L2P FLASH BLOCK

S405
READ N/2 FRAGMENTS LAST WRITTEN INTO SECOND BLOCK AND UPDATE LOG WRITTEN TOGETHER WITH EACH FRAGMENT

S407
IS SECOND TYPE LOG PRESENT? — No

↓ Yes

S408
DOES OLD PBA OF SECOND TYPE LOG MATCH CURRENT PBA? — Yes

↓ No

S409
DO NOT USE THIS LOG

S410
USE THIS LOG

REBUILD L2P TABLE — S411

END

MEMORY SYSTEM

CROSS-REFERENCE TO RELATED APPLICATION(S)

This application is based upon and claims the benefit of priority from Japanese Patent Application No. 2023-149121, filed Sep. 14, 2023, the entire contents of which are incorporated herein by reference.

FIELD

Embodiments described herein relate generally to a memory system.

BACKGROUND

A solid state drive (SSD) including a non-volatile memory and a controller that controls the non-volatile memory is known as a memory system that has been widely used in recent years.

In a memory system such as an SSD, a correspondence relationship between a logical address associated with data received from an external device and a physical address in a non-volatile memory in which the data is stored is managed using a logical-to-physical address translation table (L2P table).

The L2P table is stored in a volatile memory such as a RAM provided in the memory system. The L2P table is updated by performing, for example, writing of data to the non-volatile memory executed based on a write command from a host, data copying process for garbage collection (that is, compaction) performed on the non-volatile memory, or the like.

When the power supply to the memory system is cut off, the information stored in the volatile memory is lost. Therefore, in the memory system, a process to save the backup data of the L2P table in the non-volatile memory, a process to reconstruct the L2P table in the volatile memory in response to the recovery of the power of the memory system, and the like are executed.

Even if the power to the memory system is restored, the host cannot access the memory system until the reconstruction of the L2P table is completed. In addition, when the L2P table cannot be correctly reconstructed, the latest data corresponding to the logical address of the read target designated by the read command from the host cannot be correctly read from the non-volatile memory.

Therefore, in a memory system, a technique for improving the performance related to the reconstruction of the L2P table is desirable.

DESCRIPTION OF THE DRAWINGS

FIG. 1 is a block diagram illustrating a configuration example of an information processing system including a memory system according to an embodiment.

FIG. 10 is a diagram illustrating a first example of an update log in the memory system according to the embodiment.

FIG. 12 is a diagram illustrating a third example of the update log in the memory system according to the embodiment.

FIG. 13 is a diagram illustrating a first example of lost LBA list saving processing of the memory system according to the embodiment.

FIGS. 14A and 14B are diagrams illustrating a first configuration example of duplicating backup data of the L2P table used in the memory system according to the embodiment.

FIGS. 15A and 15B are diagrams illustrating a second configuration example of duplicating backup data of the L2P table used in the memory system according to the embodiment.

FIG. 18 is a diagram illustrating a second example of address translation information/update log saving processing of the memory system according to the embodiment.

FIG. 19 is a diagram illustrating a second example of the L2P table rebuild processing of the memory system according to the embodiment.

FIG. 20 is a diagram illustrating a third example of the L2P table rebuild processing of the memory system according to the embodiment.

FIG. 27 is a flowchart showing another procedure of the L2P table rebuild processing of the memory system according to the embodiment.

DETAILED DESCRIPTION

Figure 2:
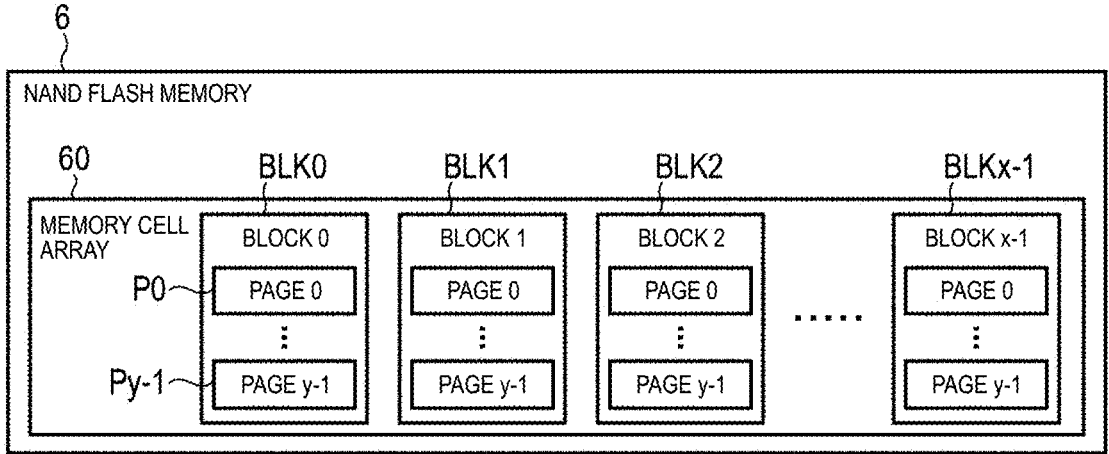
FIG. 2 is a block diagram illustrating an example of an internal configuration of a non-volatile memory provided in the memory system according to the embodiment.

Embodiments provide a memory system capable of improving performance related to reconstruction of a logical-to-physical address translation table.

In general, according to one embodiment, a memory system that is connectable to a host includes a non-volatile memory including a plurality of blocks, a volatile memory, and a controller. The controller manages a correspondence relationship between each of logical addresses included in a logical address space of the memory system and each of physical addresses of the non-volatile memory using a logical-to-physical address translation table stored in the volatile memory. The logical-to-physical address translation table includes at least a first table area. The first table area stores N pieces of address translation information respectively corresponding to N logical address ranges. The N is an integer multiple of 2. The controller is configured to: write the N pieces of address translation information, including first to (N)th pieces, repeatedly in a first block of the non-volatile memory according to a first order, so that the first, second, . . . , (N)th pieces are written in this order repeatedly in the first block; write the N pieces of address translation information repeatedly in a second block of the non-volatile memory according to a second order that is offset from the first order by N/2, so that (1+N/2)th, (2+N/2)th, . . . , (N)th, first, second, . . . , (N/2)th pieces are written in this order repeatedly in the second block, at the same time respective first, second, . . . , (N)th pieces are written in this order repeatedly into the first block; write an update log in the first block each time one of the N pieces is written in the first block, and in the second block each time one of the N pieces is written in the second block, wherein the update log contains all updates to the N pieces of address translation information since the last time the update log was written in the first block and the second block; and in response to power to the memory system being restored after the memory system is shutdown, read from the first block, N/2 pieces of address translation information last written into the first block and N/2 update logs last written into the first block, read from the second block, N/2 pieces of address translation information last written into the second block and N/2 update logs last written into the second block, and reconstruct the first table area of the logical-to-physical address translation table in the volatile memory from the N/2 pieces of address translation information read from the first block, the N/2 pieces of address translation information read from the second block, and the N/2 update logs read from either the first block or the second block.

Hereinafter, embodiments will be described with reference to the drawings.

Figure 1:
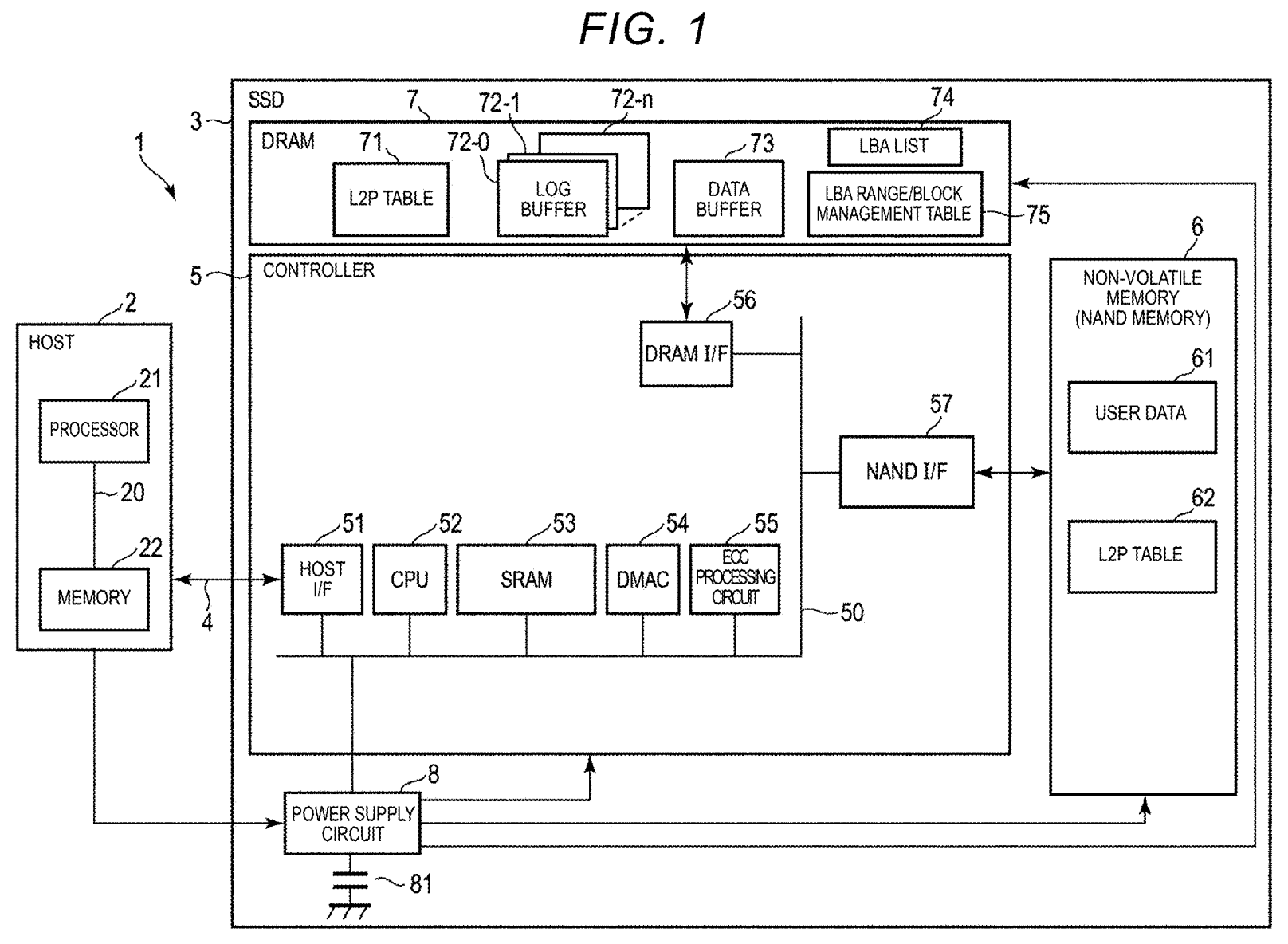

First, a configuration of an information processing system including a memory system according to the embodiment will be described. FIG. 1 is a block diagram illustrating a configuration example of an information processing system including a memory system and a host according to the embodiment. An information processing system 1 includes a host (host device) 2 and a solid state drive (SSD) 3 as a memory system.

The host 2 is an information processing device such as a personal computer, a server computer, or a mobile device. The host 2 is connected to the SSD 3 and is capable of accessing the SSD 3. Specifically, the host 2 issues a write command for writing data to the SSD 3. The host 2 also issues a read command for reading data from the SSD 3.

The SSD 3 is also called a storage device, and data can be written to an internal non-volatile memory and data can be read from the internal non-volatile memory.

Communication between the SSD 3 and the host 2 is executed via the bus 4. The bus 4 is a transmission path that connects the host 2 and the SSD 3. The bus 4 is, for example, a PCI Express™ (PCIe™) bus. The bus 4 is a full-duplex transmission path. The full-duplex transmission path includes both a transmission path for transmitting data and an input/output (I/O) command from the host 2 to the SSD 3 and a transmission path for transmitting data and a response from the SSD 3 to the host 2. The I/O command is a write command for writing data to the non-volatile memory or a read command for reading data from the non-volatile memory, which is issued from the host 2 to the SSD 3.

Serial Attached SCSI (SAS), Serial ATA (SATA), and NVM Express™ (NVMe™) may be used as a logical interface for connecting the host 2 and the SSD 3 to each other.

Next, an internal configuration of the host 2 will be described.

The host 2 includes a processor 21 and a memory 22, and the processor 21 and the memory 22 are interconnected via an internal bus 20.

The processor 21 is, for example, a central processing unit (CPU). The processor 21 executes software (host software) loaded from the SSD 3 into the memory 22. The host 2 may include a storage device other than the SSD 3. In this case, the host software may be loaded into the memory 22 from the storage device. The host software includes, for example, an operating system, a file system, a device driver, and an application program.

The memory 22 is, for example, a volatile memory. The memory 22 is also referred to as a main memory, a system memory, or a host memory. The memory 22 is implemented by, for example, a random-access memory such as a dynamic random-access memory (DRAM).

Next, an internal configuration of the SSD 3 will be described. Here, it is assumed that the non-volatile memory provided in the SSD 3 is a NAND flash memory, but the non-volatile memory may be another flash memory, an MRAM, a ReRAM, a FeRAM, a phase change memory, or the like.

The SSD 3 includes a controller 5 and a NAND flash memory 6. In addition, the SSD 3 may further include a random-access memory, for example, a dynamic random-access memory (DRAM) 7, which is a volatile memory.

The controller 5 is a memory controller. The controller 5 is a control circuit such as a System-on-a-Chip (SoC). The controller 5 is electrically connected to each of the NAND flash memory 6 and the DRAM 7. The controller 5 processes various commands received from the host 2. When the controller 5 receives a write command from the host 2, the controller 5 executes processing of writing data to the NAND flash memory 6 based on the received write command. When the controller 5 receives a read command from the host 2, the controller 5 executes processing of reading data from the NAND flash memory 6 based on the received read command.

For example, a toggle interface or an open NAND flash interface (ONFI) is used as a physical interface for connecting the controller 5 and the NAND flash memory 6. The controller 5 may be implemented by dedicated hardware, a processor that executes a program, or a combination of the dedicated hardware and the processor.

The NAND flash memory 6 may be a flash memory having a two-dimensional structure or a flash memory having a three-dimensional structure. Hereinafter, the NAND flash memory 6 is referred to as a NAND memory 6.

The DRAM 7 is a volatile memory. The DRAM 7 is used, for example, to temporarily store data to be written into the NAND memory 6. A storage area of the DRAM 7 is used to store various kinds of management data used by the controller 5.

The SSD 3 further includes a power supply circuit 8. The power supply circuit 8 is a power supply control circuit. The power supply circuit 8 is connected to the controller 5, the NAND memory 6, the DRAM 7, and the like, and supplies power supplied from the host 2 to each element of the SSD 3 such as the controller 5, the NAND memory 6, or the DRAM 7. In addition, the power supply circuit 8 can communicate with the controller 5. Communication between the power supply circuit 8 and the controller 5 is executed, for example, when an unexpected power loss occurs, in order for the power supply circuit 8 to notify the controller 5 of the occurrence of the power loss.

Next, an internal configuration of the controller 5 will be described.

The controller 5 includes a host interface (I/F) 51, a CPU 52, an SRAM 53, a direct memory access controller (DMAC) 54, an ECC processing circuit 55, a DRAM interface (I/F) 56, and a NAND interface (I/F) 57. The host interface 51, the CPU 52, the SRAM 53, the DMAC 54, the ECC processing circuit 55, the DRAM interface 56, and the NAND interface 57 are interconnected via the bus 50.

The host interface 51 is a host interface circuit that communicates with the host 2. The host interface 51 is, for example, a PCIe controller. Alternatively, when the SSD 3 has a configuration in which a network interface controller is incorporated, the host interface 51 may be implemented as a part of the network interface controller. The host interface 51 receives various commands from the host 2. These commands include a write command, a read command, and the like.

The CPU 52 is a processor. The CPU 52 controls the host interface 51, the SRAM 53, the DMAC 54, the ECC processing circuit 55, the DRAM interface 56, and the NAND interface 57. The CPU 52 performs various kinds of processing by loading a control program (firmware) from the NAND memory 6 or a ROM (not shown) into the SRAM 53 and executing the firmware in response to the supply of power to the SSD 3. The firmware may be loaded into the DRAM 7.

The controller 5 may include two or more CPUs 52. In this case, the controller 5 can execute various kinds of processing in parallel.

The CPU 52 performs, for example, management of data stored in the NAND memory 6 and management of blocks included in the NAND memory 6 as a flash translation layer (FTL). The management of the data stored in the NAND memory 6 includes, for example, management of address translation information. The address translation information is also referred to as mapping information or logical-to-physical address translation information. The CPU 52 uses a logical-to-physical address translation table (L2P table) 71 to manage address translation information.

In the NAND memory 6, new data cannot be directly overwritten into an area in a block into which data is previously written. Therefore, when the data previously written is updated, the controller 5 writes new data into an unwritten area in the block (or another block) and treats the previous data as invalid data. In other words, when data corresponding to a certain logical address is updated, the controller 5 writes the update data into another storage location of the NAND memory 6 instead of the storage location of the NAND memory 6 in which the previous data is stored. The controller 5 updates the L2P table 71 such that the physical address corresponding to that another storage location is associated with the logical address.

In addition, the management for each block of the NAND memory 6 includes management of defective blocks (bad blocks), wear leveling (WL), garbage collection (that is, compaction) (GC), and the like.

The defective block management is to perform block address management such that new data is not written into the defective block in which data writing cannot be properly performed. The wear leveling is processing for leveling so that data writing to the NAND memory 6 is not concentrated in a specific block. The garbage collection is processing for reducing the number of blocks in which valid data and invalid data are mixed and increasing the number of free blocks. The free block is a block that does not include valid data.

The valid data is data stored in a storage location corresponding to the latest physical address associated with the logical address. For example, the data stored in the storage location of the NAND memory 6 referenced from the L2P table 71, that is, the data managed by the controller 5 in association with the logical address as the latest data is valid data. The valid data is data that may be read from the host 2 later.

The invalid data is data stored in a storage location of the NAND memory 6 that is not referred to from the L2P table 71. For example, data stored in the storage location of the NAND memory 6 corresponding to the physical address that is not associated with any logical address, that is, data not managed by the controller 5 in association with the logical address as the latest data is invalid data. The invalid data is data that cannot be read from the host 2.

The SRAM 53 is a volatile memory. The SRAM 53 is used, for example, as a work area of the CPU 42.

The DMAC 54 executes data transfer between the memory 22 of the host 2 and the DRAM 7 (or the SRAM 53) under the control of the CPU 52. When data is to be transferred from the memory 22 of the host 2 to the DRAM 7 (or the SRAM 53), the CPU 52 designates a transfer source address indicating a memory area in the memory 22 of the host 2 in which the data is stored, a data size, and a transfer destination address indicating a memory area in the DRAM 7 (or the SRAM 53) to which the data is to be transferred, to the DMAC 54.

The ECC processing circuit 55 is a circuit that executes encode processing of data and decode processing of data. In the encode processing, the ECC processing circuit 55 adds an error correction code (ECC) as redundant code to data to be written into the NAND memory 6. The ECC circuit 55 executes decode processing when data is read from the NAND memory 6. In the decode processing, the ECC processing circuit 55 performs error correction of the data by using the ECC added to the data read from the NAND memory 6.

The DRAM interface 56 is a circuit that controls the DRAM 7. The DRAM interface 56 controls the DRAM 7 under the control of the CPU 52.

The NAND interface 57 is a circuit that controls the NAND memory 6. The NAND interface 57 controls the NAND memory 6 under the control of the CPU 52. Communication between the NAND interface 57 and the NAND memory 6 is executed, for example, in compliance with a toggle NAND flash interface or an open NAND flash interface (ONFI). When the NAND memory 6 includes a plurality of NAND flash memory dies, the NAND interface 57 may be connected to each of the plurality of NAND flash memory dies via, for example, a plurality of channels (Ch).

Next, information stored in the NAND memory 6 will be described. The NAND memory 6 stores user data 61 and an L2P table 62.

The user data 61 is data written into the NAND memory 6 based on the write command received from the host 2.

The L2P table 62 is a table stored in the NAND memory 6 as a backup of the L2P table 71 stored in the DRAM 7. That is, the L2P table 62 stores the backup data of the L2P table 71. The backup data is information required to reconstruct the L2P table 71.

Next, information stored in the DRAM 7 will be described. The DRAM 7 includes an L2P table 71, log buffers 72-0, . . . , and 72-n, a data buffer 73, an LBA list 74, and an LBA range/block management table 75.

The L2P table 71 is a table that stores the address translation information described above. That is, the controller 5 manages the correspondence relationship between each of the logical addresses included in the logical address space of the SSD 3 and each of the physical addresses of the NAND memory 6 by using the L2P table 71. Each logical address of the logical address space of the SSD 3 is an address used by the host 2 to access the SSD 3. The logical address is, for example, a logical block address (LBA). The physical address is, for example, a physical block address (PBA). The physical address (PBA) is represented by a combination of, for example, a block address, a page address, and an offset address within a page. When the NAND memory 6 includes a plurality of NAND chips, the physical address (PBA) is represented by a combination of a chip address, a block address, a page address, and an offset address within a page.

The L2P table 71 may include one or a plurality of table areas. In other words, the L2P table 71 includes at least a first table area. The first table area is a table area that stores N pieces of address translation information corresponding to N small logical address ranges. N is an integer equal to or greater than 2. Preferably, N is an integer multiple of 2.

When only the first table area is included in the L2P table 71, the first table area covers the entire logical address range included in the logical address space of the SSD 3.

On the other hand, when the L2P table 71 includes at least a first table area and a second table area, the first table area and the second table area respectively cover different logical address ranges in the logical address space. For example, the first table area covers a first logical address range of the logical address space, and the second table area covers a second logical address range of the logical address space that follows the first logical address range. The number of small logical address ranges included in each of the first logical address range and the second logical address range is N. That is, the N pieces of address translation information of the first table area respectively correspond to N small logical address ranges belonging to the first logical address range. The second table area also stores N pieces of address translation information respectively corresponding to N small logical address ranges belonging to the second logical address range. Hereinafter, each logical address range is also referred to as an LBA range.

Each small logical address range is a set of one or more logical addresses. For example, it is assumed that each small logical address range includes 32 contiguous logical addresses. In this case, the address translation information corresponding to a certain small logical address range includes 32 physical addresses respectively associated with the 32 contiguous logical addresses belonging to the small logical address range. In the following, a case where each small logical address range includes a plurality of contiguous logical addresses will be mainly described, but the number of logical addresses included in each small logical address range may be one. The details of the configuration of the L2P table 71 will be described later with reference to FIG. 6.

The log buffers 72-0 to 72-n are buffers for storing update logs. The log buffers 72-0 to 72-n respectively correspond to a plurality of table areas of the L2P table 71, for example.

The data buffer 73 is a buffer that temporarily stores data to be written into the NAND memory 6 or data read from the NAND memory 6.

The LBA list 74 is a list that stores LBAs corresponding to data for which writing into the NAND memory 6 has not completed.

The LBA range/block management table 75 is a table that stores information indicating a correspondence relationship between a plurality of LBA ranges and a plurality of L2P flash blocks. The LBA range/block management table 75 stores a block address of the L2P flash block assigned to the LBA range for each LBA range. The L2P flash block assigned to a certain LBA range is used to store the backup data of the L2P table 71 corresponding to the LBA range.

In addition, the SSD 3 further includes a capacitor 81. The capacitor 81 is an element that can store electric power. The capacitor 81 is electrically connected to the power supply circuit 8. The power supply circuit 8 supplies the power stored in the capacitor 81 to each element of the SSD 3 when a value of the power supply voltage supplied from the host 2 decreases without the power supply shutdown advance notification from the host 2, for example, when an unexpected power loss occurs. Further, the power supply circuit 8 notifies the controller 5 of the occurrence of such an unexpected power loss via the bus 50. The power supply shutdown advance notification is a notification for notifying that the power supply to the SSD 3 will be shut down. When the power of the host 2 is turned off, the host 2 transmits a power supply shutdown advance notification to the SSD 3 in advance to notify that the power supply will be shut down soon. The power supply shutdown advance notification is, for example, a Shutdown Notification defined in the NVMe standard, or a STANDBY IMMEDIATE command defined in the SATA standard.

The power stored in the capacitor 81 may be used, for example, for the controller 5 to execute a Power Loss Protection (PLP) operation. In the PLP operation, the controller 5 writes the information stored in the volatile memory (DRAM 7 or SRAM 53) into the NAND memory 6.

Next, an internal configuration of the NAND memory 6 will be described. FIG. 2 is a block diagram illustrating an example of an internal configuration of a non-volatile memory provided in the memory system according to the embodiment.

The NAND memory 6 includes a memory cell array 60. The memory cell array 60 includes a plurality of memory cells arranged in a matrix shape.

The memory cell array 60 of the NAND memory 6 includes a plurality of blocks BLK0 to BLKx-1. Each of the blocks BLK0 to BLKx-1 includes a plurality of pages (here, pages P0 to Py-1). Each of the blocks BLK0 to BLKx-1 functions as a unit of data erasing operation. The blocks may be referred to as "erasing blocks", "physical blocks", or "flash blocks". Each of the pages P0 to Py-1 is a unit of a data write operation or a data read operation.

Figure 3:
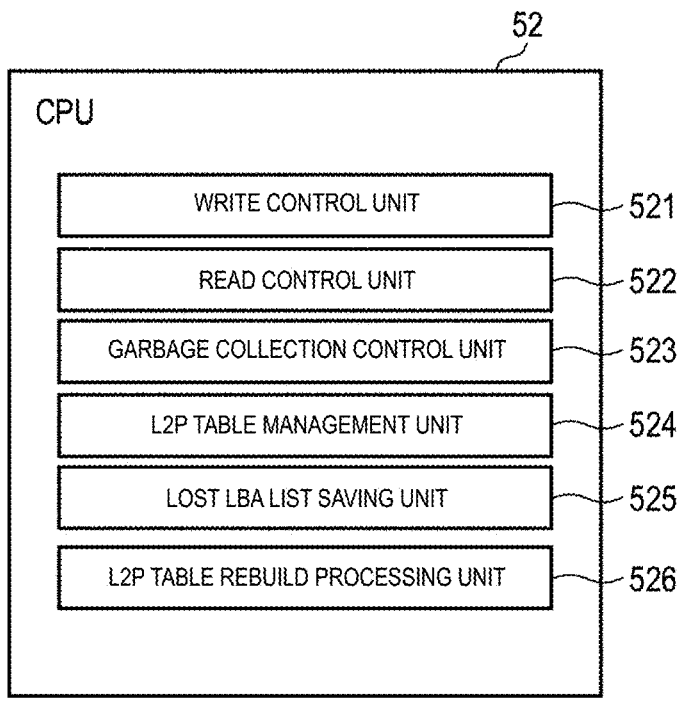
FIG. 3 is a block diagram illustrating an example of a functional configuration of a CPU provided in the memory system according to the embodiment.

FIG. 3 is a block diagram illustrating an example of a functional configuration of the CPU 52 provided in the memory system according to the embodiment. Configurations of the respective functions of the CPU 52 will be described below in order with reference to FIGS. 3 and 1.

The CPU 52 functions as a write control unit 521, a read control unit 522, a garbage collection control unit 523, an L2P table management unit 524, a lost LBA list saving unit 525, and an L2P table rebuild processing unit 526. A part or the entire of each function of the CPU 52 may be implemented by dedicated hardware of the controller 5.

Write Control Unit 521

First, processing executed by the write control unit 521 will be described.

The write control unit 521 executes processing corresponding to a write command received from the host 2. The write command designates, for example, a start logical address (start LBA), a data size, and a data pointer. The start LBA indicates a first logical block (write destination LBA) into which write data associated with a write command is to be written. One logical block (sector) is a minimum unit of data that can be designated by an LBA. A size of one logical block is, for example, 512 bytes or 4 Kbytes. The data size indicates a size of write data. The data size may be represented by, for example, the number of logical blocks to be written (the number of LBAs), or may be represented by bytes. The data pointer is a memory address indicating a memory area of the memory 22 in which write data is stored. The write command may further designate an area identifier indicating any one of the plurality of areas of the NAND memory 6. The write control unit 521 executes data acquisition processing, write destination block allocation processing, write destination determination processing, L2P update processing, completion response notification processing, and write processing based on a write command received from the host 2.

The data acquisition processing is processing of acquiring write data from the memory 22 of the host 2 based on the data pointer and the data size. The write control unit 521 receives write data from the host 2 by acquiring the write data from the memory 22 of the host 2. The received write data is temporarily stored in the data buffer 73.

The write destination block allocation processing is processing of allocating a write destination block, which is a block into which the received write data is to be written. The write control unit 521 allocates the write destination block to each of the plurality of areas such that a plurality of write destination blocks are respectively correlated with a plurality of areas in a one-to-one relationship. When a write destination block for an area designated by the received write command is previously allocated, there is no need to execute processing of allocating a new write destination block to the area designated by the received write command.

The write destination determination processing is processing of determining a write destination of the received write data, that is, a storage location (write destination storage location) of the NAND memory 6 into which the write data is to be written. The physical address indicating the write destination storage location is represented by, for example, a block address of a write destination block into which write data is to be written and an address (offset address) indicating a storage location in the write destination block into which the write data is to be written.

The L2P update processing is processing of updating the L2P table 71 in the DRAM 7 such that a physical address of a storage location (write destination storage location) of the NAND memory 6 determined as a write destination of the write data is associated with a logical address (start LBA) corresponding to the write data. The L2P update processing may be executed at a time point when the write destination storage location is determined, that is, at a time point when the write data is received from the host 2. Alternatively, the L2P update processing may be executed after the received write data is actually written into the NAND memory 6.

The completion response notification processing is processing of notifying the host 2 of a completion response indicating completion of processing of the received write command. The completion response notification processing may be executed, for example, at a time point when the write data is received from the host 2.

The write processing is processing of writing the write data stored in the data buffer 73 into the NAND memory 6.

Read Control Unit 522

Next, processing executed by the read control unit 522 will be described below.

The read control unit 522 executes processing corresponding to a read command received from the host 2. The read command designates, for example, a start logical address (start LBA), a data size, and a data pointer. The start LBA indicates a first logical block (read target LBA) in which the read target data is stored. The data size indicates a size of the read target data. The data pointer is a memory address indicating a memory area of the memory 22 of the host 2 to which the read target data read from the NAND memory 6 is to be transferred. The read command may further designate an area identifier indicating an area of the NAND memory 6 in which the read target data is stored. The read control unit 522 executes address resolution processing, read processing, data transfer processing, and completion response notification processing based on a read command received from the host 2.

The address resolution processing is processing of acquiring a physical address associated with an LBA (start LBA) corresponding to the read target data by referring to the L2P table 71 in the DRAM 7. The read processing is processing of reading the read target data from the NAND memory 6 based on the acquired physical address. The read target data that is read is temporarily stored in the data buffer 73. The data transfer processing is processing of transferring the read target data stored in the data buffer 73 to the memory area of the memory 22 indicated by the data pointer. The completion response notification processing is processing of notifying the host 2 of the completion response indicating completion of processing of the read command.

Garbage Collection Control Unit 523

Next, processing executed by the garbage collection control unit 523 will be described below.

The garbage collection control unit 523 executes garbage collection (GC) processing for the NAND memory 6. The GC processing includes GC target block selection processing, data copy processing, and L2P update processing.

The GC target block selection processing is processing of selecting a GC target block (also referred to as a copy source block) that is a block on which the garbage collection is to be performed. Each block of the NAND memory 6 is roughly classified into an active block and a free block. The active block is a block in which valid data is stored. The free block is a block in which valid data is not stored. The garbage collection control unit 523 selects one or more blocks in which valid data and invalid data are mixed from the set of active blocks as a GC target block (copy source block). For example, one or more blocks having a smaller amount of valid data may be selected as the copy source block.

The data copy processing is processing of copying data from a copy source storage location to a copy destination storage location of the NAND memory 6. The copy source storage location is a storage location of a copy source block in which valid data is stored. The copy destination storage location is a storage location of a copy destination block to which valid data is to be copied. The garbage collection control unit 523 reads valid data from the copy source storage location of the copy source block, and writes the read valid data into the copy destination storage location of the copy destination block. When all the valid data of the copy source block is copied to the copy destination block by the data copying processing, the copy source block is released as a free block that does not include the valid data.

The L2P update processing is processing of updating the L2P table 71 in the DRAM 7 such that a physical address associated with a logical address corresponding to the copied valid data is changed from an old physical address to a new physical address. Here, the old physical address is a physical address indicating the copy source storage location, and the new physical address is a physical address indicating the copy destination storage location.

In the L2P update processing, the garbage collection control unit 523 acquires the physical address associated with the logical address corresponding to the copied valid data from the L2P table 71.

When the acquired physical address matches the old physical address, the garbage collection control unit 523 updates the L2P table 71 such that the new physical address is associated with the logical address corresponding to the copied data.

On the other hand, when the acquired physical address does not match the old physical address, the garbage collection control unit 523 does not update the L2P table 71. This is because, when the acquired physical address does not match the old physical address, new data corresponding to the copy target data may have been written into the NAND memory 6 during execution of the data copying processing. The garbage collection control unit 523 updates the L2P table 71 under a condition that the acquired physical address matches the old physical address. Therefore, even when new data corresponding to copy target data is written into the NAND memory 6 during execution of the data copying processing, it is possible to prevent the physical address corresponding to the write destination storage location of the new data from being changed to the physical address corresponding to the copy destination storage location of the old data (copied data).

L2P Table Management Unit 524

Next, processing executed by the L2P table management unit 524 will be described below.

The L2P table management unit 524 manages the L2P table 71. The L2P table management unit 524 divides the L2P table 71 into one or more table areas respectively corresponding to one or more LBA ranges. In the following, it is assumed that the L2P table 71 is divided into a plurality of table areas, and the L2P table management unit 524 executes the update log management processing and the address translation information/update log saving processing for each LBA range, that is, for each table area. The L2P table 71 does not necessarily have to be divided into a plurality of table areas, and in this case, the update log management processing and the address translation information/update log saving processing are executed for one table area that covers the entire logical address space of the L2P table 71.

In the update log management processing, update logs indicating update content for N pieces of address translation information for each table area are managed by using a plurality of log buffers 72-0, . . . , and 72-$n$ respectively correlated with the plurality of table areas in a one-to-one relationship. For example, it is assumed that a physical address (PBA) associated with LBA 10 belonging to the LBA range is updated from the physical address (PBA)=5 to the physical address (PBA)=10 in a table area corresponding to the LBA range. In this case, the L2P table management unit 524 stores the update log indicating that the new PBA 10 is associated with LBA 10 in the log buffer corresponding to this table area.

The address translation information/update log saving processing is processing of periodically writing N pieces of address translation information of a table area and an update log indicating update content of the N pieces of address translation information to a block (L2P flash block) of the NAND memory 6 for each table area of the L2P table 71. For example, it is assumed that address translation information/update log saving processing for a first table area corresponding to a first LBA range is executed. In this case, the L2P table management unit 524 executes first processing including (1) processing of selecting one piece of address translation information to be written to the primary L2P flash block from the N pieces of address translation information such that N pieces of address translation information of the first table area are stored in the first block (primary L2P flash block) corresponding to the first table area in a first order, (2) processing of acquiring selected one piece of address translation information from the first table area in the DRAM 7, and (3) processing of writing the acquired one piece of address translation information and an update log indicating update content for all the pieces of address translation information of the first table area updated after the acquisition of one piece of address translation information, into the primary L2P flash block. Here, the first order may be an order in which the N pieces of address translation information are contiguously arranged. As the first order, for example, an ascending order, a descending order, or any other order may be used.

The address translation information/update log saving processing for each of other table areas of the L2P table 71 is also executed according to the same procedure as the address translation information/update log saving processing for the first table area.

For example, it is assumed that an address translation information/update log saving processing for a second table area corresponding to a second LBA range that follows a first LBA range is executed. In this case, the L2P table management unit 524 executes second processing including (1) processing of selecting, such that the N pieces of address translation information of the second table area are stored in another block (another L2P flash block) corresponding to the second table area in the first order, one piece of address translation information to be written into the other L2P flash block from the N pieces of address translation information of the second table area, (2) processing of acquiring the selected one piece of address translation information from the second table area in the DRAM 7, and (3) processing of writing the one piece of address translation information acquired from the second table area and an update log indicating update content for all the pieces of address translation information of the second table area updated after the acquisition of the one piece of address translation information from the second table area, into the other L2P flash block.

In this way, by periodically executing the address translation information/update log saving processing for each table area of the L2P table 71, a plurality of address translation information/update log pairs, each of which includes a set of address translation information of the table area corresponding to the L2P flash block and an update log indicating the update content of the address translation information, are stored in each of the L2P flash block in time series.

In this way, in the present embodiment, the plurality of address translation information/update log pairs are saved in the NAND memory 6 as the backup data of the L2P table 71.

Duplication Processing

Next, processing in which the L2P table management unit 524 duplicates the backup data of the L2P table 71 will be described. In the backup data duplication, the backup data (a plurality of address translation information/update log pairs) of the L2P table 71 is saved in two L2P flash blocks of the NAND memory 6. As a result, it is possible to safely save the plurality of address translation information/update log pairs in the NAND memory 6. Therefore, even when an error occurs such that the backup data is not normally readable from one L2P flash block of the two L2P flash blocks, the L2P table 71 can be reconstructed by using the backup data of the other L2P flash block.

In the present embodiment, in order to improve the performance related to the reconstruction of the L2P table 71, specifically, in order to shorten the time required for reconstructing the L2P table 71 while safely saving the L2P table 71, the L2P table management unit 524 executes the address translation information/update log saving processing in the following procedure when the backup data of the L2P table 71 is duplicated. Here, it is assumed that the backup data (a plurality of address translation information/update log pairs) of the first table area corresponding to the first LBA range is saved in the primary L2P flash block and the secondary L2P flash block.

The L2P table management unit 524 periodically executes first processing including (1) processing of selecting one piece of address translation information to be written to the primary L2P flash block from N pieces of address translation information such that the N pieces of address translation information of the first table area is stored in the primary L2P flash block in the first order, and of selecting address translation information N/2 pieces behind or ahead of the selected one piece of address translation information among the N pieces of address translation information as another address translation information to be written into the secondary L2P flash block, (2) processing of acquiring the selected one piece of address translation information and the selected other piece of address translation information from the first table area in the DRAM 7, (3) processing of writing the acquired one piece of address translation information and an update log indicating update content for all the pieces of address translation information in the first table area updated after the acquisition of the one piece of address translation information and the other piece of address translation information into the primary L2P flash block, and (4) processing of writing the acquired other piece of address translation information and the update log, which is the same as the update log written into the primary L2P flash block, into the secondary L2P flash block.

Here, it is assumed that N=4. In this case, in the first processing, for example, the first address translation information and the first update log are written into, for example, the page P0 of the primary L2P flash block, and the third address translation information and the first update log are written into, for example, the page P0 of the secondary L2P flash block.

In the second instance of first processing, for example, the second address translation information and the second update log are written into the primary L2P flash block, for example, the page P1, and the fourth address translation information and the second update log are written into the secondary L2P flash block, for example, the page P1.

In the third instance of first processing, for example, the third address translation information and the third update log are written into, for example, the page P2 of the primary L2P flash block, and the first address translation information and the third update log are written into, for example, the page P2 of the secondary L2P flash block.

In the fourth instance of first processing, for example, the fourth address translation information and the fourth update log are written into, for example, the page P3 of the primary L2P flash block, and the second address translation information and the fourth update log are written into, for example, the page P3 of the secondary L2P flash block.

Here, the first address translation information is focused on. In the first instance of the first processing, the content of the first update log and subsequent update logs is not reflected in the first address translation information written into the primary L2P flash block. On the other hand, the first update log and the second update log are previously reflected in the first address translation information, which is written into the secondary L2P flash block in the third instance of first processing.

As described above, the first address translation information written into the secondary L2P flash block includes the update content newer than the first address translation information written into the primary L2P flash block.

Therefore, by copying the first address translation information written into the secondary L2P flash block to the DRAM 7, the latest content of the first address translation information can be reconstructed in the DRAM 7 without reflecting the content of the first update log and the second update log in the first address translation information in the DRAM 7.

Next, second address translation information is focused on. In the second instance of first processing, the content of the second or subsequent update logs is not reflected in the second address translation information written into the primary L2P flash block. On the other hand, in the fourth instance of first processing, the first update log, the second update log, and the third update log are previously reflected in the second address translation information written into the secondary L2P flash block.

As described above, the second address translation information written into the secondary L2P flash block includes the update content newer than the second address translation information written into the primary L2P flash block.

Therefore, by copying the second address translation information written into the secondary L2P flash block to the DRAM 7, the latest content of the second address translation information can be reconstructed in the DRAM 7 without reflecting the content of the first update log, the second update log, and the third update log in the second address translation information in the DRAM 7.

As described above, in the present embodiment, duplication processing (also referred to as a time difference duplication processing) of saving the address translation information at different time points in two L2P flash blocks can be executed. As described above, by executing the time difference duplication processing for the first table area, the first table area of the L2P table 71 can be safely saved in the NAND memory 6, and the time required for reconstructing the first table area of the L2P table 71 can be shortened. Therefore, the performance related to the reconstruction of the L2P table 71 can be improved in that the first table area can be safely saved in the NAND memory 6 and the time required for reconstructing the first table area can be shortened.

Address Translation Information/Update Log Saving Processing Corresponding to GC In the present embodiment, in order to improve the performance related to the reconstruction of the L2P table 71, specifically, even when new data corresponding to the copy target data is written into the NAND memory 6 during the execution of the data copying processing for the GC, the processing of saving the update log with which it is possible to distinguish between the update of the L2P table 71 based on the GC and the update of the L2P table 71 based on the write command in the NAND memory 6 may be executed in order to correctly reconstruct the L2P table 71. In this case, the L2P table management unit 524 executes the address translation information/update log saving processing in the following procedure. Here, it is assumed that the backup data of the first table area (a plurality of address translation information/update log pairs) is saved in the primary L2P flash block.

That is, the L2P table management unit 524 periodically executes first processing including (1) processing of selecting one piece of address translation information to be written into the primary L2P flash block from N pieces of address translation information such that N pieces of address translation information of the first table area are stored in the primary L2P flash block in the first order, (2) processing of acquiring the selected one piece of address translation information, from the first table area in the DRAM 7, and (3) processing of writing the acquired one piece of address translation information and an update log indicating update content for all the pieces of address translation information of the first table area updated after the acquisition of one piece of address translation information, into the primary L2P flash block.

Here, when the first table area of the L2P table 71 is updated by writing the data into the NAND memory 6 based on the write command received from the host 2, the update log written into the primary L2P flash block includes a first type log including a logical address corresponding to the data and a physical address indicating a storage location in the NAND memory 6 determined as a write destination of the data.

On the other hand, when the first table area of the L2P table 71 is updated by data copy from the copy source storage location to the copy destination storage location of the NAND memory 6 in the GC for the NAND memory 6, the update log written into the primary L2P flash block includes a second type log including a logical address corresponding to the copied data, a new physical address indicating the copy destination storage location, and an old physical address indicating the copy source storage location.

As a result, in the processing of reconstructing the first table area, it is possible to execute processing of acquiring a physical address associated with a logical address corresponding to the copied data from the first table area, and of reflecting the content of this log in the first table area under a condition that the acquired physical address matches the old physical address. Therefore, even when new data corresponding to copy target data is written into the NAND memory 6 during execution of the data copying processing, it is possible to prevent the physical address corresponding to the write destination storage location of the new data from being changed to the physical address corresponding to the copy destination storage location of the old data (copied data). As a result, the performance related to the reconstruction of the L2P table 71 can be improved in that the L2P table 71 can be correctly reconstructed even when new data corresponding to the copy target data is written into the NAND memory 6 during the execution of the data copying processing for GC.

The address translation information/update log saving processing corresponding to the GC may be executed in combination with the time difference duplication processing. In this case, the L2P table management unit 524 periodically executes the above-described first processing by repeatedly executing (1) processing of selecting one piece of address translation information to be written to the primary L2P flash block from N pieces of address translation information of the first table area such that the N pieces of address translation information of the first table area is stored in the primary L2P flash block in the first order, and of selecting address translation information N/2 pieces behind or ahead of the selected one piece of address translation information among the N pieces of address translation information as another address translation information to be written into the secondary L2P flash block, (2) processing of acquiring the selected one piece of address translation information and the selected other piece of address translation information from the first table area in the DRAM 7, (3) processing of writing the acquired one piece of address translation information and an update log indicating update content for all the pieces of address translation information in the first table area updated after the acquisition of the one piece of address translation information and the other piece of address translation information into the primary L2P flash block, and (4) processing of writing the acquired other piece of address translation information and the update log, which is the same as the update log written into the primary L2P flash block, into the secondary L2P flash block.

In this way, in the time difference duplication processing, the same update log is written into both of the two L2P flash blocks. Each of the update logs written into both of the two L2P flash blocks may include two types of logs, that is, the first type log and the second type log described above.

Duplication Processing for Each Table Area

In the time difference duplication processing, the backup data of the L2P table 71 may be saved in two L2P flash blocks for each table area. For example, it is assumed that the L2P table 71 includes a first table area and a second table area, and the first table area covers a first LBA range in the logical address space of the SSD 3, and the second table area covers a second LBA range in the logical address space of the SSD 3 that follows the first LBA range. In this case, the L2P table management unit 524 executes the address translation information/update log saving processing according to the following procedure.

That is, as described above, the L2P table management unit 524 allocates a first block (primary L2P flash block) and a second block (secondary L2P flash block) to the first table area and allocate a third block (third L2P flash block) and a fourth block (fourth L2P flash block) to the second table area.

The L2P table management unit 524 executes a time difference duplication processing for the first table area and a time difference duplication processing for the second table area in parallel. The time difference duplication processing for the first table area is executed according to the above-described procedure. The time difference duplication processing for the second table area is executed according to the following procedure.

That is, the L2P table management unit 524 periodically executes first processing including (1) processing of selecting one piece of address translation information to be written to the third L2P flash block from N pieces of address translation information of the second table area such that the N pieces of address translation information of the second table area is stored in the third L2P flash block in the first order, and of selecting address translation information N/2 pieces behind or ahead of the selected one piece of address translation information among the N pieces of address translation information of the second table area as another address translation information to be written into the fourth L2P flash block, (2) processing of acquiring the selected one piece of address translation information and the selected other piece of address translation information from the second table area in the DRAM 7, (3) processing of writing the one piece of address translation information acquired from the second table area and an update log indicating update content for all the pieces of address translation information in the second table area updated after the acquisition of the one piece of address translation information and the other piece of address translation information from the second table area into the third L2P flash block, and (4) processing of writing the other piece of address translation information acquired from the second table area and the update log, which is the same as the update log written into the third L2P flash block, into the fourth L2P flash block.

Management of Log Buffer

When the power supply shutdown advance notification is received from the host 2 or when an unexpected power loss occurs, the L2P table management unit 524 determines whether the update log is not saved in the L2P flash block is present in any of the log buffers 72-0 to 72-*n*. When an unsaved update log that is not yet saved in the L2P flash block corresponding to the table area is present in the log buffer corresponding to the table area, the L2P table management unit 524 writes the unsaved update log into the L2P flash block. When an unexpected power loss occurs, processing of writing the unsaved update log to the L2P flash block is executed using the power stored in the capacitor. That is, the update log stored in the log buffer 72 is included in the PLP target data, which is data to be stored in the NAND memory 6** when an unexpected power loss occurs.

For example, the L2P table management unit 524 manages an update log indicating update content of the N pieces of address translation information in the first table area and an update log indicating update content of the address translation information in the second table area by using the log buffer 72-0 and the log buffer 72-1, respectively. When the power supply shutdown advance notification is received from the host 2 or when an unexpected power loss occurs, when an unsaved update log that is not saved in the L2P flash block corresponding to the first table area is present in the log buffer 72-0, the L2P table management unit 524 writes the unsaved update log in the log buffer 72-0 into the L2P flash block corresponding to the first table area. In addition, when an unsaved update log that is not yet saved in the L2P flash block corresponding to the second table area is present in the log buffer 72-1, the L2P table management unit 524 writes the unsaved update log in the log buffer 72-1 into the L2P flash block corresponding to the second table area.

Lost LBA List Saving Unit 525

Next, processing executed by the lost LBA list saving unit 525 will be described below.

Lost LBA List Saving Processing

The lost LBA list saving unit 525 performs lost LBA list saving processing. The lost LBA list saving processing is processing of saving a list of logical addresses corresponding to write data lost because of an unexpected power loss.

The lost LBA list saving unit 525 executes the lost LBA list saving processing for each table area of the L2P table 71.

For example, in the lost LBA list saving processing for the first table area, the lost LBA list saving unit 525 saves a list (first list) of logical addresses corresponding to write data lost because of an unexpected power loss, among write data to be written into the first LBA range corresponding to the first table area, in the L2P flash block corresponding to the first table area. When the time difference duplication processing is executed, the first list is saved in both of the two L2P flash blocks corresponding to the first table area.

For example, in the lost LBA list saving processing for the second table area, the lost LBA list saving unit 525 saves a list (second list) of logical addresses corresponding to write data lost because of an unexpected power loss, among write data to be written into the second LBA range corresponding to the second table area, in the L2P flash block corresponding to the second table area. When the time difference duplication processing is executed, the second list is saved in both of the two L2P flash blocks corresponding to the second table area.

The first list is a set of remaining logical addresses obtained by excluding a set of logical addresses respectively corresponding to pieces of write data of which writing into the NAND memory 6 has completed from a set of logical addresses respectively corresponding to pieces of write data, which is received from the host 2 and is to be written into the first LBA range.

The second list is a set of remaining logical addresses obtained by excluding a set of the logical addresses respectively corresponding to pieces of write data of which writing into the NAND memory 6 has completed from a set of logical addresses respectively corresponding to pieces of write data, which is received from the host 2 and is to be written into the second LBA range.

The first list and the second list are generated based on the LBA list 74 stored in the DRAM 7. The LBA list 74 is a set of logical addresses corresponding to all data which is received from the host 2 and of which writing into the NAND memory 6 has not completed.

The lost LBA list saving processing is executed by using the first method or the second method.

In the first method, the lost LBA list saving unit 525 writes the first list and the second list to the L2P flash block corresponding to the first table area and the L2P flash block corresponding to the second table area, respectively, by using the power stored in the capacitor 81 in response to the occurrence of the unexpected power loss. In this way, in the first method, when an unexpected power loss occurs, the first list and the second list are saved in the L2P flash block corresponding to the first table area and the L2P flash block corresponding to the second table area, respectively. When the power supply shutdown advance notification is received from the host 2, the controller 5 starts a shutdown (graceful shutdown) processing and writes all the write data received from the host 2 into the NAND memory 6. The host 2 does not cut off the power supply to the SSD 3 until the completion of the graceful shutdown processing is notified from the controller 5. Therefore, since the loss of the write data does not occur, there is no need to save the list of the lost LBAs in the L2P flash block.

In the second method, the lost LBA list saving unit 524 writes the first list and the second list into one predetermined block of the NAND memory 6 by using the power stored in the capacitor 81 in response to the occurrence of the unexpected power loss. The one predetermined block may be, for example, a single level cell block (SLC block). The SLC block is a block into which data is written by using an SLC mode, which is a program mode according to which data of one bit is written per memory cell. Each L2P flash block may be an SLC block, a triple level cell (TLC) block, or a quad level cell (QLC) block. The TLC block is a block into which data is written by using a TLC mode, which is a program mode according to which three-bit data is written per memory cell. The QLC block is a block into which data is written by using a QLC mode, which is a program mode according to which four-bit data is written per memory cell. In response to the recovery of the power to the SSD 3, the lost LBA list saving unit 524 copies the first list and the second list from one predetermined block to the L2P flash block corresponding to the first table area and the L2P flash block corresponding to the second table area, respectively. In this way, in the second method, when an unexpected power loss occurs, rather than the first list and the second list being respectively distributed to the L2P flash block corresponding to the first table area and the L2P flash block corresponding to the second table area, the first list and the second list are respectively distributed to the L2P flash block corresponding to the first table area and the L2P flash block corresponding to the second table area when power to SSD 3 is restored.

L2P Table Rebuild Processing Unit 526

Next, some processing related to the L2P table, which are executed by the L2P table rebuild processing unit 526, will be described below.

Rebuild Processing of L2P Table

The L2P table rebuild processing unit 526 executes an L2P table rebuild processing for each table area of the L2P table 71. The L2P table rebuild processing is processing of reconstructing the latest address translation information of each table area of the L2P table 71 in the DRAM 7, based on a predetermined number of pieces of address translation information stored in each L2P flash block and a predetermined number of update logs.

The rebuild processing is executed in response to power to the SSD 3 being restored after power supply to the SSD 3 is cut off. In any of a case where power to the SSD 3 is restored after power supply to the SSD 3 is cut off because of an unexpected power loss, and a case where power to the SSD 3 is restored after power supply to the SSD 3 is cut off because of completion of shutdown (graceful shutdown)

processing, the L2P table rebuild processing unit 526 may execute rebuild processing according to the following procedure.

The L2P table rebuild processing unit 526 may notify the host 2 that the SSD 3 is in a ready state in which the SSD 3 can process an input/output command before executing the L2P table rebuild processing. When an input/output command for designating a logical address belonging to a certain logical address range (LBA range) is received from the host 2, the L2P table rebuild processing unit 526 selects an L2P flash block corresponding to this LBA range from the plurality of L2P flash blocks. The L2P table rebuild processing unit 526 reconstructs the latest address translation information of the table area corresponding to the LBA range in the DRAM 7 based on the N pieces of address translation information and the N update logs of the table area stored in the selected L2P flash block. When the power to the SSD 3 is restored after an unexpected power loss occurs, the latest address translation information to be reconstructed is the address translation information of the table area of the L2P table 71 immediately before the unexpected power loss occurs.

Rebuild Processing Corresponding to Time Difference Duplication

Next, rebuild processing of reconstructing the first table area in the DRAM 7 when the time difference duplication processing is executed for the first table area will be described.

That is, the L2P table rebuild processing unit 526 reads N/2 pieces of address translation information last written into the primary L2P flash block and N/2 update logs last written into the primary L2P flash block from the primary L2P flash block, and reads N/2 pieces of address translation information last written into the secondary L2P flash block and N/2 update logs last written into the secondary L2P flash block from the secondary L2P flash block. As a result, the N/2 pieces of address translation information read from the primary L2P flash block and the N/2 pieces of address translation information read from the secondary L2P flash block are address translation information different from each other. Therefore, the total N pieces of address translation information required for reconstructing the first table area can be read from the primary L2P flash block and the secondary L2P flash block. In addition, the N/2 update logs read from the primary L2P flash block are the same as the N/2 update logs read from the secondary L2P flash block.

The L2P table rebuild processing unit 526 reconstructs the first table area in the DRAM 7 based on N/2 pieces of address translation information read from the primary L2P flash block, N/2 pieces of address translation information read from the secondary L2P flash block, and N/2 update logs read from either the primary L2P flash block or the secondary L2P flash block.

When time difference duplication is not used, N pieces of address translation information and N update logs are required for the reconstruction of the first table area.

On the other hand, when the time difference duplication is used, the latest N/2 pieces of address translation information can be acquired from the primary L2P flash block, and the latest other N/2 pieces of address translation information can be acquired from the secondary L2P flash block. The latest N/2 pieces of address translation information and the latest other N/2 pieces of address translation information previously reflect the content of the old N/2 update logs among the N update logs. Therefore, when time difference duplication is used, the first table area can be reconstructed in the DRAM 7 without using the old N/2 update logs.

Update Log Reflection Order

When the time difference duplication is used, the L2P table rebuild processing unit 526 reflects the content of N/2 update logs in the address translation information according to the following procedure.

That is, the L2P table rebuild processing unit 526 first stores N/2 pieces of address translation information read from the primary L2P flash block in the DRAM 7, and stores N/2 pieces of address translation information read from the secondary L2P flash block in the DRAM 7.

Next, the L2P table rebuild processing unit 526 selects the update logs from the N/2 update logs read from either the primary L2P flash block or the secondary L2P flash block in an order of oldness.

Next, the L2P table rebuild processing unit 526 selects a group of address translation information acquired from the first table area in the DRAM 7 before a time point when the selected update log was written into the primary L2P flash block and the secondary L2P flash block, from the total N pieces of address translation information including the N/2 pieces of address translation information read from the primary L2P flash block and the N/2 pieces of address translation information read from the secondary L2P flash block. The L2P table rebuild processing unit 526 reflects the content of the selected update log in the selected group of address translation information.

For example, when N=4, it is assumed that a pair of fourth address translation information and a fourth update log and a pair of third address translation information and a third update log are read from the primary L2P flash block, and a pair of second address translation information and a fourth update log and a pair of first address translation information and a third update log are read from the secondary L2P flash block.

In this case, the third update log is selected as the oldest update log. The address translation information acquired from the DRAM 7 before a time point when the third update log was written into the primary L2P flash block and the secondary L2P flash block is the third address translation information read from the primary L2P flash block and the first address translation information read from the secondary L2P flash block. Therefore, the content of the third update log is reflected in the third address translation information and the first address translation information.

Next, a fourth update log is selected as the oldest update log. The address translation information acquired from the first table area on the DRAM 7 before the time point when the fourth update log was written into the primary L2P flash block and the secondary L2P flash block is the third address translation information and the fourth address translation information read from the primary L2P flash block and the first address translation information and the second address translation information read from the secondary L2P flash block. Therefore, the content of the fourth update log is reflected in the third address translation information, the fourth address translation information, the first address translation information, and the second address translation information.

When the time difference duplication is not used, the L2P table rebuild processing unit 526 reads N pieces of address translation information last written into the L2P flash block corresponding to the first table area and N update logs last written into the L2P flash block from the L2P flash block. Next, the L2P table rebuild processing unit 526 selects the update logs from the read N update logs in an order of oldness. The L2P table rebuild processing unit 526 selects a group of address translation information acquired from the DRAM 7 before a time point when the selected update log was written into the L2P flash block, from N pieces of address translation information read from the L2P flash block, and reflects the content of the selected update log in the selected group of address translation information.

Rebuild Processing when Error Occurs in which Data is not Normally Readable from One Block of Two L2P Flash Blocks When data is not normally readable from one of the primary L2P flash block and the secondary L2P flash block, the L2P table rebuild processing unit 526 executes a rebuild processing by the following procedure.

That is, when data cannot be normally read from one L2P flash block of the primary L2P flash block and the secondary L2P flash block, the L2P table rebuild processing unit 526 reads the N pieces of address translation information last written into the other L2P flash block of the primary L2P flash block and the secondary L2P flash block and the N update logs last written into the other L2P flash block from the other L2P flash block. The L2P table rebuild processing unit 526 reconstructs the first table area based on the N pieces of address translation information read from the other L2P flash block and the N update logs read from the other L2P flash block.

Processing Using Lost LBA List

After the first table area is reconstructed, the L2P table rebuild processing unit 526 determines whether a list of logical addresses corresponding to the lost write data is stored in the L2P flash block corresponding to the first table area. When a list of logical addresses corresponding to lost write data is stored in the L2P flash block, the L2P table rebuild processing unit 526 updates the reconstructed first table area such that a value indicating an error is associated with each of the logical addresses corresponding to the lost write data, based on the list stored in the L2P flash block.

In this way, the address translation information of the first table area is reconstructed, and a value indicating an error is associated with each of the logical addresses corresponding to the lost write data.

Rebuild Processing Corresponding to Case where Address Translation Information/Update Log Saving Processing Corresponding to GC is Executed Next, rebuild processing corresponding to a case where the address translation information/update log saving processing corresponding to the GC is executed will be described. When the address translation information/update log saving processing corresponding to the GC is executed, the L2P table rebuild processing unit 526 executes rebuild processing according to the following procedure. Here, it is assumed that the first table area is reconstructed when the time difference duplication processing is not used for the first table area.

That is, the L2P table rebuild processing unit 526 reads N pieces of address translation information last written into the primary L2P flash block and N update logs last written into the primary L2P flash block from the primary L2P flash block. The L2P table rebuild processing unit 526 reconstructs the first table area in the DRAM 7 based on the read N pieces of address translation information and the read N update logs.

In the reconstruction of the first table area, the L2P table rebuild processing unit 526 determines whether the read N update logs include the second type log. When the read N update logs include the second type log, the L2P table rebuild processing unit 526 acquires a physical address corresponding to the logical address included in the second type log from the first table area in the DRAM 7. The L2P table rebuild processing unit 526 determines whether the old physical address included in the second type log matches the acquired physical address.

when the old physical address included in the second type log matches the acquired physical address, the L2P table rebuild processing unit 526 reflects the content of the second type log in the first table area in the DRAM 7 such that the new physical address included in the second type log is associated with the logical address included in the second type log.

On the other hand, when the old physical address included in the second type log does not match the acquired physical address, the L2P table rebuild processing unit 526 does not reflect the content of the second type log in the first table area in the DRAM 7.

In this way, the L2P table rebuild processing unit 526 executes processing of reflecting the content of the second type log in the first table area under a condition that the physical address acquired from the first table area matches the old physical address. Therefore, even when new data corresponding to copy target data is written into the NAND memory 6 during execution of the data copying processing, it is possible to prevent the physical address corresponding to the write destination storage location of the new data from being changed to the physical address corresponding to the copy destination storage location of the old data (copied data).

Even when the address translation information/update log saving processing corresponding to the GC is executed for each of other table areas, the L2P table rebuild processing unit 526 executes the rebuild processing of each of the other table areas according to the following procedure in the same manner as the above-described rebuild processing for the first table area.

For example, it is assumed that processing for a second table area corresponding to a second LBA range that follows a first LBA range is performed.

The L2P table rebuild processing unit 526 reads N pieces of address translation information last written into the secondary L2P flash block and N update logs last written into the secondary L2P flash block, from the secondary L2P flash block. The L2P table rebuild processing unit 526 reconstructs the second table area in the DRAM 7 based on the read N pieces of address translation information and the read N update logs.

In the reconstruction of the second table area, the L2P table rebuild processing unit 526 determines whether the read N update logs include the second type log. When the read N update logs include the second type log, the L2P table rebuild processing unit 526 acquires a physical address corresponding to the logical address included in the second type log from the second table area in the DRAM 7. The L2P table rebuild processing unit 526 determines whether the old physical address included in the second type log matches the acquired physical address.

When the old physical address included in the second type log matches the acquired physical address, the L2P table rebuild processing unit 526 reflects the content of the second type log in the second table area in the DRAM 7 such that the new physical address included in the second type log is associated with the logical address included in the second type log.

On the other hand, when the old physical address included in the second type log does not match the acquired physical address, the L2P table rebuild processing unit 526 does not reflect the content of the second type log in the second table area in the DRAM 7.

The above-described (1) time difference duplication processing, (2) address translation information/update log saving processing corresponding to GC, (3) duplication processing for each table area, (4) lost LBA list saving processing, and the like may be appropriately combined and executed.

As described above with reference to FIG. 3, each of the write control unit 521, the read control unit 522, the garbage collection control unit 523, the L2P table management unit 524, the lost LBA list saving unit 525, and the L2P table rebuild processing unit 526 is a function of the CPU 52 shown in FIG. 3, and executes various processes.

Figure 4:
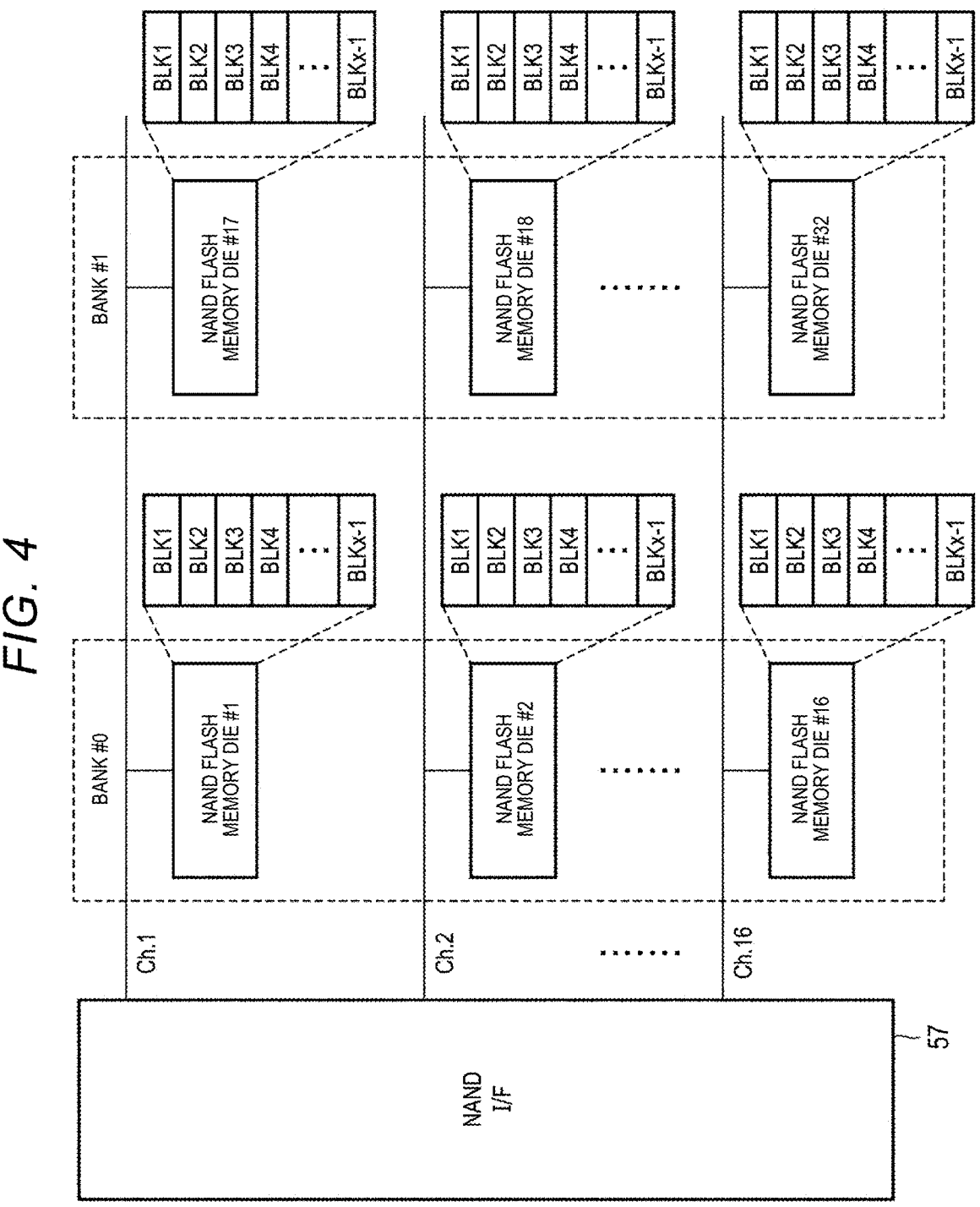
FIG. 4 is a diagram illustrating a configuration example showing a relationship between a plurality of channels and a plurality of NAND flash memory dies used in the memory system according to the embodiment.

Next, a configuration of the NAND memory 6 including a plurality of NAND flash memory dies will be described. FIG. 4 is a block diagram illustrating a configuration example showing a relationship between a plurality of channels and a plurality of NAND flash memory dies used in the memory system according to the embodiment.

The plurality of NAND flash memory dies can operate separately. Thus, the NAND flash memory die is handled as a unit capable of operating in parallel. FIG. 4 illustrates a case where 16 channels ch. 1 to ch. 16 are connected to the NAND interface (I/F) 57 and two NAND flash memory dies are connected to each of the 16 channels ch. 1 to ch. 16.

In this case, 16 NAND flash memory dies #1 to #16 connected to the channels Ch. 1 to Ch. 16 may be configured as a bank #0, and the 16 NAND flash memory dies #17 to #32 connected to the remaining channels Ch. 1 to Ch. 16 may be configured as a bank #1. The bank is handled as a unit for operating the plurality of memory dies in parallel by bank interleaving. In the configuration example of FIG. 4, a maximum of 32 NAND flash memory dies can be operated in parallel by 16 channels and bank interleaving using two banks.

The erasing operation may be executed in units of one block (physical block), or may be executed in units of a block group including a set of a plurality of physical blocks capable of operating in parallel. The block group is also referred to as a superblock.

One block group, that is, one superblock including a set of a plurality of physical blocks may include, but is not limited to, total 32 physical blocks selected one by one from the NAND flash memory dies #1 to #32. Each of the NAND flash memory dies #1 to #32 may have a multi-plane configuration. For example, when each of the NAND flash memory dies #1 to #32 has a multi-plane configuration including two planes, one superblock may include total 64 physical blocks selected one by one from 64 planes corresponding to the NAND flash memory dies #1 to #32.

Figure 5:
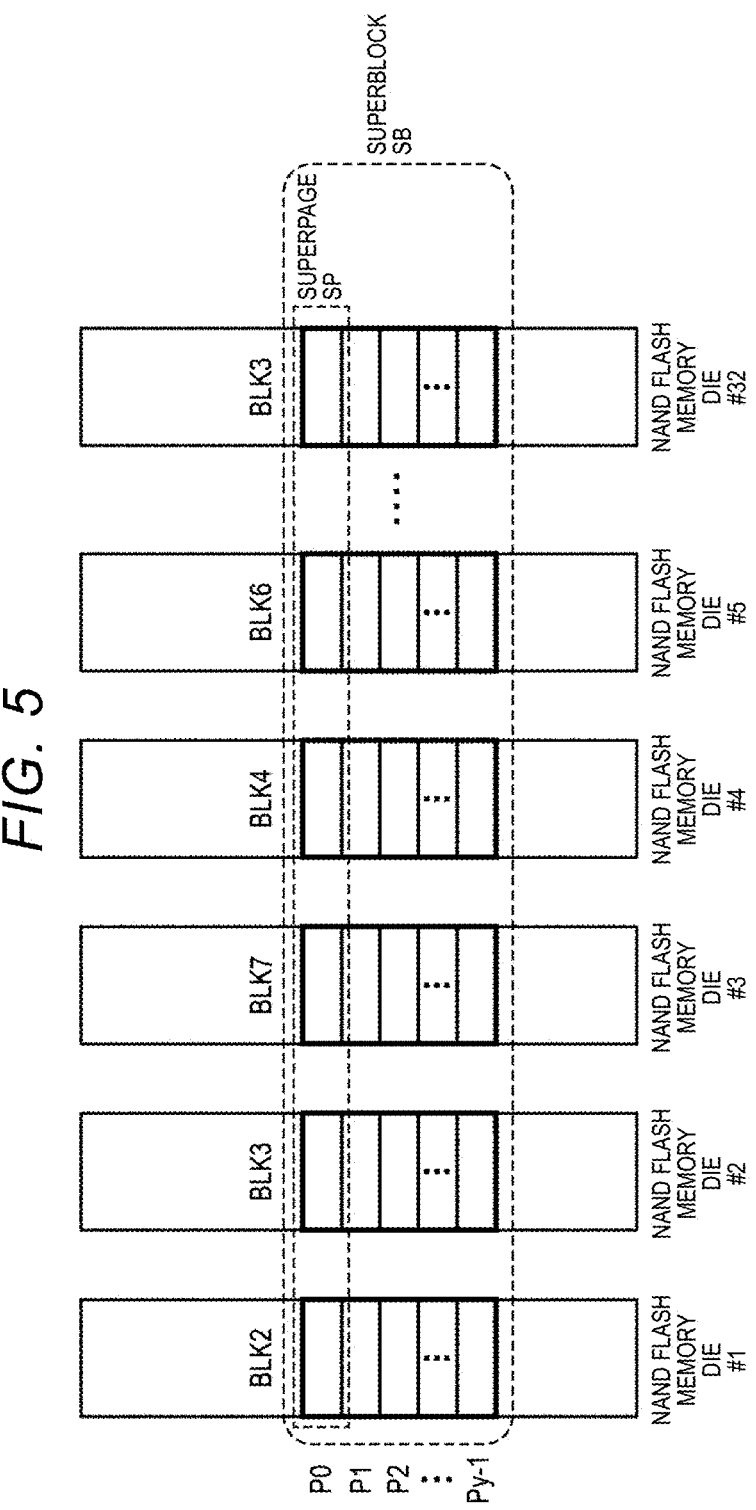
FIG. 5 is a diagram illustrating a configuration example of a superblock used in the memory system according to the embodiment.

FIG. 5 illustrates one superblock (SB) including 32 physical blocks (here, the physical block BLK2 in the NAND flash memory die #1, the physical block BLK3 in the NAND flash memory die #2, the physical block BLK7 in the NAND flash memory die #3, the physical block BLK4 in the NAND flash memory die #4, the physical block BLK6 in the NAND flash memory die #5, . . . , and the physical block BLK3 in the NAND flash memory die #32).

A configuration in which one superblock includes only one physical block may be used, and in this case, one superblock is equivalent to one physical block.

The superblock includes logical pages in the same number as the number of the pages (physical pages) P0 to Py−1 included in each of the physical blocks that make up the superblock. A logical page is also referred to as a superpage. One superpage includes 32 physical pages in the same number as the number of physical blocks included in the superblock. For example, the superpage at the head of the shown superblock includes a set of the physical pages P1 of the physical blocks BLK2, BLK3, BLK7, BLK4, BLK6, . . . , and BLK3 of each of the NAND flash memory dies #0, #2, #3, #4, #5, . . . , and #32.

Configuration of L2P Table 71

Figure 6:
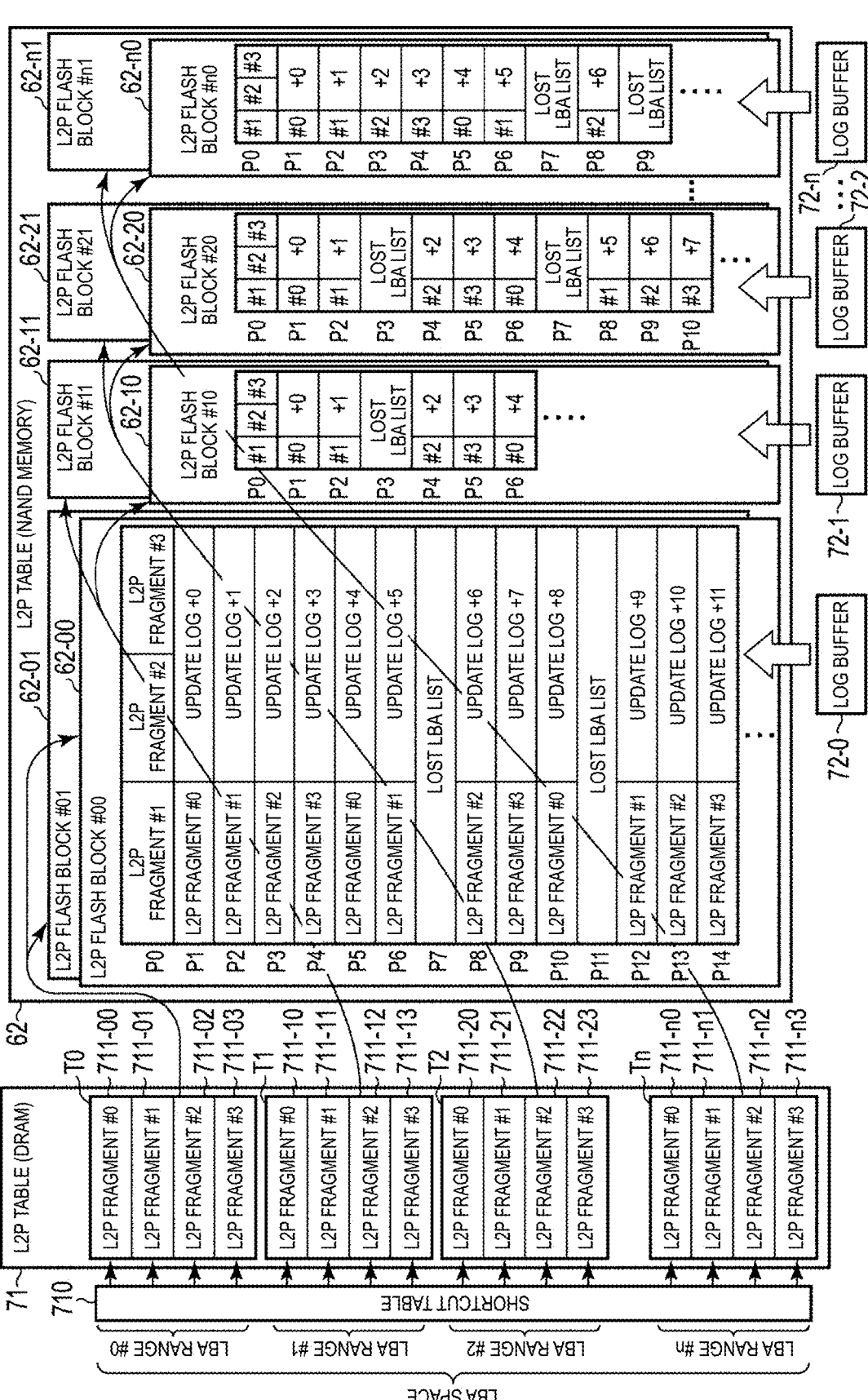
FIG. 6 is a diagram illustrating a configuration example of an L2P table used in the memory system according to the embodiment and a configuration example showing a relationship between a plurality of table areas of the L2P table and a plurality of L2P flash blocks.

Next, a configuration of the L2P table 71 will be described. FIG. 6 is a diagram illustrating a configuration example of an L2P table 71 used in the memory system according to the embodiment and a configuration example showing a relationship between a plurality of table areas of the L2P table 71 and a plurality of L2P flash blocks.

Here, it is assumed that the logical address space of the SSD 3 is divided into n+1 LBA ranges. The logical address space includes an LBA range #0, an LBA range #1, an LBA range #2, . . . , and an LBA range #n.

The shortcut table 710 is a table that stores a relationship between an LBA and a memory address indicating a storage location in which the L2P fragment of the L2P table 71 is stored.

The L2P table 71 of the DRAM 7 includes a plurality of L2P fragments. Each of the plurality of L2P fragments is address translation information corresponding to one small logical address range. Each of the plurality of L2P fragments may include a plurality of physical addresses respectively corresponding to a plurality of contiguous logical addresses included in a corresponding small logical address range. For example, one L2P fragment may include a predetermined number of physical addresses respectively corresponding to a predetermined number of contiguous logical addresses.

The L2P table 71 is divided into a table area TO corresponding to the LBA range #0, a table area T1 corresponding to the LBA range #1, a table area T2 corresponding to the LBA range #2, . . . , and a table area Tn corresponding to the LBA range #n. Each of the table areas TO to Tn includes N L2P fragments. FIG. 6 shows an example in which each table area includes four L2P fragments (L2P fragment #0 to #3).

The L2P table 71 includes L2P fragments (#0) 711-00, L2P fragment (#1) 711-01, L2P fragment (#2) 711-02, and L2P fragment (#3) 711-03 as a set of L2P fragments corresponding to the LBA range #0. The L2P fragment (#0) 711-00 is address translation information corresponding to a first small LBA range among four small LBA ranges obtained by dividing the LBA range #0. The L2P fragment (#1) 711-01 is address translation information corresponding to a second small LBA range among the four small LBA ranges. The L2P fragment (#2) 711-02 is address translation information corresponding to a third small LBA range among the four small LBA ranges. The L2P fragment (#3) 711-03 is address translation information corresponding to a last small LBA range among the four small LBA ranges.

The L2P table 71 includes L2P fragments (#0) 711-10, L2P fragment (#1) 711-11, L2P fragment (#2) 711-12, and L2P fragment (#3) 711-13 as a set of L2P fragments corresponding to the LBA range #1.

The L2P table 71 includes L2P fragments (#0) 711-20, L2P fragments (#1) 711-21, L2P fragments (#2) 711-22, and L2P fragments (#3) 711-23 as a set of L2P fragments corresponding to the LBA range #2.

In addition, the L2P table 71 includes L2P fragments (#0) 711-n0, L2P fragments (#1) 711-n1, L2P fragments (#2) 711-n2, and L2P fragments (#3) 711-n3 as a set of L2P fragments corresponding to the LBA range #n.

The shortcut table 710 includes pointers in the same number as the total number of L2P fragments included in the L2P table 71. Each of these pointers indicates a memory address of a memory area in the DRAM 7 in which the L2P fragment corresponding to the pointer is stored.

The L2P table 62 of the NAND memory 6 stores information used to back up the address translation information of each table area of the L2P table 71. When the time difference duplication is executed for each table area, the L2P table 62 is stored in 2×(n+1) L2P flash blocks respectively correlated with the LBA ranges #0 to #n (that is, the table areas T0 to Tn) in a one-to-two relationship. The L2P flash blocks (#00) 62-00 and (#01) 62-01 are blocks corresponding to the LBA range #0. The L2P flash blocks (#10) 62-10 and (#11) 62-11 are blocks corresponding to the LBA range #1. The L2P flash blocks (#20) 62-20 and (#21) 62-21 are blocks corresponding to the LBA range #2. In addition, the L2P flash blocks (#n0) 62-n0 and (#n1) 62-n1 are blocks corresponding to the LBA range #n.

FIG. 6 illustrates a case where two L2P flash blocks are allocated to one LBA range, that is, a case where the LBA range and the L2P flash block are correlated in a one-to-two relationship, but when time difference duplication is not executed, only one L2P flash block may be allocated to one LBA range. In this case, the LBA range and the L2P flash block are correlated with each other in a one-to-one manner. When the LBA range and the L2P flash block are correlated in a one-to-one manner, N pieces of address translation information of one table area are backed up by one L2P flash block.

The address translation information/update log saving processing of each of the table areas T0, T1, and T2 to Tn when the LBA range and the L2P flash block are correlated with each other in a one-to-one manner will be described.

Address Translation Information/Update Log Saving Processing of Table Area T0

The address translation information/update log saving processing of the table area T0 will be described. When the L2P flash block (#00) 62-00 is allocated to the table area T0, the controller 5 writes, for example, the L2P fragment (#1) 711-01, the L2P fragment (#2) 711-02, and the L2P fragment (#3) 711-03 into the page P0 of the L2P flash block (#00) 62-00.

After this, the controller 5 acquires the L2P fragment (#0) 711-00 from the table area T0. The controller 5 waits until the amount of the update logs accumulated in the log buffer 72-0 corresponding to the LBA range #0 reaches a threshold value. When the amount of the update logs accumulated in the log buffer 72-0 corresponding to the LBA range #0 reaches a threshold value, the controller 5 writes the acquired L2P fragment (#0) 711-00 and the update log (update log+0) stored in the log buffer 72-0 into the page P1 of the L2P flash block (#00) 62-00. When the update log (update log+0) stored in the log buffer 72-0 is written to the page P1, the log buffer 72-0 enters a free state in which the unsaved update log is not included. The L2P fragment (#0) 711-00 is previously acquired from the table area T0 before the update logs accumulated in the log buffer 72-0 are written into the page P1. Therefore, the update log+0 indicates the update content for all of the L2P fragment (#0) 711-00 to the L2P fragment (#3) 711-03 updated after the acquisition of the L2P fragment (#0) 711-00. For example, when the physical address associated with the LBAi among a predetermined number of LBAs corresponding to the L2P fragment (#0) 711-00 is updated from PBA10 to PBA20 and the physical address associated with the LBAj among a predetermined number of logical addresses corresponding to the L2P fragment (#1) 711-01 is updated from PBA30 to PBA40, the update log+0 includes a log which is update information indicating that the PBA20 is associated with the LBAi and a log which is update information indicating that the PBA40 is associated with the LBAj.

When the L2P fragment (#0) 711-00 and the update log+0 are written into the page P1 of the L2P flash block (#00) 62-00, the controller 5 acquires the L2P fragment (#1) 711-01 from the table area T0. The controller 5 waits until the amount of the update logs newly accumulated in the log buffer 72-0 corresponding to the LBA range #0 reaches the threshold value. When the amount of the update logs newly accumulated in the log buffer 72-0 corresponding to the LBA range #0 reaches a threshold value, the controller 5 writes the acquired L2P fragment (#1) 711-01 and the update log (update log+1) stored in the log buffer 72-0 into the page P2 of the L2P flash block (#00) 62-00. The L2P fragment (#1) 711-01 is previously acquired from the table area T0 before the update logs accumulated in the log buffer 72-0 are written into the page P2. Therefore, the update log+1 indicates the update content for all the L2P fragments of the table area T0 updated after the L2P fragment (#1) 711-01 is acquired.

When the L2P fragment (#1) 711-01 and the update log+1 are written into the page P2 of the L2P flash block (#00) 62-00, the controller 5 acquires the L2P fragment (#2) 711-02 from the table area T0. The controller 5 waits until the amount of the update logs newly accumulated in the log buffer 72-0 corresponding to the LBA range #0 reaches the threshold value. When the amount of the update logs newly accumulated in the log buffer 72-0 corresponding to the LBA range #0 reaches a threshold value, the controller 5 writes the acquired L2P fragment (#2) 711-02 and the update log (update log+2) stored in the log buffer 72-0 into the page P3 of the L2P flash block 62-0. The L2P fragment (#2) 711-02 is previously acquired from the table area T0 before the update logs accumulated in the log buffer 72-0 are written into the page P3. Therefore, the update log+2 indicates the update content for all the L2P fragments of the table area T0 updated after the acquisition of the L2P fragment (#2) 711-02.

When the L2P fragment (#2) 711-02 and the update log+2 are written into the page P3 of the L2P flash block (#00) 62-00, the controller 5 acquires the L2P fragment (#3) 711-03 from the table area T0. The controller 5 waits until the amount of the update logs newly accumulated in the log buffer 72-0 corresponding to the LBA range #0 reaches the threshold value. When the amount of the update logs newly accumulated in the log buffer 72-0 corresponding to the LBA range #0 reaches a threshold value, the controller 5 writes the acquired L2P fragment (#3) 711-03 and the update log (update log+3) stored in the log buffer 72-0 into the page P4 of the L2P flash block (#00) 62-00. The L2P fragment (#3) 711-03 is previously acquired from the table area T0 before the update logs accumulated in the log buffer 72-0 are written into the page P4. Therefore, the update log+3 indicates the update content for all the L2P fragments of the table area T0 updated after the acquisition of the L2P fragment (#3) 711-03.

When the L2P fragment (#3) 711-03 and the update log+3 are written into the page P4 of the L2P flash block (#00) 62-00, the controller 5 acquires the L2P fragment (#0) 711-00 from the table area T0. The controller 5 waits until the amount of the update logs newly accumulated in the log buffer 72-0 corresponding to the LBA range #0 reaches the threshold value. When the amount of the update logs newly accumulated in the log buffer 72-0 corresponding to the LBA range #0 reaches a threshold value, the controller 5 writes the acquired L2P fragment (#0) 711-00 and the update log (update log+4) stored in the log buffer 72-0 into the page P5 of the L2P flash block (#00) 62-00. The L2P fragment (#0) 711-00 is previously acquired from the table area T0 before the update logs accumulated in the log buffer 72-0 are written into the page P5. Therefore, the update log+4 indicates the update content for all the L2P fragments of the table area T0 updated after the acquisition of the L2P fragment (#0) 711-00.

When the L2P fragment (#0) 711-00 and the update log+4 are written into the page P5 of the L2P flash block (#00) 62-00, the controller 5 acquires the L2P fragment (#1) 711-01 from the table area T0. The controller 5 waits until the amount of the update logs newly accumulated in the log buffer 72-0 corresponding to the LBA range #0 reaches the threshold value.

Here, it is assumed that the first unexpected power loss occurs. A timing at which the first unexpected power loss occurs is referred to as a first timing.

The controller 5 determines whether a new unsaved update log that is not yet saved in the L2P flash block (#00) 62-00 is stored in the log buffer 72-0. When a new unsaved update log that is not yet stored in the L2P flash block (#00) 62-00 is stored in the log buffer 72-0, the controller 5 writes the acquired L2P fragment (#1) 711-01 and the update log (update log+5) stored in the log buffer 72-0 into the page P6 of the L2P flash block (#00) 62-00. The controller 5 writes the lost LBA list corresponding to the LBA range #0 into the page P7 of the L2P flash block (#00) 62-00. The lost LBA list corresponding to the LBA range #0 is a list of LBAs corresponding to the write data lost because of the unexpected power loss among the write data to be written into LBA range #0.

In this way, the controller 5 writes the L2P fragment and the update log to the L2P flash block (#00) 62-00 in accordance with the amount of the update logs accumulated in the log buffer 72-0. In addition, when an unexpected power loss occurs, the controller 5 writes the update log and the L2P fragment into the L2P flash block (#00) 62-00 regardless of the amount of the update logs accumulated in the log buffer 72-0. As a result, it is possible to prevent the update logs accumulated in the log buffer 72-0 from being lost. Further, when an unexpected power loss occurs, the controller 5 writes the lost LBA list into the L2P flash block (#00) 62-00. As a result, the controller 5 can record each of the LBAs of the write data lost because of the unexpected power loss among the write data to be written into the LBA range #0 into the L2P flash block (#00) 62-00 without the writing into the NAND memory 6 being completed. When the shutdown (graceful shutdown) processing is executed, the controller 5 may wait until the amount of the update logs accumulated in the log buffer 72-0 reaches a threshold value, and when the amount of the update logs accumulated in the log buffer 72-0 reaches the threshold value, the controller 5 may write the update logs and the L2P fragment into the L2P flash block (#00) 62-00. When a predetermined time elapses after the reception of the power supply shutdown advance notification, and the amount of the update logs accumulated in the log buffer 72-0 does not reach the threshold value, the controller 5 may write the update logs and the L2P fragment into the L2P flash block (#00) 62-00 regardless of the amount of the update logs accumulated in the log buffer 72-0. In the shutdown (graceful shutdown) processing, the processing of writing the lost LBA list corresponding to the LBA range #0 into the page P7 of the L2P flash block (#00) 62-00 is not executed.

When the power to the SSD is restored, the SSD 3 starts to operate again. A timing at which the SSD 3 starts to operate again after the first unexpected power loss occurs is referred to as a second timing.

After the power to the SSD 3 is restored and the SSD 3 starts to operate again, the controller 5 acquires the L2P fragment (#2) 711-02 from the table area T0. The controller 5 waits until the amount of the update logs newly accumulated in the log buffer 72-0 corresponding to the LBA range #0 reaches the threshold value. When the amount of the update logs newly accumulated in the log buffer 72-0 corresponding to the LBA range #0 reaches a threshold value, the controller 5 writes the acquired L2P fragment (#2) 711-02 and the update log (update log+6) stored in the log buffer 72-0 into the page P8 of the L2P flash block (#00) 62-00.

When the L2P fragment (#2) 711-02 and the update log+6 are written into the page P8 of the L2P flash block (#00) 62-00, the controller 5 acquires the L2P fragment (#3) 711-03 from the table area T0. The controller 5 waits until the amount of the update logs newly accumulated in the log buffer 72-0 corresponding to the LBA range #0 reaches the threshold value. When the amount of the update logs newly accumulated in the log buffer 72-0 corresponding to the LBA range #0 reaches a threshold value, the controller 5 writes the acquired L2P fragment (#3) 711-03 and the update log (update log+7) stored in the log buffer 72-0 into the page P9 of the L2P flash block (#00) 62-00.

When the L2P fragment (#3) 711-03 and the update log+7 are written into the page P9 of the L2P flash block (#00) 62-00, the controller 5 acquires the L2P fragment (#0) 711-00 from the table area T0. The controller 5 waits until the amount of the update logs newly accumulated in the log buffer 72-0 corresponding to the LBA range #0 reaches the threshold value.

Here, it is assumed that a second unexpected power loss occurs. A timing at which the second unexpected power loss occurs is referred to as a third timing.

The controller 5 determines whether a new update log that is not yet saved in the L2P flash block (#00) 62-00 is stored in the log buffer 72-0. When a new update log that is not yet stored in the L2P flash block (#00) 62-00 is stored in the log buffer 72-0, the controller 5 writes the acquired L2P fragment (#0) 711-00 and the update log (update log+8) stored in the log buffer 72-0 into the page P10 of the L2P flash block (#00) 62-00. The controller 5 writes the lost LBA list corresponding to the LBA range #0 into the page P11 of the L2P flash block (#00) 62-00.

When the power to the SSD is restored, the SSD 3 starts to operate again. A timing at which the SSD 3 starts to operate again after the second unexpected power loss occurs is referred to as a fourth timing.

After the power to the SSD 3 is restored and the SSD 3 starts to operate again, the controller 5 acquires the L2P fragment (#1) 711-01 from the table area T0. The controller 5 waits until the amount of the update logs newly accumulated in the log buffer 72-0 corresponding to the LBA range #0 reaches the threshold value. When the amount of the update logs newly accumulated in the log buffer 72-0 corresponding to the LBA range #0 reaches a threshold value, the controller 5 writes the acquired L2P fragment (#1) 711-01 and the update log (update log+9) stored in the log buffer 72-0 into the page P12 of the L2P flash block (#00) 62-00.

Then, the controller 5 writes the L2P fragment (#2) 711-02 and the update log (update log+10) into the page P13 of the L2P flash block (#00) 62-00 in the same manner as the operation described above. Then, the controller 5 writes the L2P fragment (#3) 711-03 and the update log (update log+11) into the page P14 of the L2P flash block (#00) 62-00.

Next, the address translation information/update log saving processing of table area T1 and T2 to Tn that is executed in parallel with the address translation information/update log saving processing of the table area T0 will be described in order.

Address Translation Information/Update Log Saving Processing of Table Area T1

First, the address translation information/update log saving processing of the table area T1 will be described. When the L2P flash block (#10) 62-10 is allocated to the table area T1, the controller 5 writes, for example, the L2P fragment (#1) 711-11, the L2P fragment (#2) 711-12, and the L2P fragment (#3) 711-13 into the page P0 of the L2P flash block (#10) 62-10.

After this, the controller 5 acquires the L2P fragment (#0) 711-10 from the table area T1. The controller 5 waits until the amount of the update logs accumulated in the log buffer 72-1 corresponding to the LBA range #1 reaches a threshold value. When the amount of the update logs accumulated in the log buffer 72-1 corresponding to the LBA range #1 reaches a threshold value, the controller 5 writes the acquired L2P fragment (#0) 711-10 and the update log (update log+0) stored in the log buffer 72-1 into the page P1 of the L2P flash block (#10) 62-10.

When the L2P fragment (#0) 711-10 and the update log+0 are written into the page P1 of the L2P flash block (#10) 62-10, the controller 5 acquires the L2P fragment (#1) 711-11 from the table area T1. The controller 5 waits until the amount of the update logs accumulated in the log buffer 72-1 corresponding to the LBA range #1 reaches a threshold value. When the amount of the update logs accumulated in the log buffer 72-1 reaches a threshold value, the controller 5 writes the acquired L2P fragment (#1) 711-11 and the update log (update log+1) stored in the log buffer 72-1 into the page P2 of the L2P flash block (#10) 62-10. When an amount of the address translation information to be updated of the table area T1 is less than an amount of the address translation information to be updated of the table area T0, the number of pairs of the L2P fragment and the update log to be written into the L2P flash block (#10) 62-10 is less than the number of pairs of the L2P fragment and the update log to be written into the L2P flash block (#00) 62-00.

When the first unexpected power loss at the above-described first timing occurs after the L2P fragment (#1) 711-11 and the update log+1 are written into the page P2 of the L2P flash block (#10) 62-10, when the new update log unsaved in the L2P flash block (#10) 62-10 is not stored in the log buffer 72-1 when the first unexpected power loss occurs, the controller 5 writes the lost LBA list corresponding to the LBA range #1 into the page P3 of the L2P flash block (#10) 62-10.

After the power to the SSD 3 is restored and the SSD 3 starts to operate again at the second timing described above, the controller 5 acquires the L2P fragment (#2) 711-12 from the table area T1. The controller 5 waits until the amount of the update logs newly accumulated in the log buffer 72-1 corresponding to the LBA range #1 reaches the threshold value. When the amount of the update logs newly accumulated in the log buffer 72-1 corresponding to the LBA range #1 reaches a threshold value, the controller 5 writes the acquired L2P fragment (#2) 711-12 and the update log (update log+2) stored in the log buffer 72-1 into the page P4 of the L2P flash block (#10) 62-10.

Then, in the same manner as the above operation, the controller 5 writes the L2P fragment (#3) 711-13 and the update log+3 into the page P5 of the L2P flash block (#10) 62-10. The controller 5 writes the L2P fragment (#0) 711-10 and the update log+4 into the page P6 of the L2P flash block (#10) 62-10.

Here, when the second unexpected power loss at the third timing described above occurs, the controller 5 writes the lost LBA list corresponding to the LBA range #1 into the page P7 of the L2P flash block (#10) 62-10. When the writing of all the write data to be written into the LBA range #1 is completed, the lost LBA list corresponding to the LBA range #1 is not present. The processing of writing the lost LBA list into the page P7 of the L2P flash block (#10) 62-10 is not executed.

Address Translation Information/Update Log Saving Processing of Table Area T2

Next, the address translation information/update log saving processing of the table area T2 will be described. When the L2P flash block (#20) 62-20 is allocated to the table area T2, the controller 5 writes the L2P fragment (#1) 711-21, the L2P fragment (#2) 711-22, and the L2P fragment (#3) 711-23 to the page P0 of the L2P flash block (#20) 62-20.

After this, the controller 5 acquires the L2P fragment (#0) 711-20 from the table area T2. The controller 5 waits until the amount of the update logs accumulated in the log buffer 72-2 corresponding to the LBA range #2 reaches a threshold value. When the amount of the update logs accumulated in the log buffer 72-2 corresponding to the LBA range #2 reaches a threshold value, the controller 5 writes the acquired L2P fragment (#0) 711-20 and the update log (update log+0) stored in the log buffer 72-2 into the page P1 of the L2P flash block (#20) 62-20.

When the L2P fragment (#0) 711-20 and the update log+0 are written into the page P1 of the L2P flash block (#20) 62-20, the controller 5 acquires the L2P fragment (#1) 711-21 from the table area T2. The controller 5 waits until the amount of the update logs accumulated in the log buffer 72-2 corresponding to the LBA range #2 reaches a threshold value. When the amount of the update logs accumulated in the log buffer 72-2 reaches a threshold value, the controller 5 writes the acquired L2P fragment (#1) 711-21 and the update log (update log+1) stored in the log buffer 72-2 to the page P2 of the L2P flash block (#20) 62-20.

When the first unexpected power loss occurs at the first timing described above after the L2P fragment (#1) 711-21 and the update log+1 are written into the page P2 of the L2P flash block (#20) 62-20, and when the update log unsaved in the L2P flash block (#20) 62-20 is not stored in the log buffer 72-2 when the first unexpected power loss occurs, the controller 5 writes the lost LBA list corresponding to the LBA range #2 in the page P3 of the L2P flash block (#20) 62-20.

After the power to the SSD 3 is restored and the SSD 3 starts to operate again at the second timing described above, the controller 5 acquires the L2P fragment (#2) 711-22 from the table area T2. The controller 5 waits until the amount of the update logs newly accumulated in the log buffer 72-2 corresponding to the LBA range #2 reaches the threshold value. When the amount of the update logs newly accumulated in the log buffer 72-2 corresponding to the LBA range #2 reaches a threshold value, the controller 5 writes the acquired L2P fragment (#2) 711-22 and the update log (update log+2) stored in the log buffer 72-2 into the page P4 of the L2P flash block (#20) 62-20.

Then, in the same manner as the above operation, the controller 5 writes the L2P fragment (#3) 711-23 and the update log+3 into the page P5 of the L2P flash block (#20) 62-20. The controller 5 writes the L2P fragment (#0) 711-20 and the update log+4 into the page P6 of the L2P flash block (#20) 62-20.

When the second unexpected power loss occurs at the third timing described above after the L2P fragment (#0) 711-20 and the update log+4 are written into the page P6 of the L2P flash block (#20) 62-20, and when the update log unsaved in the L2P flash block (#20) 62-20 is not stored in the log buffer 72-2 when the second unexpected power loss occurs, the controller 5 writes the lost LBA list corresponding to the LBA range #2 into the page P7 of the L2P flash block (#20) 62-20.

After the power to the SSD 3 is restored and the SSD 3 starts to operate again at the above-described fourth timing, the controller 5 writes the L2P fragment (#1) 711-21 and the update log+5 into the page P8 of the L2P flash block (#20) 62-20 in the same manner as the above-described operation. The controller 5 writes the L2P fragment (#2) 711-22 and the update log+6 into the page P9 of the L2P flash block (#20) 62-20. The controller 5 writes the L2P fragment (#3) 711-23 and the update log+7 into the page P10 of the L2P flash block (#20) 62-20.

Address Translation Information/Update Log Saving Processing of Table Area Tn

Next, the address translation information/update log saving processing of the table area Tn will be described. When the L2P flash block (#n0) 62-n0 is allocated to the table area Tn, the controller 5 writes, for example, the L2P fragment (#1) 711-n1, the L2P fragment (#2) 711-n2, and the L2P fragment (#3) 711-n3 into the page P0 of the L2P flash block (#n0) 62-n0.

Thereafter, the controller 5 executes processing of writing the L2P fragment (#0) 711-n0 and the update log+0 into the page P1 of the L2P flash block (#n0) 62-n0, processing of writing the L2P fragment (#1) 711-n1 and the update log+1 into the page P2 of the L2P flash block (#n0) 62-n0, processing of writing the L2P fragment (#2) 711-n2 and the update log+2 into the page P3 of the L2P flash block (#n0) 62-n0, processing of writing the L2P fragment (#3) 711-n3 and the update log+3 into the page P4 of the L2P flash block (#n0) 62-n0, processing of writing the L2P fragment (#0) 711-n0 and the update log+4 into the page P5 of the L2P flash block (#n0) 62-n0, and processing of writing the L2P fragment (#1) 711-n1 and the update log+5 into the page P6 of the L2P flash block (#n0) 62-n0, in the same procedure as the address translation information/update log saving processing of the table areas T0 to T2.

When the first unexpected power loss occurs at the first timing described above after the L2P fragment (#1) 711-n1 and the update log+5 are written into the page P6 of the L2P flash block (#n0) 62-n0, and when the update log unsaved in the L2P flash block (#n0) 62-n0 is not stored in the log buffer 72-n when the first unexpected power loss occurs, the controller 5 writes the lost LBA list corresponding to the LBA range #n into the page P7 of the L2P flash block (#n0) 62-n0.

After the power to the SSD 3 is restored and the SSD 3 starts to operate again at the second timing described above, the controller 5 writes the L2P fragment (#2) 711-n2 and the update log+6 into the page P8 of the L2P flash block (#n0) 62-n0.

When the second unexpected power loss occurs at the third timing described above after the L2P fragment (#2) 711-n2 and the update log+6 are written into the page P8 of the L2P flash block (#n0) 62-n0, and when the update log unsaved in the L2P flash block (#n0) 62-n0 is not stored in the log buffer 72-*n* when the second unexpected power loss occurs, the controller 5 writes the lost LBA list corresponding to the LBA range #n into the page P9 of the L2P flash block (#n0) 62-*n*0.

As described above, the saving processing of the address translation information/update log of each table area T0, T1, and T2 to Tn is executed.

Figure 7:
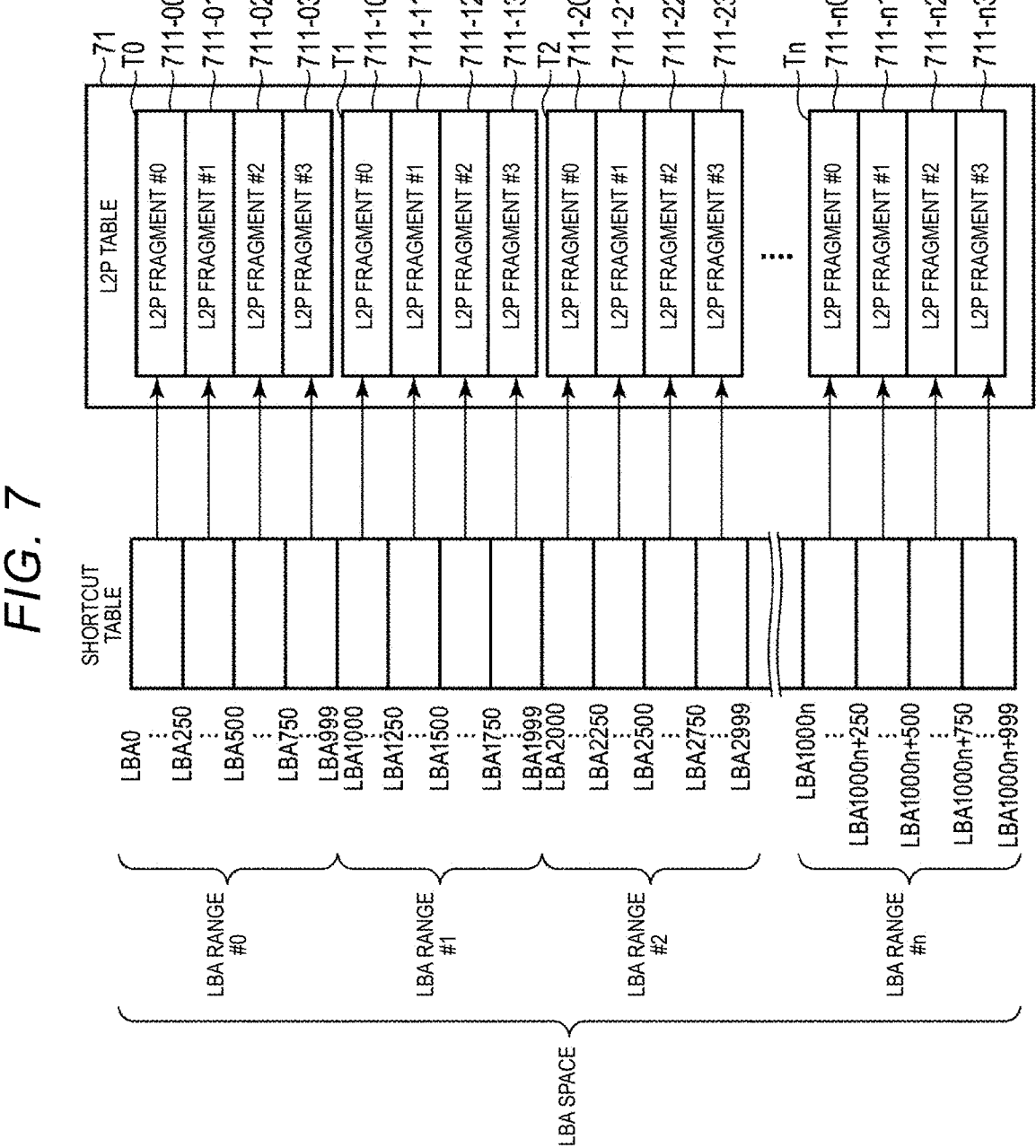
FIG. 7 is a diagram illustrating a configuration example showing a relationship between a plurality of LBA ranges and a plurality of table areas of the L2P table in the memory system according to the embodiment.

Next, a plurality of LBA ranges obtained by dividing a logical address space (LBA space) of the SSD 3 will be described. FIG. 7 is a diagram illustrating a configuration example showing a relationship between a plurality of LBA ranges and a plurality of table areas of the L2P table 71 in the memory system according to the embodiment.

Here, the LBA space of the SSD 3 is configured with 1000×(n+1) LBAs from LBA0 to LBA1000*n*+999. The LBA space is divided into n+1 LBA ranges. Each LBA range includes the same number of LBAs. One LBA range is configured with, for example, 1000 contiguous LBAs.

The LBA range #0 is configured with 1000 LBAs from LBA0 to LBA999. The LBA range #1 is configured with 1000 LBAs from LBA 1000 to LBA 1999. The LBA range #2 is configured with 1000 LBAs from LBA2000 to LBA2999. The LBA range #n is configured with 1000 LBAs from LBA1000*n* to LBA1000*n*+999.

The L2P table 71 includes a plurality of L2P fragments 711-00 to 711-*n*3. Each of the L2P fragments 711-00 to 711-*n*3 includes, for example, information indicating 250 physical addresses respectively corresponding to 250 contiguous LBAs as the address translation information.

The L2P fragment (#0) 711-00 includes information indicating 250 physical addresses respectively corresponding to 250 LBAs from LBA0 to LBA249 included in the LBA range #0. The memory address indicating the storage area of the DRAM 7 in which the L2P fragment (#0) 711-00 is stored is stored in the entry corresponding to the LBAs from LBA0 to LBA249 in the shortcut table 710.

The L2P fragment (#1) 711-01 includes information indicating 250 physical addresses respectively corresponding to 250 LBAs from LBA250 to LBA499 included in the LBA range #0. The memory address indicating the storage area of the DRAM 7 in which the L2P fragment (#1) 711-01 is stored is stored in the entry corresponding to the LBAs from LBA250 to LBA499 in the shortcut table 710.

The L2P fragment (#2) 711-02 includes information indicating 250 physical addresses respectively corresponding to 250 LBAs from LBA500 to LBA749 included in the LBA range #0. The memory address indicating the storage area of the DRAM 7 in which the L2P fragment (#2) 711-02 is stored is stored in the entry corresponding to the LBAs from LBA500 to LBA749 in the shortcut table 710.

The L2P fragment (#3) 711-03 includes information indicating 250 physical addresses respectively corresponding to the 250 LBAs from LBA750 to LBA999 included in the LBA range #0. The memory address indicating the storage area of the DRAM 7 in which the L2P fragment (#3) 711-03 is stored is stored in the entry corresponding to the LBAs from 750 to 999 in the shortcut table 710.

The L2P fragment (#0) 711-10 includes information indicating 250 physical addresses respectively corresponding to 250 LBAs from LBA1000 to LBA1249 included in the LBA range #1. The memory address indicating the storage area of the DRAM 7 in which the L2P fragment (#0) 711-10 is stored is stored in the entry corresponding to the LBAs from 1000 to 1249 in the shortcut table 710.

The L2P fragment (#1) 711-11 includes information indicating 250 physical addresses respectively corresponding to 250 LBAs from LBA1250 to LBA1499 included in the LBA range #1. The memory address indicating the storage area of the DRAM 7 in which the L2P fragment (#1) 711-11 is stored is stored in the entry corresponding to the LBAs from LBA1250 to LBA1499 in the shortcut table 710.

The L2P fragment (#2) 711-12 includes information indicating 250 physical addresses respectively corresponding to 250 LBAs from LBA1500 to LBA1749 included in the LBA range #1. The memory address indicating the storage area of the DRAM 7 in which the L2P fragment (#2) 711-12 is stored is stored in the entry corresponding to the LBAs from LBA1500 to LBA1749 in the shortcut table 710.

The L2P fragment (#3) 711-13 includes information indicating 250 physical addresses respectively corresponding to 250 LBAs from LBA1750 to LBA1999 included in the LBA range #1. The memory address indicating the storage area of the DRAM 7 in which the L2P fragment (#3) 711-13 is stored is stored in the entry corresponding to the LBAs from LBA1750 to LBA1999 in the shortcut table 710.

The L2P fragment (#0) 711-20 includes information indicating 250 physical addresses respectively corresponding to 250 LBAs from LBA2000 to LBA2249 included in the LBA range #2. The memory address indicating the storage area of the DRAM 7 in which the L2P fragment (#0) 711-20 is stored is stored in the entry corresponding to the LBAs from 2000 to 2249 in the shortcut table 710.

The L2P fragment (#1) 711-21 includes information indicating 250 physical addresses respectively corresponding to 250 LBAs from LBA2250 to LBA2499 included in the LBA range #2. The memory address indicating the storage area of the DRAM 7 in which the L2P fragment (#1) 711-21 is stored is stored in the entry corresponding to the LBAs from LBA2250 to LBA2499 in the shortcut table 710.

The L2P fragment (#2) 711-22 includes information indicating 250 physical addresses respectively corresponding to 250 LBAs from LBA2500 to LBA2749 included in the LBA range #2. The memory address indicating the storage area of the DRAM 7 in which the L2P fragment (#2) 711-22 is stored is stored in the entry corresponding to the LBAs from LBA2500 to LBA2749 in the shortcut table 710.

The L2P fragment (#3) 711-23 includes information indicating 250 physical addresses respectively corresponding to 250 LBAs from LBA2750 to LBA2999 included in the LBA range #2. The memory address indicating the storage area of the DRAM 7 in which the L2P fragment (#3) 711-23 is stored is stored in the entry corresponding to the LBAs from LBA2750 to LBA2999 in the shortcut table 710.

The L2P fragment (#0) 711-*n*0 includes information indicating 250 physical addresses respectively corresponding to 250 LBAs from the LBA1000*n* to the LBA1000*n*+249 included in the LBA range #n. The memory address indicating the storage area of the DRAM 7 in which the L2P fragment (#0) 711-*n*0 is stored is stored in the entry corresponding to the LBAs from LBA1000*n* to LBA1000*n*+249 in the shortcut table 710.

The L2P fragment (#1) 711-*n*1 includes information indicating 250 physical addresses respectively corresponding to 250 LBAs from LBA250 to LBA1000*n*+499 included in the LBA range #n. The memory address indicating the storage area of the DRAM 7 in which the L2P fragment (#1) 711-*n*1 is stored is stored in the entry corresponding to the LBAs from LBA1000*n*+250 to LBA1000*n*+499 in the shortcut table 710.

The L2P fragment (#2) 711-*n*2 includes information indicating 250 physical addresses respectively corresponding to 250 LBAs from LBA1000*n*+500 to LBA1000*n*+749 included in the LBA range #n. The memory address of the DRAM 7 indicating the storage area in which the L2P fragment (#2) 711-n2 is stored is stored in the entry corresponding to the LBAs from LBA1000n+500 to LBA1000n+749 in the shortcut table 710.

The L2P fragment (#3) 711-n3 includes information indicating 250 physical addresses respectively corresponding to 250 LBAs from LBA1000n+750 to LBA1000n+999 included in the LBA range #n. The memory address indicating the storage area of the DRAM 7 in which the L2P fragment (#3) 711-n3 is stored is stored in the entry corresponding to the LBAs from LBA1000n+750 to LBA1000n+999 in the shortcut table 710.

Figure 8:
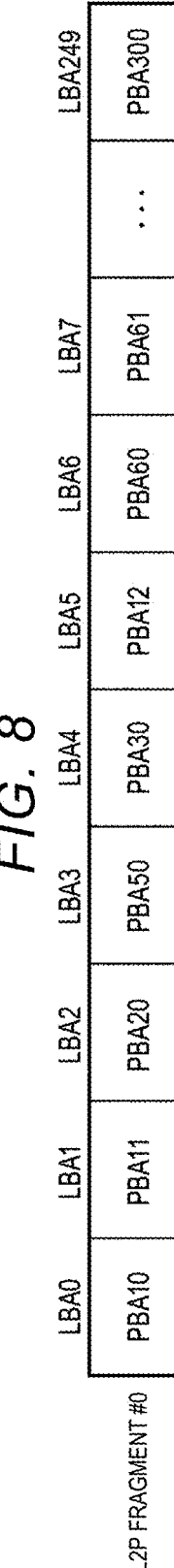
FIG. 8 is a diagram illustrating a configuration example of each of the plurality of L2P fragments stored in the L2P table used in the memory system according to the embodiment.

Next, the L2P fragment will be described. FIG. 8 is a diagram illustrating an example of an L2P fragment used in the memory system according to the embodiment. In FIG. 8, an L2P fragment (#0) 711-00 is shown.

The L2P fragment (#0) 711-00 includes information indicating 250 physical addresses respectively corresponding to the 250 LBAs from LBA 0 to LBA 249.

The first entry of the L2P fragment (#0) 711-00 stores information indicating the physical address PBA10 corresponding to LBA0. The second entry of the L2P fragment (#0) 711-00 stores information indicating the physical address PBA11 corresponding to the LBA1. The third entry of the L2P fragment (#0) 711-00 stores information indicating the physical address PBA20 corresponding to LBA2. The fourth entry of the L2P fragment (#0) 711-00 stores information indicating the physical address PBA50 corresponding to the LBA3. The fifth entry of the L2P fragment (#0) 711-00 stores information indicating the physical address PBA30 corresponding to LBA4. Similarly, the 250th entry of the L2P fragment (#0) 711-00 stores information indicating the physical address PBA300 corresponding to LBA249. A value indicating that an error (data error that cannot be corrected) occurs is stored in an entry in which an LBA corresponding to the lost data is correlated, instead of the PBA.

Figure 9:
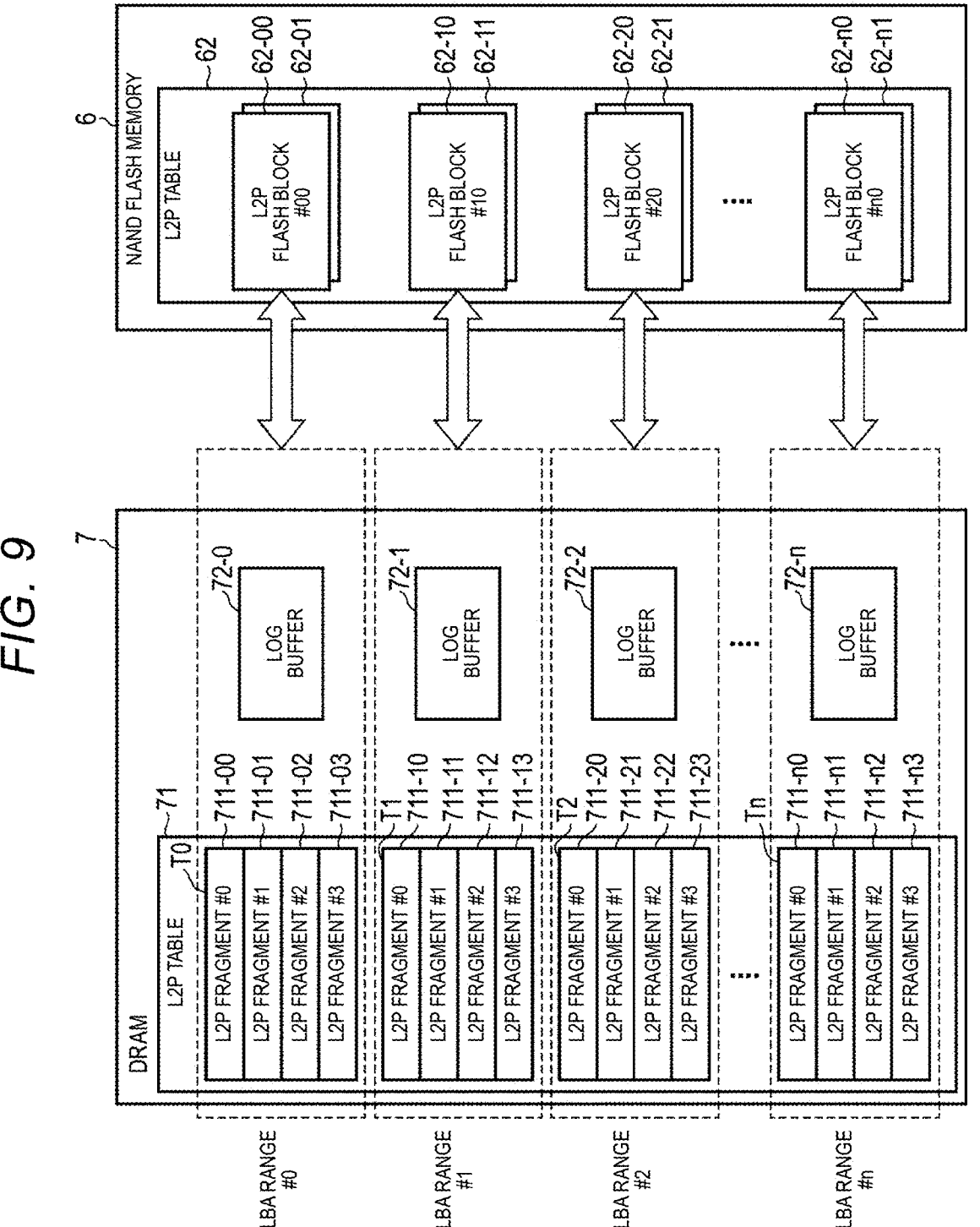
FIG. 9 is a diagram illustrating a configuration example showing a relationship between a plurality of LBA ranges, a plurality of table areas of the L2P table, a plurality of log buffers, and a plurality of L2P flash blocks in the memory system according to the embodiment.

Next, a relationship between a table area, a log buffer, and an L2P table will be described. FIG. 9 is a diagram illustrating a configuration example showing a relationship between a plurality of LBA ranges, a plurality of table areas of the L2P table 71, a plurality of log buffers, and a plurality of L2P flash blocks in the memory system according to the embodiment.

The log buffer 72-0, and the L2P flash block (#00) 62-00 and the L2P flash block (#01) 62-01 of the L2P table 62 are correlated with the table area T0 (L2P fragments (#0 to #3) 711-00 to 711-03) of the L2P table 71 corresponding to the LBA range #0.

The log buffer 72-1, and the L2P flash block (#10) 62-10 and the L2P flash block (#11) 62-11 of the L2P table 62 are correlated with the table area T1 (L2P fragments (#0 to #3) 711-10 to 711-13) of the L2P table 71 corresponding to the LBA range #1.

The log buffer 72-2, and the L2P flash block (#20) 62-20 and the L2P flash block (#21) 62-21 of the L2P table 62 are correlated with the table area T2 (L2P fragments (#0 to #3) 711-20 to 711-23) of the L2P table 71 corresponding to the LBA range #2.

The log buffer 72-n, and the L2P flash block (#n0) 62-n0 and the L2P flash block (#n1) 62-n1 of the L2P table 62 are correlated with the table area Tn (L2P fragments (#0 to #3) 711-n0 to 711-n3) of the L2P table 71 corresponding to the LBA range #n.

When the address translation information for a certain LBA included in the LBA range #0 is updated, the controller 5 stores the update log related to this update in the log buffer 72-0. When the amount of the update logs accumulated in the log buffer 72-0 reaches a threshold value, the controller 5 writes one of the L2P fragments (#0) 711-00, the L2P fragment (#1) 711-01, the L2P fragment (#2) 711-02, and the L2P fragment (#3) 711-03 of the L2P table 71 and the update logs accumulated in the log buffer 72-0 into the L2P flash block (#00) 62-00 and the L2P flash block (#01) 62-01. In this case, in the time difference duplication processing, fragments different from each other are written into the L2P flash block (#00) 62-00 and the L2P flash block (#01) 62-01. The same update log is written to the L2P flash block (#00) 62-00 and the L2P flash block (#01) 62-01. When the L2P flash block (#00) 62-00 or the L2P flash block (#01) 62-01 is full, the controller 5 selects a new flash block of the NAND memory 6 and allocates the selected flash block as an L2P flash block corresponding to the LBA range #0. The controller 5 writes the next L2P fragment and the update log to the new L2P flash block. When the pair of the L2P fragment (#0) 711-00 and the update log, the pair of the L2P fragment (#1) 711-01 and the update log, the pair of the L2P fragment (#2) 711-02 and the update log, and the pair of the L2P fragment (#3) 711-03 and the update log are aligned in a new L2P flash block, the controller 5 releases the allocation of the original L2P flash block (#00) 62-00 or the original L2P flash block (#01) 62-01 to the LBA range #0. This is because, only the information stored in the new L2P flash block is used to reconstruct the L2P fragment (#0) 711-00, the L2P fragment (#1) 711-01, the L2P fragment (#2) 711-02, and the L2P fragment (#3) 711-03 of the table area T0 of the L2P table 71.

When the address translation information for a certain LBA included in the LBA range #1 is updated, the controller 5 stores the update log related to this update in the log buffer 72-1. When the amount of the update logs accumulated in the log buffer 72-1 reaches a threshold value, the controller 5 writes one of the L2P fragments (#0) 711-10, the L2P fragment (#1) 711-11, the L2P fragment (#2) 711-12, and the L2P fragment (#3) 711-13 of the L2P table 71 and the update logs accumulated in the log buffer 72-1 into the L2P flash block (#10) 62-10 and the L2P flash block (#11) 62-11. When the L2P flash block (#10) 62-10 or the L2P flash block (#11) 62-11 is full, the controller 5 selects a new flash block of the NAND memory 6 and allocates the selected flash block as an L2P flash block corresponding to the LBA range #1. The controller 5 writes the next L2P fragment and the update log to the new L2P flash block. When the pair of the L2P fragment (#0) 711-10 and the update log, the pair of the L2P fragment (#1) 711-11 and the update log, the pair of the L2P fragment (#2) 711-12 and the update log, and the pair of the L2P fragment (#3) 711-13 and the update log are aligned in a new L2P flash block, the controller 5 releases the allocation of the original L2P flash block (#10) 62-10 or the original L2P flash block (#11) 62-11 to the LBA range #1.

When the address translation information for the LBA included in the LBA range #2 is updated, the controller 5 stores the update log related to the update in the log buffer 72-2. When the amount of the update logs accumulated in the log buffer 72-2 reaches a threshold value, the controller 5 writes one of the L2P fragments (#0) 711-20, the L2P fragment (#1) 711-21, the L2P fragment (#2) 711-22, and the L2P fragment (#3) 711-23 of the L2P table 71 and the update logs accumulated in the log buffer 72-2 into the L2P flash block (#20) 62-20 and the L2P flash block (#21) 62-21. When the L2P flash block (#20) 62-20 or the L2P flash block (#21) 62-21 is full, the controller 5 selects a new flash block of the NAND memory 6 and allocates the selected flash block as an L2P flash block corresponding to the LBA range

2. The controller 5 writes the next L2P fragment and the update log to the new L2P flash block. When the pair of the L2P fragment (#0) 711-20 and the update log, the pair of the L2P fragment (#1) 711-21 and the update log, the pair of the L2P fragment (#2) 711-22 and the update log, and the pair of the L2P fragment (#3) 711-23 and the update log are aligned in a new L2P flash block, the controller 5 releases the allocation of the original L2P flash block (#20) 62-20 or the original L2P flash block (#21) 62-21 to the LBA range #2.

Further, when the address translation information related to the LBA included in the LBA range #n is updated, the controller 5 stores the update log related to this update in the log buffer 72-*n*. When the amount of the update logs accumulated in the log buffer 72-*n* reaches a threshold value, the controller 5 writes one L2P fragment of the L2P fragment (#0) 711-*n*0, the L2P fragment (#1) 711-*n*1, the L2P fragment (#2) 711-*n*2, and the L2P fragment (#3) 711-*n*3 of the L2P table 71 and the update logs accumulated in the log buffer 72-*n* into the L2P flash block (#n0) 62-*n*0 and the L2P flash block (#n1) 62-*n*1. When the L2P flash block (#n0) 62-*n*0 or the L2P flash block (#n1) 62-*n*1 is full, the controller 5 selects a new flash block of the NAND memory 6 and allocates the selected flash block as an L2P flash block corresponding to the LBA range #n. The controller 5 writes the next L2P fragment and the update log to the new L2P flash block. When the pair of the L2P fragment (#0) 711-*n*0 and the update log, the pair of the L2P fragment (#1) 711-*n*1 and the update log, the pair of the L2P fragment (#2) 711-*n*2 and the update log, and the pair of the L2P fragment (#3) 711-*n*3 and the update log are aligned in a new L2P flash block, the controller 5 releases the allocation of the original L2P flash block (#n0) 62-*n*0 or the original L2P flash block (#n1) 62-*n*1 to the LBA range #n.

Figure 10:
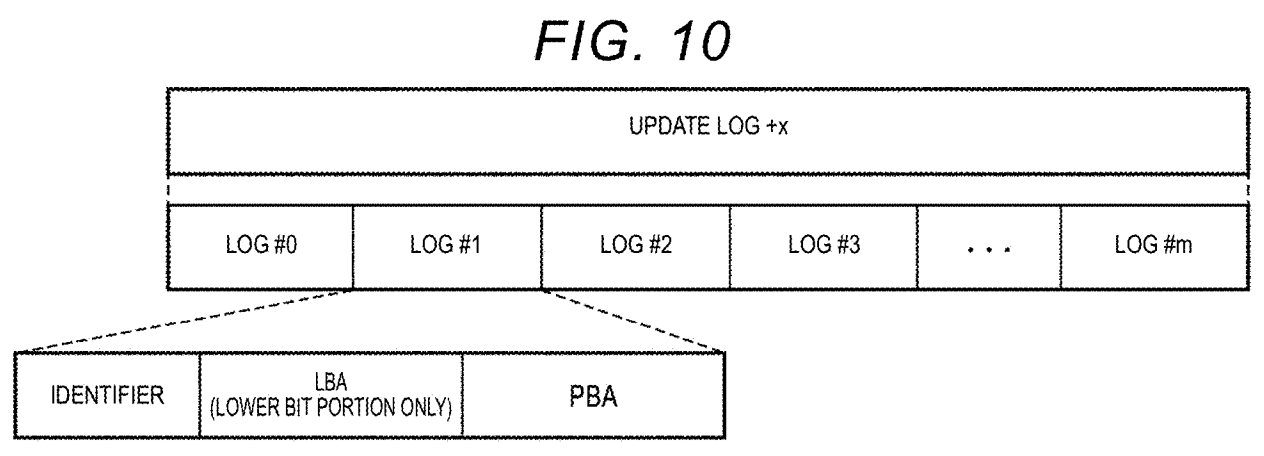

Next, a first example of the update log will be described. FIG. 10 is a diagram illustrating a first example of the update log in the memory system according to the embodiment.

The update log+x in FIG. 10 includes, for example, m+1 logs (log #0, log #1, . . . , log #m). In the following, it is assumed that the update log+x is an update log written into the L2P flash block (#00) 62-00 and the L2P flash block (#01) 62-01 corresponding to the LBA range #0.

Each of the log #0, the log #1, . . . , and the log #m includes an identifier indicating a format of a log, an LBA corresponding to the data, and a PBA indicating a storage location in the NAND memory 6 determined as a data write destination, for each data to be written into the LBA range #0.

For example, the identifier included in the log #1 indicates that the log #1 is a first format including a pair of LBA and PBA as shown in FIG. 10. The log of the first format is one of a first type log. The first type log is stored in the log buffer 72-0 when the table area T0 of the L2P table 71 is updated by writing data into the NAND memory 6 based on the write command received from the host 2. The first type log includes an LBA corresponding to data written into the NAND memory 6 and a PBA indicating a storage location of the NAND memory 6 determined as a data write destination.

For example, the LBA included in the log #1 indicates a logical address of data to be written into the LBA range #0. The LBA included in the log #1 is only a lower bit portion within a bit length required to represent each LBA. The LBA included in any log of the log #0, the log #1, . . . , or the log #m is included in the LBA range #0. Therefore, the upper bit portion for specifying the LBA range #0 is unnecessary.

The PBA included in log #1 indicates a physical address newly mapped to the LBA included in log #1. That is, the PBA included in the log #1 is a physical address indicating a storage location in the NAND memory 6 determined as a data write destination corresponding to the LBA included in the log #1.

Figure 11:
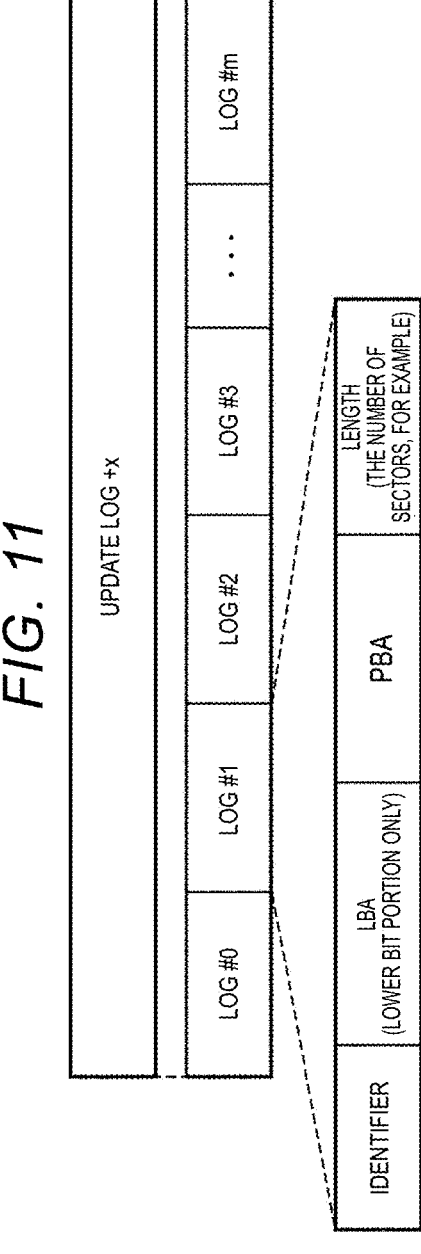
FIG. 11 is a diagram illustrating a second example of the update log in the memory system according to the embodiment.

Next, a second example of the update log will be described. FIG. 11 is a diagram illustrating a second example of the update log in the memory system according to the embodiment.

The update log+x in FIG. 11 is an update log written into the L2P flash block (#00) 62-00 and the L2P flash block (#01) 62-01 corresponding to the LBA range #0.

Each of the log #0, the log #1, . . . , and the log #m includes an identifier indicating a type of a log, an LBA corresponding to the data, a PBA indicating a storage location in the NAND memory 6 determined as a data write destination, and information indicating the length of the data (data size), for each data to be written into the LBA range #0. The identifier included in the log #1 indicates that the log #1 is a second format including the LBA, the PBA, and the length as shown in FIG. 11. The log of the second format is also one of the first type logs. The length (data size) is represented by the number of sectors, for example. When data having a size of a plurality of sectors is written into the NAND memory 6 relatively frequently, by using the format of the update log+x in FIG. 11, it is possible to store address translation information corresponding to a larger number of LBAs in one update log+x as compared with a case where the format of the update log+x in FIG. 10 is used.

Next, a third example of the update log will be described. FIG. 12 is a diagram illustrating a third example of update log in the memory system according to the embodiment.

The update log+x in FIG. 12 is an update log written into the L2P flash block (#00) 62-00 and the L2P flash block (#01) 62-01 corresponding to the LBA range #0.

Here, it is assumed that the log #1 among the plurality of logs included in the update log+x is a second type log. The second type log is a log stored in the log buffer 72-0 when the table area T0 of the L2P table 71 is updated by data copy from the copy source storage location to the copy destination storage location of the NAND memory 6 in the garbage collection.

At this time, the log #1 includes an identifier indicating a format of this log, an LBA corresponding to the copied data, a new physical address (new PBA) indicating a copy destination storage location, information indicating a length of this data (data size), and an old physical address (old PBA) indicating a copy source storage location.

The identifier included in the log #1 indicates that the log #1 is a third format including at least an LBA, a new PBA, and an old PBA as shown in FIG. 12. The log of the third format is treated as a second type log.

The LBA included in the log #1 indicates a logical address of data copied in the LBA range #0. The LBA included in the log #1 is only a lower bit portion within a bit length required to represent each LBA, as in the LBA included in the log of the first format. The LBA included in any log of the log #0, the log #1, . . . , or the log #m is included in the LBA range #0. Therefore, the upper bit portion for specifying the LBA range #0 is unnecessary.

The new PBA included in log #1 indicates a physical address newly mapped to the LBA included in log #1. That is, the new PBA included in the log #1 is a physical address indicating a storage location of the NAND memory 6 determined as a data copy destination corresponding to the LBA included in the log #1.

A length of the data included in the log #1 is represented by the number of sectors, for example.

The old PBA included in the log #1 indicates a physical address mapped to the LBA included in the log #1 before being mapped to the new PBA. That is, the old PBA included in the log #1 is a physical address indicating a storage location of copy destination in NAND memory 6, in which the data corresponding to the LBA included in the log #1 is stored.

Figure 13:
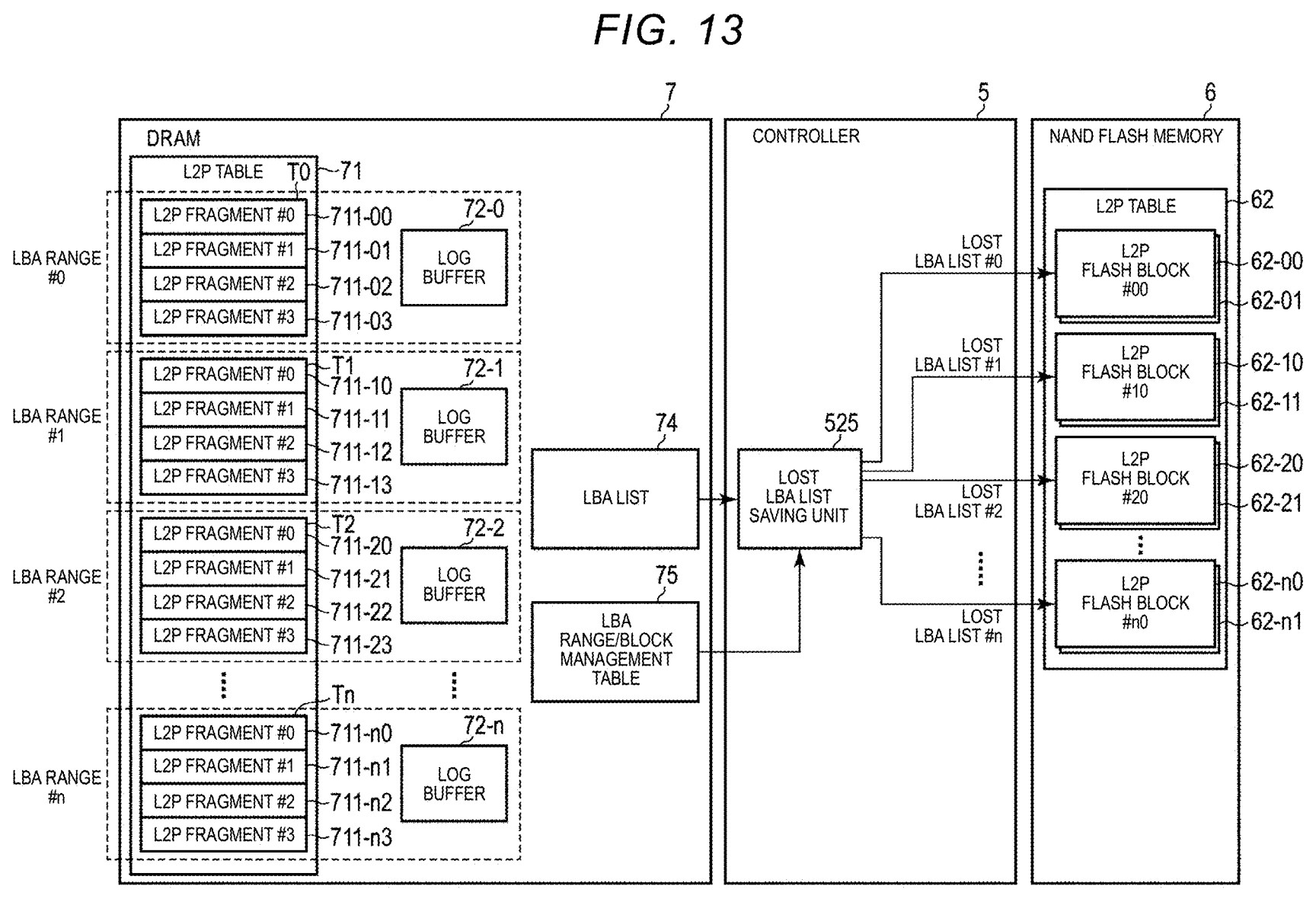

Next, processing of saving the lost LBA list will be described. FIG. 13 is a diagram illustrating an example of lost LBA list saving processing of the memory system according to the embodiment.

When an unexpected power loss occurs in the SSD 3, the power supply circuit 8 supplies the power stored in the capacitor 81 to each element of the SSD 3. Further, the power supply circuit 8 notifies the controller 5 that an unexpected power loss has occurred. The controller 5 starts processing of saving the PLP target data stored in the DRAM 7 in the NAND memory 6. The PLP target data includes, for example, a list of LBAs corresponding to write data for which writing to the L2P table 71 and the NAND memory 6 has not completed. The lost LBA list saving unit 525 acquires a list of LBAs corresponding to the write data for which writing to the NAND memory 6 has not completed from the LBA list 74 of the DRAM 7. The write data for which writing has not completed is data lost because of unexpected power loss.

The lost LBA list saving unit 525 generates lost LBA lists #0 to #n respectively corresponding to the LBA ranges #0 to #n based on the acquired list of LBAs. The lost LBA list #0 is a list indicating a set of LBAs corresponding to write data lost because of unexpected power loss among write data to be written into the LBA range #0. The lost LBA list #1 is a list indicating a set of LBAs corresponding to write data lost because of unexpected power loss among write data to be written into the LBA range #1. In addition, the lost LBA list #n is a list indicating a set of LBAs corresponding to write data lost because of unexpected power loss among write data to be written into the LBA range #n. In this case, the lost LBA list saving unit 525 stores, among the LBAs stored in the LBA list 74, a set of LBAs belonging to the LBA range #0 in the lost LBA list #0, stores a set of LBAs belonging to the LBA range #1 in the lost LBA list #1, stores a set of LBAs belonging to the LBA range #2 in the lost LBA list #2, and stores a set of LBAs belonging to the LBA range #n in the lost LBA list #n.

The lost LBA list saving unit 525 refers to the LBA range/block management table 75 to specify the L2P flash blocks (#00) 62-00 to (#n1) 62-n1 respectively allocated to the LBA ranges #0 to #n. The lost LBA list saving unit 525 writes the lost LBA list #0 into the L2P flash block (#00) 62-00 and the L2P flash block (#01) 62-01, writes the lost LBA list #1 into the L2P flash block (#10) 62-10 and the L2P flash block (#11) 62-11, writes the lost LBA list #2 into the L2P flash block (#20) 62-20 and the L2P flash block (#21) 62-21, and writes the lost LBA list #n into the L2P flash block (#n0) 62-n0 and the L2P flash block (#n1) 62-n1.

Thereby, the controller 5 uses the power stored in the capacitor 81 to respectively save the lost LBA lists #0 to #n in the L2P flash blocks (#00) 62-00 to L2P flash blocks (#n1) 62-n1.

Next, a configuration example of two L2P flash blocks correlated with each of the table areas included in the L2P table 71 will be described. FIGS. 14A and 14B are diagrams illustrating a first configuration example in which backup data of the L2P table used in the memory system according to the embodiment is duplicated. In FIGS. 14A and 14B, the primary L2P flash block (Primary L2P FB) (#00) 62-00 and the secondary L2P flash block (Secondary L2P FB) (#01) 62-01 are correlated with the table area T0 of the L2P table 62.

FIG. 14A shows pages P0 to P7 of the primary L2P flash block (#00) 62-00. In addition, FIG. 14B shows the pages P0 to P7 of the secondary L2P flash block (#01) 62-01.

The page P0 of the primary L2P flash block (#00) 62-00 stores the L2P fragment #0 and the update log+0. In addition, the page P0 of the secondary L2P flash block (#01) 62-01 stores the L2P fragments #0 to #2.

The controller 5 acquires the L2P fragments #1 and #3 from the DRAM 7. An update log+1 indicating the update content of all the L2P fragments in the table area T0 updated after the L2P fragments #1 and #3 are acquired from the log buffer 72-0. The controller 5 writes the L2P fragment #1 and the update log+1 into the page P1 of the primary L2P flash block (#00) 62-00, and writes the L2P fragment #3 and the update log+1 into the page P1 of the secondary L2P flash block (#01) 62-01.

Next, the controller 5 acquires the L2P fragments #0 and #2 from the DRAM 7. An update log+2 indicating the update content of all the L2P fragments in the table area T0 updated after the L2P fragments #0 and #2 are acquired from the log buffer 72-0. The controller 5 writes the L2P fragment #2 and the update log+2 into the page P2 of the primary L2P flash block (#00) 62-00, and writes the L2P fragment #0 and the update log+2 into the page P2 of the secondary L2P flash block (#01) 62-01.

Next, the controller 5 acquires the L2P fragments #1 and #3 from the DRAM 7. An update log+3 indicating the update content of all the L2P fragments of the table area T0 updated after the L2P fragments #1 and #3 are acquired from the log buffer 72-0. The controller 5 writes the L2P fragment #3 and the update log+3 into the page P3 of the primary L2P flash block (#00) 62-00, and writes the L2P fragment #1 and the update log+3 into the page P3 of the secondary L2P flash block (#01) 62-01.

Next, the controller 5 acquires the L2P fragments #0 and #2 from the DRAM 7. An update log+4 indicating the update content of all the L2P fragments of the table area T0 updated after the L2P fragments #0 and #2 are acquired from the log buffer 72-0. The controller 5 writes the L2P fragment #0 and the update log+4 into the page P4 of the primary L2P flash block (#00) 62-00, and writes the L2P fragment #2 and the update log+4 into the page P4 of the secondary L2P flash block (#01) 62-01.

Next, the controller 5 acquires the L2P fragments #1 and #3 from the DRAM 7. An update log+5 indicating the update content of all the L2P fragments of the table area T0 updated after the L2P fragments #1 and #3 are acquired from the log buffer 72-0. The controller 5 writes the L2P fragment #1 and the update log+5 into the page P5 of the primary L2P flash block (#00) 62-00, and writes the L2P fragment #3 and the update log+5 into the page P5 of the secondary L2P flash block (#01) 62-01.

Next, the controller 5 acquires the L2P fragments #0 and #2 from the DRAM 7. An update log+6 indicating the update content of all the L2P fragments of the table area T0 updated after the L2P fragments #0 and #2 are acquired from the log buffer 72-0. The controller 5 writes the L2P fragment #2 and the update log+6 into the page P6 of the primary L2P flash block (#00) 62-00, and writes the L2P fragment #0 and the update log+6 into the page P6 of the secondary L2P flash block (#01) 62-01.

Next, the controller 5 acquires the L2P fragments #1 and #3 from the DRAM 7. An update log+7 indicating the update content of all the L2P fragments of the table area T0 updated after the L2P fragments #1 and #3 are acquired from the log buffer 72-0. The controller 5 writes the L2P fragment #3 and the update log+7 into the page P7 of the primary L2P flash block (#00) 62-00, and writes the L2P fragment #1 and the update log+7 into the page P7 of the secondary L2P flash block (#01) 62-01.

In this way, the controller 5 writes the L2P fragment and the update log into each page of the primary L2P flash block (#00) 62-00 in order of the L2P fragments #0, #1, #2, and #3. When the L2P fragment and the update log are written into the primary L2P flash block (#00) 62-00, the controller 5 also writes the L2P fragment and the update log into the secondary L2P flash block (#01) 62-01. At this time, since the number of L2P fragments included in the table area T0 is four, the L2P fragment written into the secondary L2P flash block is the L2P fragment that is two L2P fragments behind or ahead of the L2P fragment written into the primary L2P flash block. The update log written into the secondary L2P flash block (#01) 62-01 is the same information as the update log written into the primary L2P flash block (#00) 62-00.

Next, it is assumed that each of the L2P fragments and the update log+7 are written into the pages P7 of the primary L2P flash block (#00) 62-00 and the secondary L2P flash block (#01) 62-01 in FIGS. 14A and 14B, and that an unexpected power loss occurs and data unwritten into the NAND memory 6 is present. FIGS. 15A and 15B are diagrams illustrating a second configuration example of duplicating backup data in the memory system according to the embodiment. FIGS. 15A and 15B show two L2P flash blocks corresponding to one table area.

When an unexpected power loss occurs after the L2P fragment #3 and the update log+7 are written into the page P7 of the primary L2P flash block (#00) 62-00 and the L2P fragment #1 and the update log+7 are written into the page P7 of the secondary L2P flash block (#01) 62-01, the controller 5 writes the lost LBA list into the page P8 of the primary L2P flash block (#00) 62-00 and the page P8 of the secondary L2P flash block (#01) 62-01. The lost LBA list is a list of LBAs corresponding to the write data for which writing to the NAND memory 6 has not completed when an unexpected power loss occurs.

Next, the address translation information/update log saving processing for the table area T0 and the L2P table rebuild processing for the table area T0 corresponding to the LBA range #0 will be described with reference to FIGS. 16 to 22. Address Translation Information/Update Log Saving Processing First, an example of the address translation information/update log saving processing will be mainly described below with reference to FIG. 16 (first example), FIG. 18 (second example), and FIG. 21 (flowchart).
Address Translation Information/Update Log Saving Processing (First Example)

Figure 16:
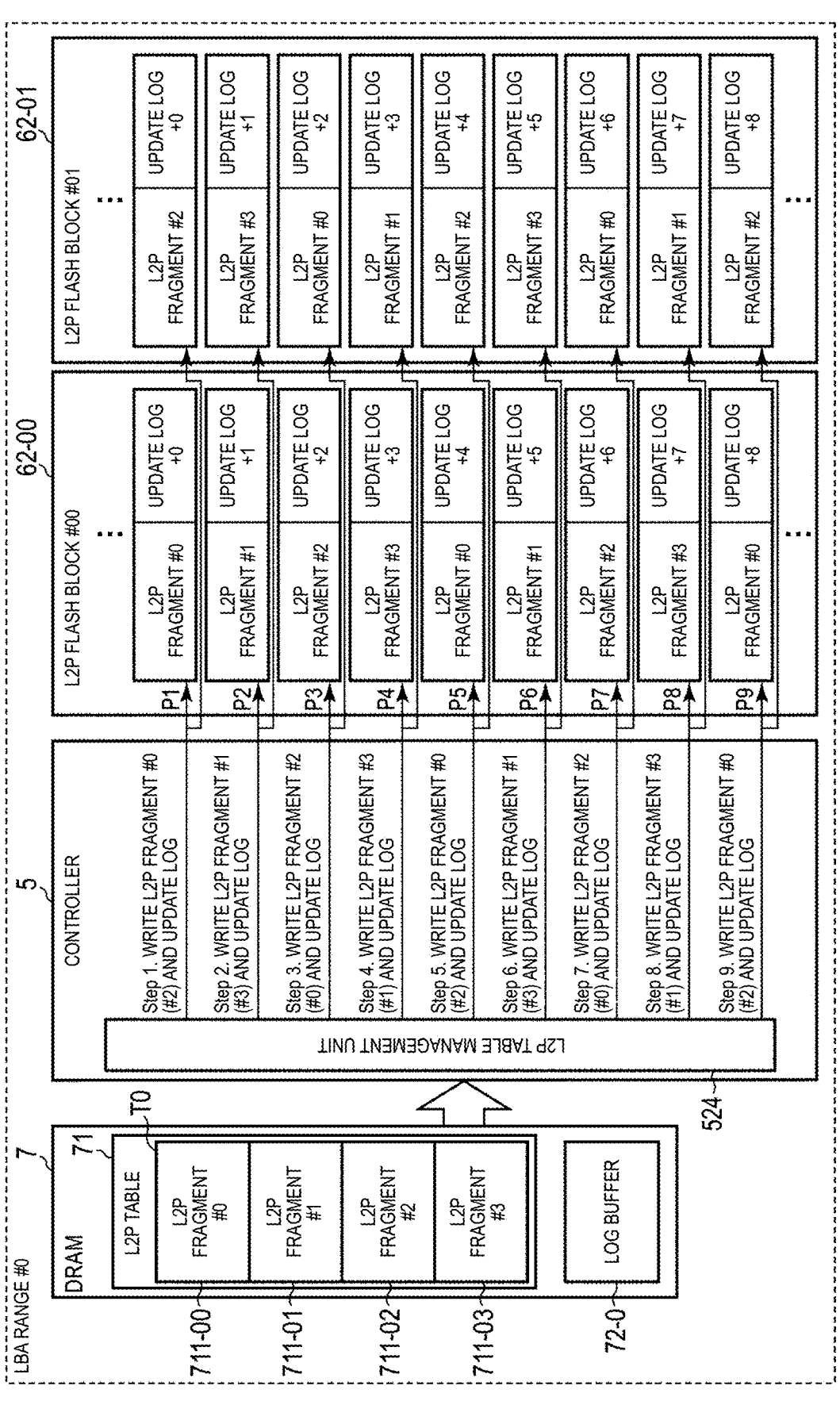
FIG. 16 is a diagram illustrating a first example of address translation information/update log saving processing of the memory system according to the embodiment.

FIG. 16 is a diagram illustrating a first example of saving processing of address translation information of the memory system according to the embodiment.
Step 1

The L2P table management unit 524 of the controller 5 acquires the L2P fragment (#0) 711-00 and the L2P fragment (#2) 711-02 from the table area T0 of the L2P table 71. As the address translation information (L2P fragments (#0 to #3) 711-00 to 03) of the table area T0 of the L2P table 71 is updated, the amount of the update logs accumulated in the log buffer 72-0 increases. After that, when the amount of the update logs accumulated in the log buffer 72-0 reaches a threshold value, the L2P table management unit 524 writes the acquired L2P fragment #0 and the update log+0 accumulated in the log buffer 72-0 into the page P1 of the L2P flash block (#00) 62-00, and writes the acquired L2P fragment #2 and the update log+0 into the page P1 of the L2P flash block (#01) 62-01. The processing of acquiring the L2P fragment (#0) 711-00 and the L2P fragment (#2) 711-02 from the table area T0 of the L2P table 71 is performed, for example, before a new update log is stored in the log buffer 72-0. The timing of acquiring the L2P fragment (#0) 711-00 and the L2P fragment (#2) 711-02 may be executed within a period from before a new update log is stored in the log buffer 72-0 to before the amount of the update logs accumulated in the log buffer 72-0 reaches a threshold value. In the following, it is assumed that the L2P fragment is acquired from the table area T0 of the L2P table 71 immediately after a certain update log is written into the L2P flash block (#00) 62-00 and the L2P flash block (#01) 62-01.
Step 2

Next, the L2P table management unit 524 acquires the L2P fragment (#1) 711-01 and the L2P fragment (#3) 711-03 from the table area T0 of the L2P table 71. Thereafter, in response to the amount of the update logs accumulated in the log buffer 72-0 reaching the threshold value again, the L2P table management unit 524 writes the acquired L2P fragment #1 and the update log+1 accumulated in the log buffer 72-0 into the page P2 of the L2P flash block (#00) 62-00, and writes the acquired L2P fragment #3 and the update log+1 into the page P2 of the L2P flash block (#01) 62-01.
Step 3

Next, the L2P table management unit 524 acquires the L2P fragment (#0) 711-00 and the L2P fragment (#2) 711-02 from the table area T0 of the L2P table 71. Thereafter, in response to the amount of the update logs accumulated in the log buffer 72-0 reaching the threshold value again, the L2P table management unit 524 writes the acquired L2P fragment #2 and the update log+2 accumulated in the log buffer 72-0 into the page P3 of the L2P flash block (#00) 62-00, and writes the acquired L2P fragment #0 and the update log+2 into the page P3 of the L2P flash block (#01) 62-01.
Step 4

Next, the L2P table management unit 524 acquires the L2P fragment (#1) 711-01 and the L2P fragment (#3) 711-03 from the table area T0 of the L2P table 71. Thereafter, in response to the amount of the update logs accumulated in the log buffer 72-0 reaching the threshold value again, the L2P table management unit 524 writes the acquired L2P fragment #3 and the update log+3 accumulated in the log buffer 72-0 into the page P4 of the L2P flash block (#00) 62-00, and writes the acquired L2P fragment #1 and the update log+3 into the page P4 of the L2P flash block (#01) 62-01.
Step 5

Next, the L2P table management unit 524 acquires the L2P fragment (#0) 711-00 and the L2P fragment (#2) 711-02 from the table area T0 of the L2P table 71. Thereafter, in response to the amount of the update logs accumulated in the log buffer 72-0 reaching the threshold value again, the L2P table management unit 524 writes the acquired L2P fragment #0 and the update log+4 accumulated in the log buffer 72-0 into the page P5 of the L2P flash block (#00) 62-00, and writes the acquired L2P fragment #2 and the update log+4 into the page P5 of the L2P flash block (#01) 62-01.

Step 6

Next, the L2P table management unit 524 acquires the L2P fragment (#1) 711-01 and the L2P fragment (#3) 711-03 from the table area T0 of the L2P table 71. Thereafter, in response to the amount of the update logs accumulated in the log buffer 72-0 reaching the threshold value again, the L2P table management unit 524 writes the acquired L2P fragment #1 and the update log+5 accumulated in the log buffer 72-0 into the page P6 of the L2P flash block (#00) 62-00, and writes the acquired L2P fragment #3 and the update log+5 into the page P6 of the L2P flash block (#01) 62-01.

Step 7

Next, the L2P table management unit 524 acquires the L2P fragment (#0) 711-00 and the L2P fragment (#2) 711-02 from the table area T0 of the L2P table 71. Thereafter, in response to the amount of the update logs accumulated in the log buffer 72-0 reaching the threshold value again, the L2P table management unit 524 writes the acquired L2P fragment #2 and the update log+6 accumulated in the log buffer 72-0 into the page P7 of the L2P flash block (#00) 62-00, and writes the acquired L2P fragment #0 and the update log+6 into the L2P flash block (#01) 62-01.

Step 8

Next, the L2P table management unit 524 acquires the L2P fragment (#1) 711-01 and the L2P fragment (#3) 711-03 from the table area T0 of the L2P table 71. Thereafter, in response to the amount of the update logs accumulated in the log buffer 72-0 reaching a threshold value, the L2P table management unit 524 writes the acquired L2P fragment #3 and the update log +7 accumulated in the log buffer 72-0 into the page P8 of the L2P flash block (#00) 62-00, and writes the acquired L2P fragment #1 and the update log+7 into the page P8 of the L2P flash block (#01) 62-01.

Step 9

Next, the L2P table management unit 524 acquires the L2P fragment (#0) 711-00 and the L2P fragment (#2) 711-02 from the table area T0 of the L2P table 71. Thereafter, in response to the amount of the update logs accumulated in the log buffer 72-0 reaching a threshold value, the L2P table management unit 524 writes the acquired L2P fragment #0 and the update log +8 accumulated in the log buffer 72-0 into the page P9 of the L2P flash block (#00) 62-00, and writes the acquired L2P fragment #2 and the update log+8 into the page P9 of the L2P flash block (#01) 62-01.

In this way, the controller 5 periodically executes processing of writing the update logs accumulated in the log buffer 72-0 and the L2P fragment acquired from the L2P table 71 into the two L2P flash blocks.

L2P Table Rebuild Processing

Figure 22:
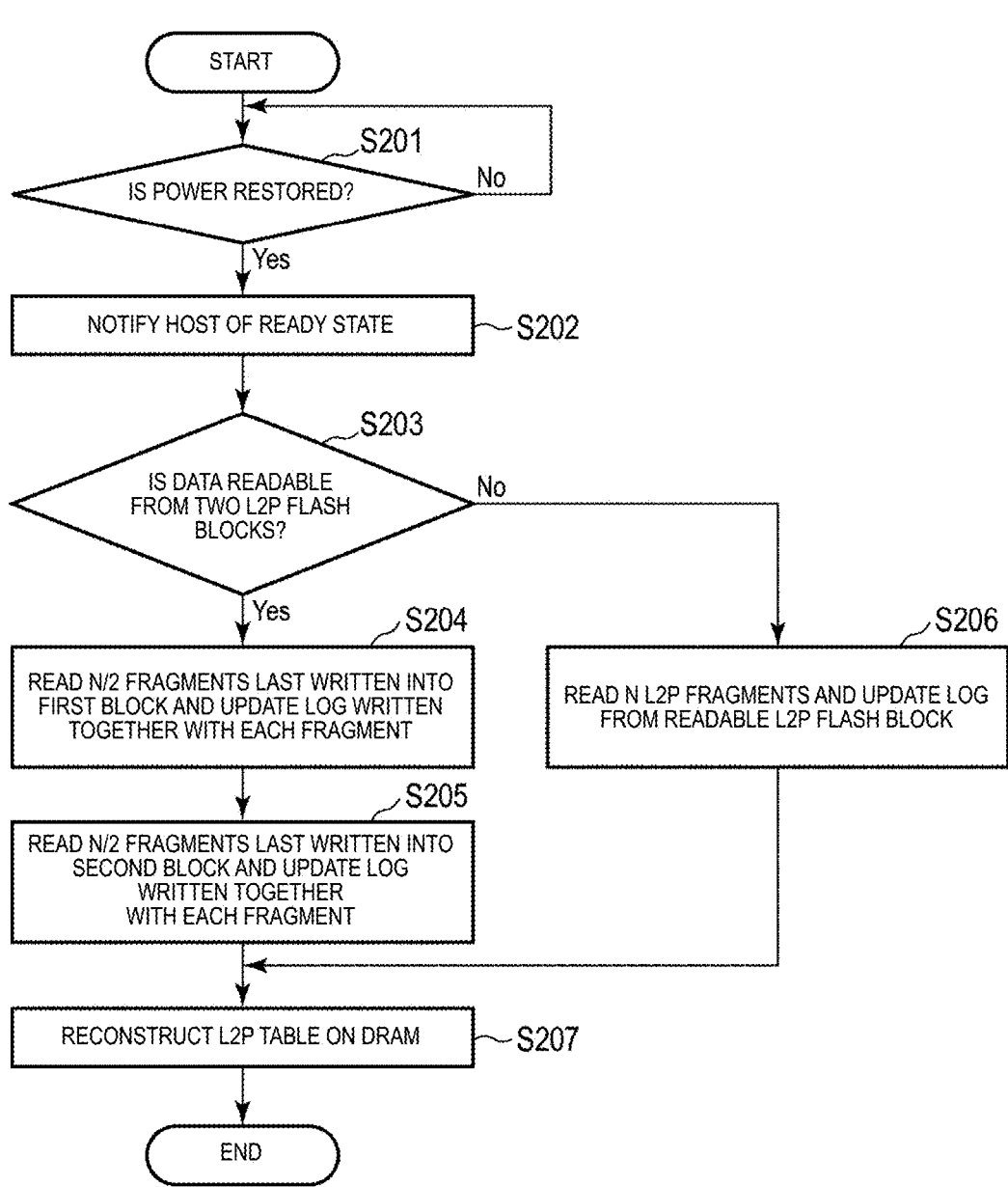
FIG. 22 is a flowchart illustrating a procedure of L2P table rebuild processing of the memory system according to the embodiment.

Next, an example of the L2P table rebuild processing will be described with reference to FIG. 17 (first example), FIG. 19 (second example), FIG. 20 (third example), and FIG. 22 (flowchart).

L2P Table Rebuild Processing (First Example)

Figure 17:
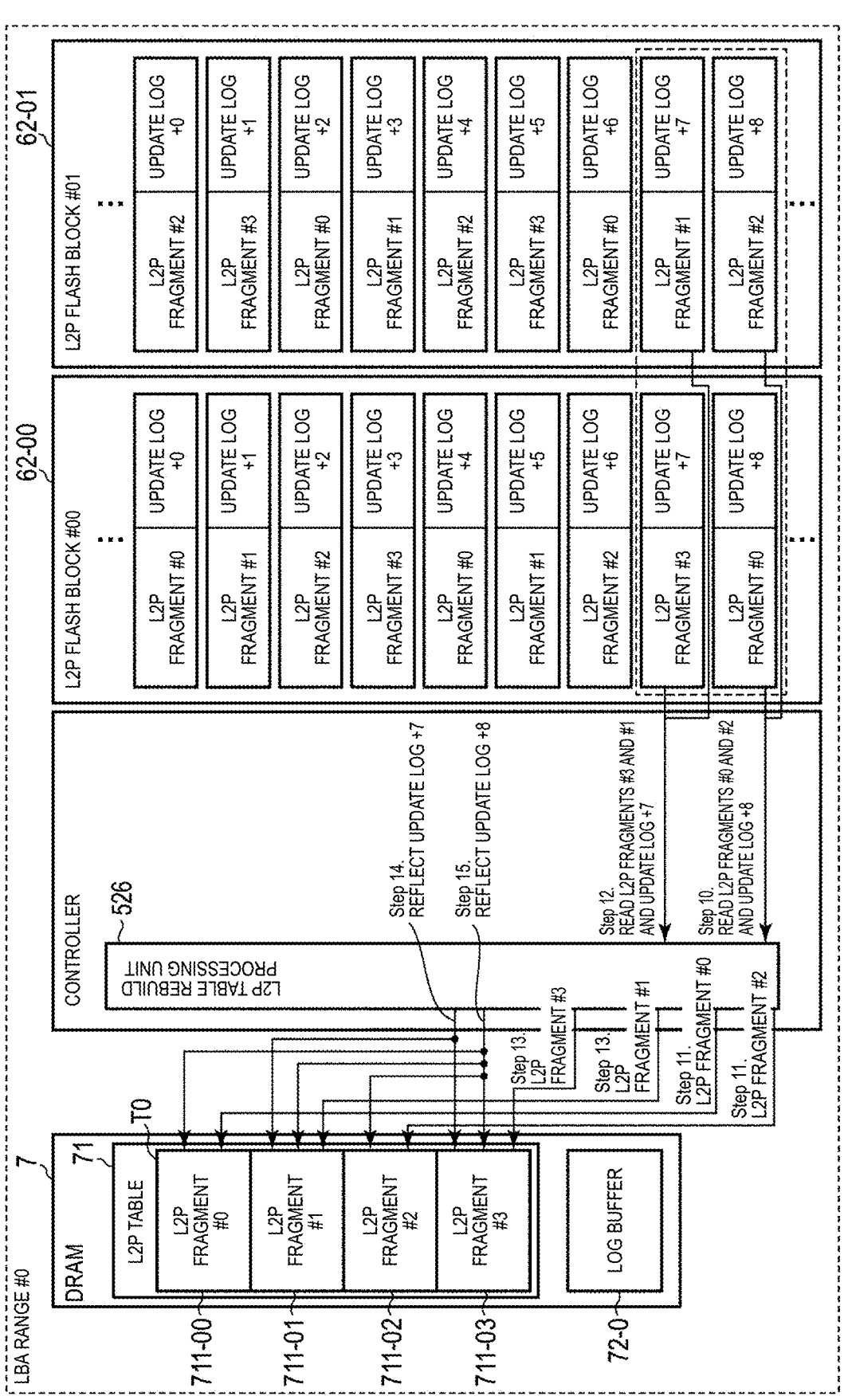
FIG. 17 is a diagram illustrating a first example of L2P table rebuild processing of the memory system according to the embodiment.

FIG. 17 is a diagram illustrating a first example of L2P table rebuild processing of the memory system according to the embodiment.

In FIG. 17, it is assumed that update log to be saved in the NAND memory 6 is not present in the log buffer 72-0 when the SSD 3 executes the shutdown (graceful shutdown) processing in response to the power supply shutdown advance notification from the host 2 after L2P fragment #0 and the update log+8 are written into the page P9 of the L2P flash block (#00) 62-00 and L2P fragment #2 and the update log+8 are written into the L2P flash block (#01) 62-01, and then the power to the SSD 3 is restored, in step 9 in FIG. 16.

Step 10

When the power to the SSD 3 is restored, the L2P table rebuild processing unit 526 reads the L2P fragment #0 and the update log+8 from the page P9 of the L2P flash block (#00) 62-00, and reads the L2P fragment #2 and the update log+8 from the page P9 of the L2P flash block (#01) 62-01. Data is last written into the L2P flash block (#00) 62-00 and the L2P flash block (#01) 62-01 on each of the pages P9.

Step 11

The L2P table rebuild processing unit 526 writes the L2P fragment #0 and the L2P fragment #2 read in step 10 into the DRAM 7. By processing in steps 10 and 11, the latest L2P fragment #0 among the plurality of L2P fragments #0 stored in the L2P flash block (#00) 62-00 or the L2P flash block (#01) 62-01 is copied from the L2P flash block (#00) 62-00 to the DRAM 7. In addition, by the processing in steps 10 and 11, the latest L2P fragment #2 among the plurality of L2P fragments #2 stored in the L2P flash block (#00) 62-00 or the L2P flash block (#01) 62-01 is copied from the L2P flash block (#01) 62-01 to the DRAM 7.

Step 12

The L2P table rebuild processing unit 526 reads the L2P fragment #3, the L2P fragment #1, and the update log+7 from the pages P8 of the L2P flash block (#00) 62-00 and the L2P flash block (#01) 62-01.

Step 13

The L2P table rebuild processing unit 526 writes the L2P fragments #1 and #3 read in step 12 into the DRAM 7. By the processing in steps 12 and 13, the latest L2P fragment #3 among the plurality of L2P fragments #3 stored in the L2P flash block (#00) 62-00 or the L2P flash block (#01) 62-01 is copied from the L2P flash block (#00) 62-00 to the DRAM 7. In addition, by the processing in steps 12 and 13, the latest L2P fragment #1 among the plurality of L2P fragments #1 stored in the L2P flash block (#00) 62-00 or the L2P flash block (#01) 62-01 is copied from the L2P flash block (#00) 62-00 to the DRAM 7.

Step 14

The L2P table rebuild processing unit 526 reflects the content of the update log+7 read in step 12 only in the L2P fragment #1 and the L2P fragment #3 copied to the DRAM 7. That is, the content of the update log (here, the update log+7) stored in the L2P flash block (#00) 62-00 and the L2P flash block (#01) 62-01 and configuring pairs with the L2P fragment #1 and the L2P fragment #3 is reflected only to the L2P fragment #1 and the L2P fragment #3 copied to the DRAM 7. Each of the L2P fragments #2 and #0 stored in the L2P flash block 62-0 is information newer than the update log+7. The content of the update log+7 is previously reflected in the L2P fragments #2 and #0 copied to the DRAM 7. Therefore, the execution of the processing of reflecting the content of the update log+7 in the L2P fragments #2 and #0 is omitted. As a result, the time required for the L2P table rebuild processing can be shortened.

Step 15

The L2P table rebuild processing unit 526 reflects the content of the update log+8 read in step 10 to the L2P fragments #0 to #3 copied to the DRAM 7. That is, the content of the update log (here, the update log+8) stored in the L2P flash block (#00) 62-00 and the L2P flash block (#01) 62-01 and configuring pairs with the L2P fragment #2 and the L2P fragment #0 is reflected in the L2P fragments #0 to #3 copied to the DRAM 7.

As described above, the controller 5 reads the L2P fragment and the update log stored in the L2P flash block (#00) 62-00 and the L2P flash block (#01) 62-01, and reconstructs the latest address translation information (L2P fragments #0 to #3) of the table area T0 of the L2P table 71. In addition, the controller 5 can reconstruct the entire table area T0 by reading the L2P fragments of two pages and the update log from each of the two L2P flash blocks.

Next, an example of address translation information/update log saving processing and lost LBA list saving processing will be described.

Address Translation Information/Update Log Saving Processing (Second Example)

Figure 18:
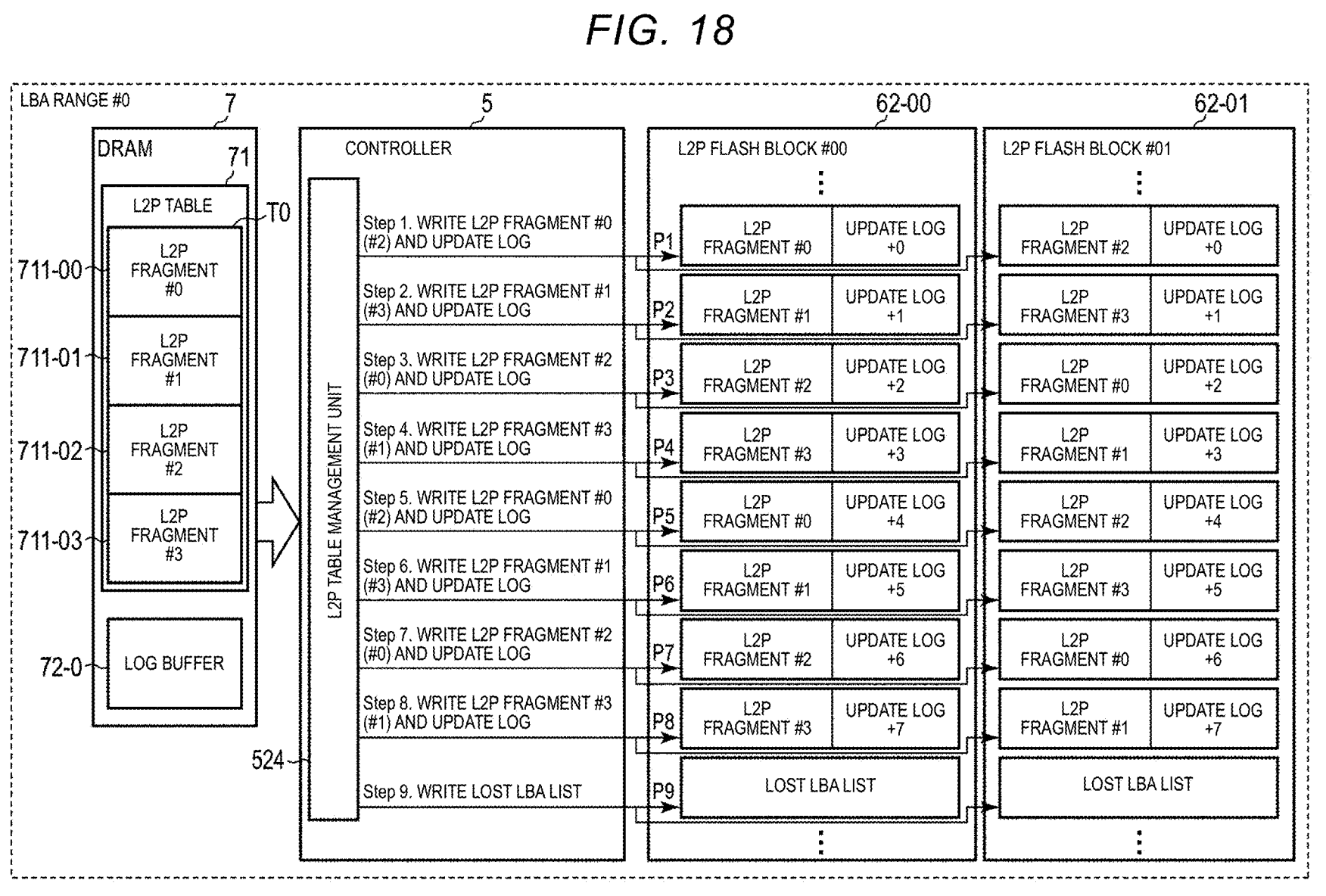

FIG. 18 is a diagram illustrating a second example of the address translation information/update log saving processing of the memory system according to the embodiment. Here, it is assumed that an unexpected power loss occurs in the SSD 3.

The controller 5 executes the same operation as the operation from step 1 to step 8 in FIG. 16. Here, it is assumed that, after the write operation in step 8 has completed, when an unexpected power loss occurs, the update log unsaved in the L2P flash block (#00) 62-00 and the L2P flash block (#01) 62-01 is stored in the log buffer 72-0.

Step 9

After the write operation of the L2P fragment and the update log in step 8 has completed, when an unexpected power loss occurs, the L2P table management unit 524 determines whether the update log unsaved in the L2P flash block (#00) 62-00 and the L2P flash block (#01) 62-01 is stored in the log buffer 72-0. When the update log unsaved in the L2P flash block (#00) 62-00 and the L2P flash block (#01) 62-01 is stored in the log buffer 72-0, the controller 5 writes the lost LBA list into the pages P9 of the L2P flash block (#00) 62-00 and the L2P flash block (#01) 62-01. The lost LBA list written into the page P9 of the L2P flash block (#00) 62-00 and the L2P flash block (#01) 62-01 is a list of LBAs belonging to the LBA range #0 among the LBAs corresponding to the write data for which writing to the NAND memory 6 has not completed. The lost LBA lists written into the L2P flash block (#00) 62-00 and the L2P flash block (#01) 62-01 have the same content as each other.

L2P Table Rebuild Processing (Second Example)

Next, a second example of the L2P table rebuild processing will be described. FIG. 19 is a diagram illustrating a second example of the L2P table rebuild processing of the memory system according to the embodiment.

Figure 19:
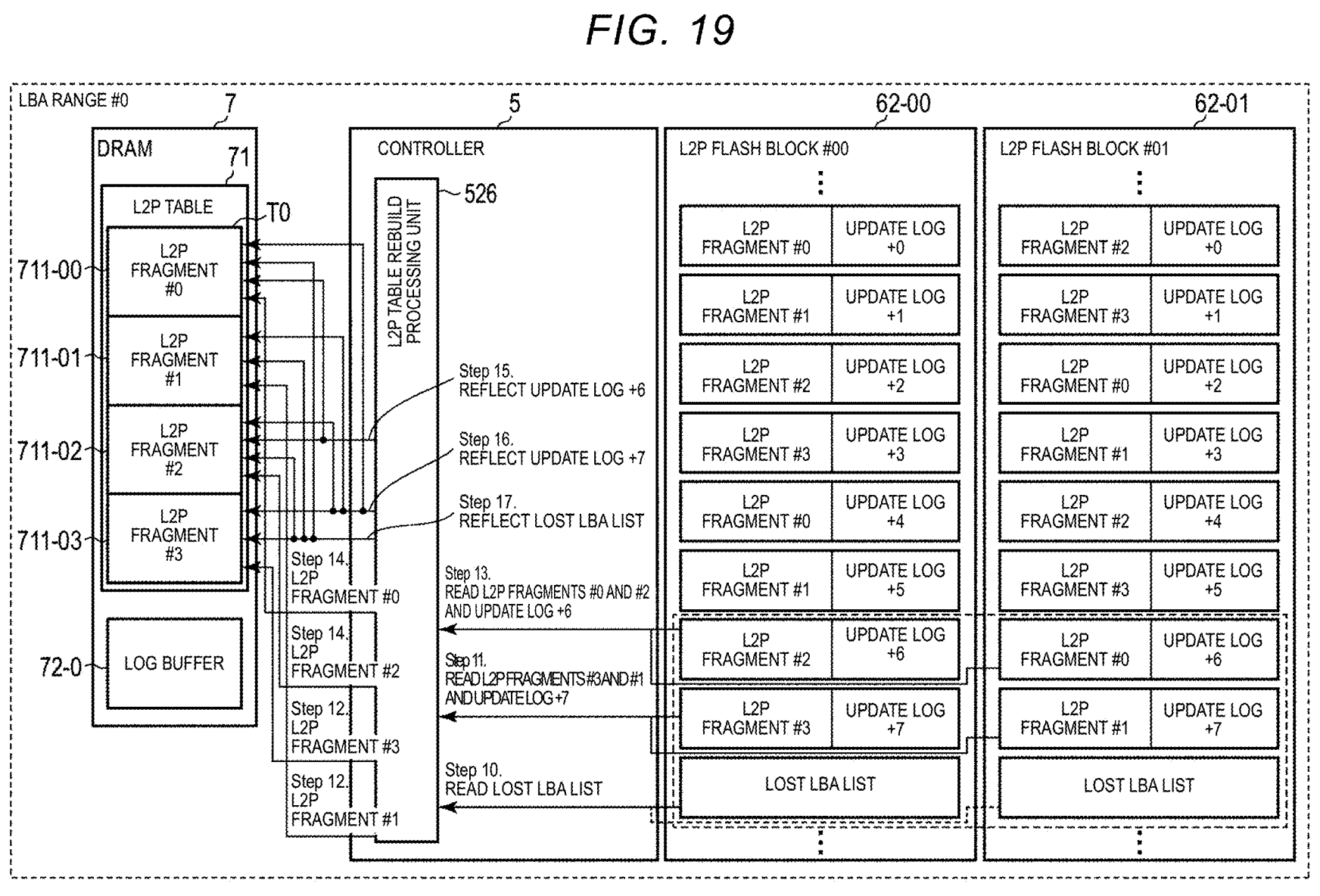

In FIG. 19, it is assumed that power to the SSD 3 is restored after step 9 in FIG. 18.

Step 10

The L2P table rebuild processing unit 526 reads the lost LBA list from the page P9 of the L2P flash block (#00) 62-00 or the L2P flash block (#01) 62-01. Data is last written into the L2P flash block (#00) 62-00 and the L2P flash block (#01) 62-01 on the page P9. The L2P table rebuild processing unit 526 may read the lost LBA list from any one of the L2P flash block (#00) 62-00 or the L2P flash block (#01) 62-01, or may read the lost LBA list from both the L2P flash block (#00) 62-00 and the L2P flash block (#01) 62-01.

Step 11

The L2P table rebuild processing unit 526 reads the L2P fragment #3 and the update log+7 from the page P8 of the L2P flash block (#00) 62-00, and reads the L2P fragment #1 and the update log+7 from the page P8 of the L2P flash block (#01) 62-01.

Step 12

The L2P table rebuild processing unit 526 writes the L2P fragment #1 and the L2P fragment #3, which are read in step 11, into the DRAM 7. By the processing in steps 11 and 12, the latest L2P fragment #3 among the plurality of L2P fragments #3 stored in the L2P flash block (#00) 62-00 and the L2P flash block (#01) 62-01 is copied from the L2P flash block (#00) 62-00 to the DRAM 7, and the latest L2P fragment #1 among the plurality of L2P fragments #1 stored in the L2P flash block (#00) 62-00 and the L2P flash block (#01) 62-01 is copied from the L2P flash block (#01) 62-01 to the DRAM 7.

Step 13

The L2P table rebuild processing unit 526 reads the L2P fragment #2 and the update log+6 from the page P7 of the L2P flash block (#00) 62-00, and reads the L2P fragment #0 and the update log+6 from the page P7 of the L2P flash block (#01) 62-01.

Step 14

The L2P table rebuild processing unit 526 writes the L2P fragment #0 and the L2P fragment #2, which are read in step 13, into the DRAM 7. By the processing in steps 13 and 14, the latest L2P fragment #2 among the plurality of L2P fragments #2 stored in the L2P flash block (#00) 62-00 is copied from the L2P flash block (#00) 62-00 to the DRAM 7, and the latest L2P fragment #0 among the plurality of L2P fragments #0 stored in the L2P flash block (#01) 62-01 is copied from the L2P flash block (#01) 62-01 to the DRAM 7.

Step 15

The L2P table rebuild processing unit 526 reflects the content of the update log+6 read in step 13 to the L2P fragment #0 and the L2P fragment #2 copied to the DRAM 7.

Step 16

The L2P table rebuild processing unit 526 reflects the content of the update log+7 read in step 11 to the L2P fragment #0, the L2P fragment #1, the L2P fragment #2, and the L2P fragment #3 copied in the DRAM 7. With the above processing, the address translation information (L2P fragments #0 to #3) of the table area T0 immediately before the unexpected power loss occurs is reconstructed in the DRAM 7.

Step 17

The L2P table rebuild processing unit 526 updates the address translation information (L2P fragments #0 to #3) of the table area T0 such that a value indicating an error (data error that cannot be corrected) is associated with each of the LBAs corresponding to the lost write data, based on the lost LBA list read in step 10.

In this way, when the table area T0 is restored, when the lost LBA list is read, the controller 5 changes the address translation information stored in the restored table area T0 to the value indicating an error, using the L2P fragments written into the L2P flash block before the time point when the lost LBA list is read. Thereby, even when a read command for designating an LBA corresponding to the write data lost in the past is received from the host 2, the controller 5 can notify the host 2 of an error. Therefore, it is possible to prevent a problem in which data different from the data corresponding to the LBA designated by the read command is mistakenly returned to the host 2.

L2P Table Rebuild Processing (Third Example)

Next, a third example of the L2P table rebuild processing when data is read from one L2P flash block among two L2P flash blocks correlated with one table area will be described. FIG. 20 is a diagram illustrating a third example of the L2P table rebuild processing executed according to the memory system according to the embodiment. The L2P table rebuild processing in FIG. 20 may be executed after the address translation information/update log saving processing described in FIG. 16.

Figure 20:
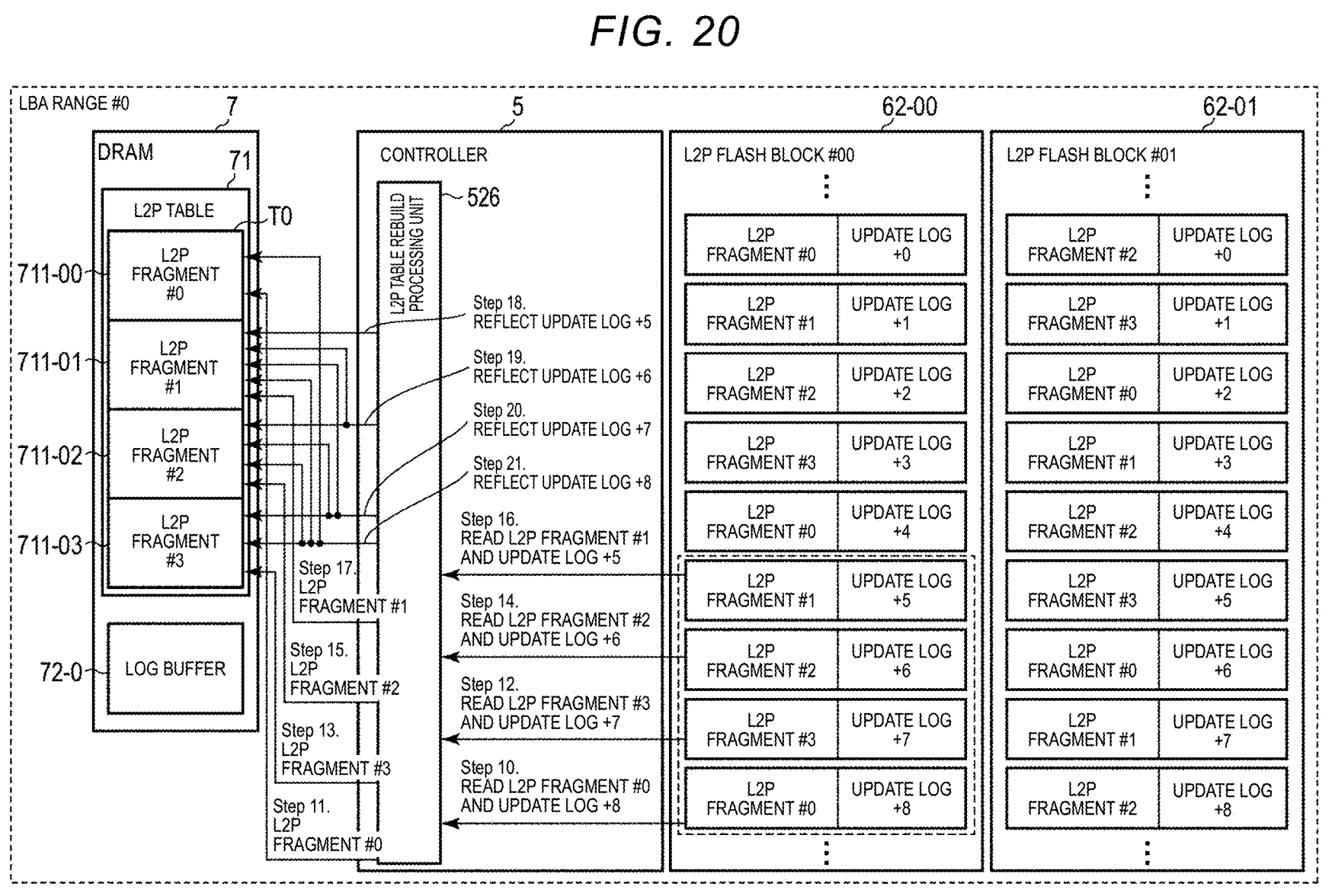

In FIG. 20, it is assumed that, when the SSD 3 executes shutdown (graceful shutdown) processing in response to the power supply shutdown advance notification from the host 2 after the L2P fragment #0, the L2P fragment #2, and the update log+8 are written into the pages P9 of the L2P flash block (#00) 62-00 and the L2P flash block (#01) 62-01 in step 9 in FIG. 16, and then the power to the SSD 3 is restored, the update log to be saved in the NAND memory 6 is not present in the log buffer 72-0 when the power supply shutdown advance notification is received, and data is not readable from the L2P flash block (#01) 62-01 when the power to the SSD 3 is restored.

Step 10

When the power to the SSD 3 is restored, the L2P table rebuild processing unit 526 reads the L2P fragment #0 and the update log+8 from the page P9 of the L2P flash block (#00) 62-00. Data is last written into the L2P flash block (#00) 62-00 on the page P9.

Step 11

The L2P table rebuild processing unit 526 writes the L2P fragment #0 read in step 10 into the DRAM 7. By processing in steps 10 and 11, the latest L2P fragment #0 among the plurality of L2P fragments #0 stored in the L2P flash block (#00) 62-00 is copied from the L2P flash block (#00) 62-00 to the DRAM 7.

Step 12

The L2P table rebuild processing unit 526 reads the L2P fragment #3 and the update log+7 from the page P8 of the L2P flash block (#00) 62-00.

Step 13

The L2P table rebuild processing unit 526 writes the L2P fragment #3 read in step 12 into the DRAM 7. By the processing in steps 12 and 13, the latest L2P fragment #3 among the plurality of L2P fragments #3 stored in the L2P flash block (#00) 62-00 is copied from the L2P flash block (#00) 62-00 to the DRAM 7.

Step 14

The L2P table rebuild processing unit 526 reads the L2P fragment #2 and the update log+6 from the page P7 of the L2P flash block (#00) 62-00.

Step 15

The L2P table rebuild processing unit 526 writes the L2P fragment #2 read in step 14 into the DRAM 7. By the processing in steps 14 and 15, the latest L2P fragment #2 among the plurality of L2P fragments #2 stored in the L2P flash block (#00) 62-00 is copied from the L2P flash block (#00) 62-00 to the DRAM 7.

Step 16

The L2P table rebuild processing unit 526 reads the L2P fragment #1 and the update log+5 from the page P6 of the L2P flash block (#00) 62-00.

Step 17

The L2P table rebuild processing unit 526 writes the L2P fragment #1 read in step 16 into the DRAM 7. By the processing in steps 16 and 17, the latest L2P fragment #1 among the plurality of L2P fragments #1 stored in the L2P flash block (#00) 62-00 is copied from the L2P flash block (#00) 62-00 to the DRAM 7.

Step 18

The L2P table rebuild processing unit 526 reflects the content of the update log+5 read in step 16 only to the L2P fragment (#1) 711-01 copied to the DRAM 7. That is, the content of the update log (here, the update log+5) stored in the L2P flash block (#00) 62-00 and configuring a pair with the L2P fragment #1 is reflected only to the L2P fragment (#1) 711-01 copied to the DRAM 7. Each of the L2P fragments #2, #3, and #0 stored in the L2P flash block (#00) 62-00 is information newer than the update log+5. The content of the update log+5 is previously reflected in the L2P fragment (#2) 711-02, the L2P fragment (#3) 711-03, and the L2P fragment (#0) 711-00 copied to the DRAM 7. Therefore, the execution of the processing of reflecting the content of the update log+5 in the L2P fragments (#2) 711-02, (#3) 711-03, and (#0) 711-00 is omitted. As a result, the time required for the L2P rebuild processing can be shortened.

Step 19

The L2P table rebuild processing unit 526 reflects the content of the update log+6 read in step 14 only to the L2P fragment (#1) 711-01 and the L2P fragment (#2) 711-02 copied to the DRAM 7. That is, the content of the update log (here, the update log+6) stored in the L2P flash block (#00) 62-00 and configuring a pair with the L2P fragment #2 is reflected only to the L2P fragments (#1) 711-01 and (#2) 711-02 copied to the DRAM 7. Each of the L2P fragments #3 and #0 stored in the L2P flash block (#00) 62-00 is information newer than the update log+6. The content of the update log+6 is previously reflected in the L2P fragment (#3) 711-03 and the L2P fragment (#0) 711-00 copied to the DRAM 7. Therefore, the execution of the processing of reflecting the content of the update log+6 in the L2P fragments (#3) 711-03 and (#0) 711-00 is omitted.

Step 20

The L2P table rebuild processing unit 526 reflects the content of the update log+7 read in step 12 only to the L2P fragment (#1) 711-01, the L2P fragment (#2) 711-02, and the L2P fragment (#3) 711-03 copied to the DRAM 7. That is, the content of the update log (here, the update log+7) stored in the L2P flash block (#00) 62-00 and configuring a pair with the L2P fragment #3 is reflected only to the L2P fragments (#1) 711-01, (#2) 711-02, and (#3) 711-03 copied to the DRAM 7. The L2P fragment #0 stored in the L2P flash block (#00) 62-00 is information newer than the update log+7. The content of the update log+7 is previously reflected in the L2P fragment (#0) 711-00 copied to the DRAM 7. Therefore, the execution of the processing of reflecting the content of the update log+7 in the L2P fragment (#2) 711-02 is omitted.

Step 21

The L2P table rebuild processing unit 526 reflects the content of the update log+8 read in step 10 to the L2P fragment (#0) 711-00, the L2P fragment (#1) 711-01, the L2P fragment (#2) 711-02, and the L2P fragment (#3) 711-03 copied to the DRAM 7.

In this way, when the data is not readable from one L2P flash block of the two L2P flash blocks that are correlated with the table area T0, the controller 5 reconstructs the table area T0 of the L2P table 71 by reading the data from the other L2P flash block. That is, when the data is not readable from the L2P flash block (#01) 62-01, the controller 5 reconstructs the latest address translation information (L2P fragments #0 to #3) of the table area T0 of the L2P table 71 by reading only the L2P fragments and the update logs stored in the L2P flash block (#00) 62-00. In addition, when the data is not readable from the L2P flash block (#00) 62-00, the controller 5 uses the L2P fragment and the update log stored in the L2P flash block (#01) 62-01 to reconstruct the table area T0.

Address Translation Information/Update Log Saving Processing (Flowchart)

Figure 21:
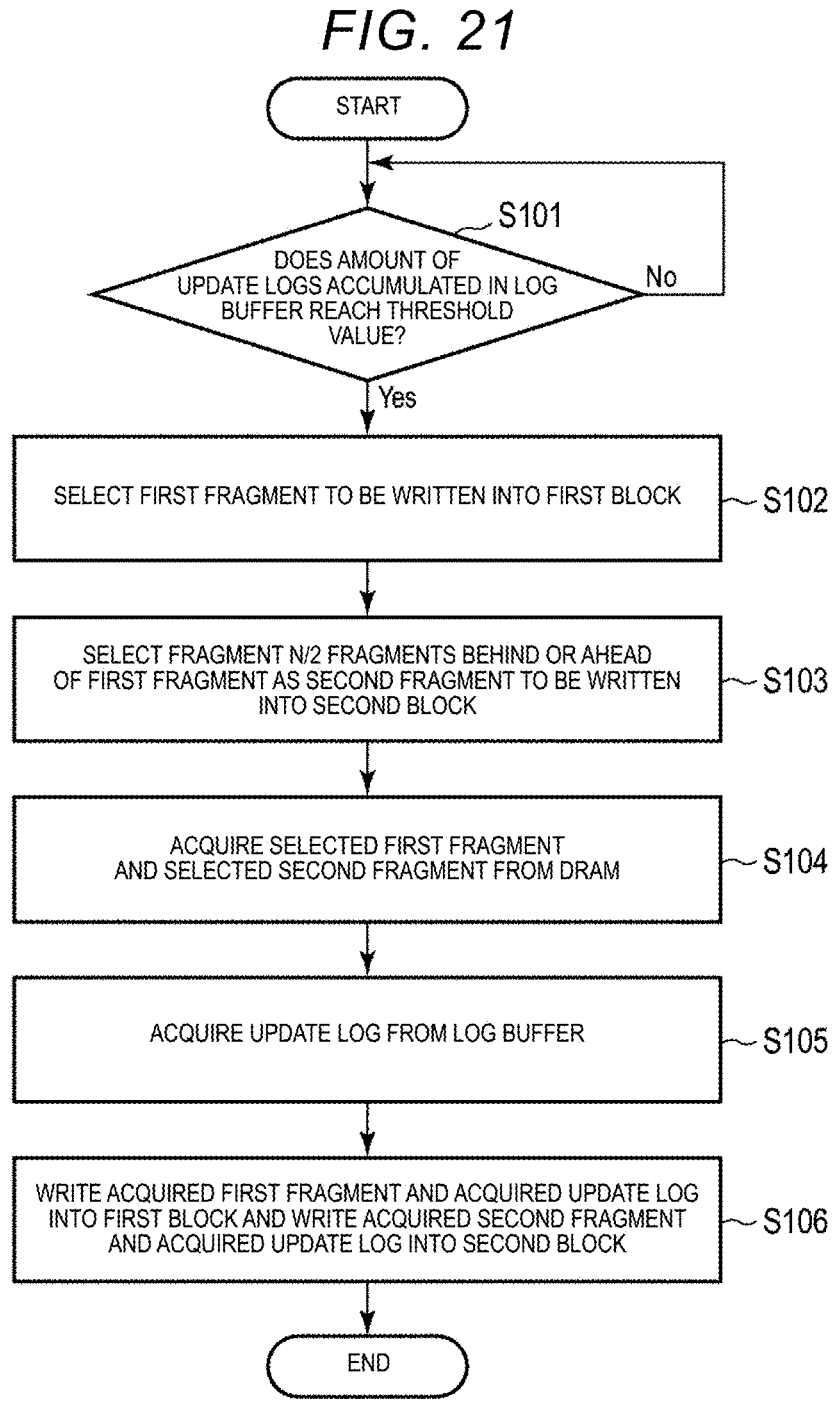
FIG. 21 is a flowchart illustrating a procedure of address translation information/update log saving processing of the memory system according to the embodiment.

Next, a procedure of address translation information/update log saving processing when a time difference duplication processing is executed will be described. FIG. 21 is a flowchart showing a procedure of address translation information/update log saving processing executed in the memory system according to the embodiment.

First, the controller 5 determines whether an amount of the update logs accumulated in the log buffer corresponding to any LBA range reaches a threshold value (step S101).

When the amount of the update logs accumulated in the log buffer corresponding to any of the LBA ranges does not reach the threshold value (No in step S101), the controller 5 waits until the amount of the update log reaches the threshold value.

When the amount of the update logs accumulated in the log buffer corresponding to any of the LBA ranges reaches a threshold value (Yes in step S101), the controller 5 selects the L2P fragment (first fragment) to be written into a first block correlated with this LBA range from among the plurality of L2P fragments provided in the table area of the L2P table 71 corresponding to this LBA range (step S102). The L2P fragment selected in step S102 may be acquired from the table area of the L2P table 71 in advance. The first fragment selected in S102 is, for example, the L2P fragment that follows the latest L2P fragment written into the first block in the first order. When the latest L2P fragment written into the first block is the L2P fragment at the end of the first order, the L2P fragment at the head of the first order is selected as the first fragment.

The controller 5 selects a fragment that is N/2 fragments behind or ahead of the first fragment selected in step S102 as the L2P fragment (second fragment) to be written into a second block, from among the plurality of L2P fragments provided in the table area (step S103). N is the number of L2P fragments provided in the table area corresponding to this LBA range.

The controller 5 acquires the first fragment selected in step S102 and the second fragment selected in step S103 from the L2P table 71 of the DRAM 7 (step S104).

The controller 5 acquires the update log from the log buffer 72 (step S105).

The controller 5 writes the first fragment acquired in S104 and the update log acquired in S105 into the first block, and writes the second fragment acquired in S104 and the update log acquired in S105 into the second block (step S106).

After that, the controller 5 may acquire the L2P fragment to be written into the first block or the second block from the table area of the L2P table 71.

L2P Table Rebuild Processing (Flowchart)

Next, a procedure of the L2P table rebuild processing will be described. FIG. 22 is a flowchart showing the procedure of L2P table rebuild processing executed in the memory system according to the embodiment. Here, in FIG. 22, a case where the L2P table 71 is configured by one table area is described.

First, the controller 5 determines whether the power to the SSD 3 is restored (step S201).

When the power to the SSD 3 is not restored (No in step S201), the controller 5 waits.

When the power to the SSD 3 is restored (Yes in step S201), the controller 5 notifies the host 2 that the SSD 3 is in the ready state (step S202).

The controller 5 determines whether data can be read from both of the two L2P flash blocks assigned to the table area of the L2P table 71 (step S203).

When data is readable from both of the two L2P flash blocks (Yes in step S203), the controller 5 reads the N/2 L2P fragments last written into the first block and the update log written together with each of the N/2 L2P fragments from the first block among both of the two L2P flash blocks (step S204). The update log written together with each of the N/2 L2P fragments is an update log stored in the same page as the L2P fragment.

The controller 5 reads the N/2 L2P fragments last written into the second block and the update log written together with each of the N/2 L2P fragments from the second block among both of the two L2P flash blocks (step S205). The read operation in S204 and the read operation in S205 may be executed at the same timing.

When data is not readable from any one of the two L2P flash blocks (No in step S203), the controller 5 reads N L2P fragments and the update log written together with each of the N L2P fragments from the readable L2P flash block among the two L2P flash blocks (step S206). The update log written together with each of the N L2P fragments is an update log stored in the same page as the L2P fragment.

The controller 5 executes processing of reconstructing the L2P table 71 in the DRAM 7 by using the read L2P fragment and the update log in S204 and S205 or S206 (step S207).

When the L2P table 71 has a plurality of table areas, the controller 5 may select a specific table area and preferentially reconstruct the specific table area in the DRAM 7. In addition, the controller 5 may preferentially reconstruct a table area corresponding to the LBA range to which the logical address designated by the received I/O command belongs after notifying the host 2 of the ready state in S202.

Figure 23:
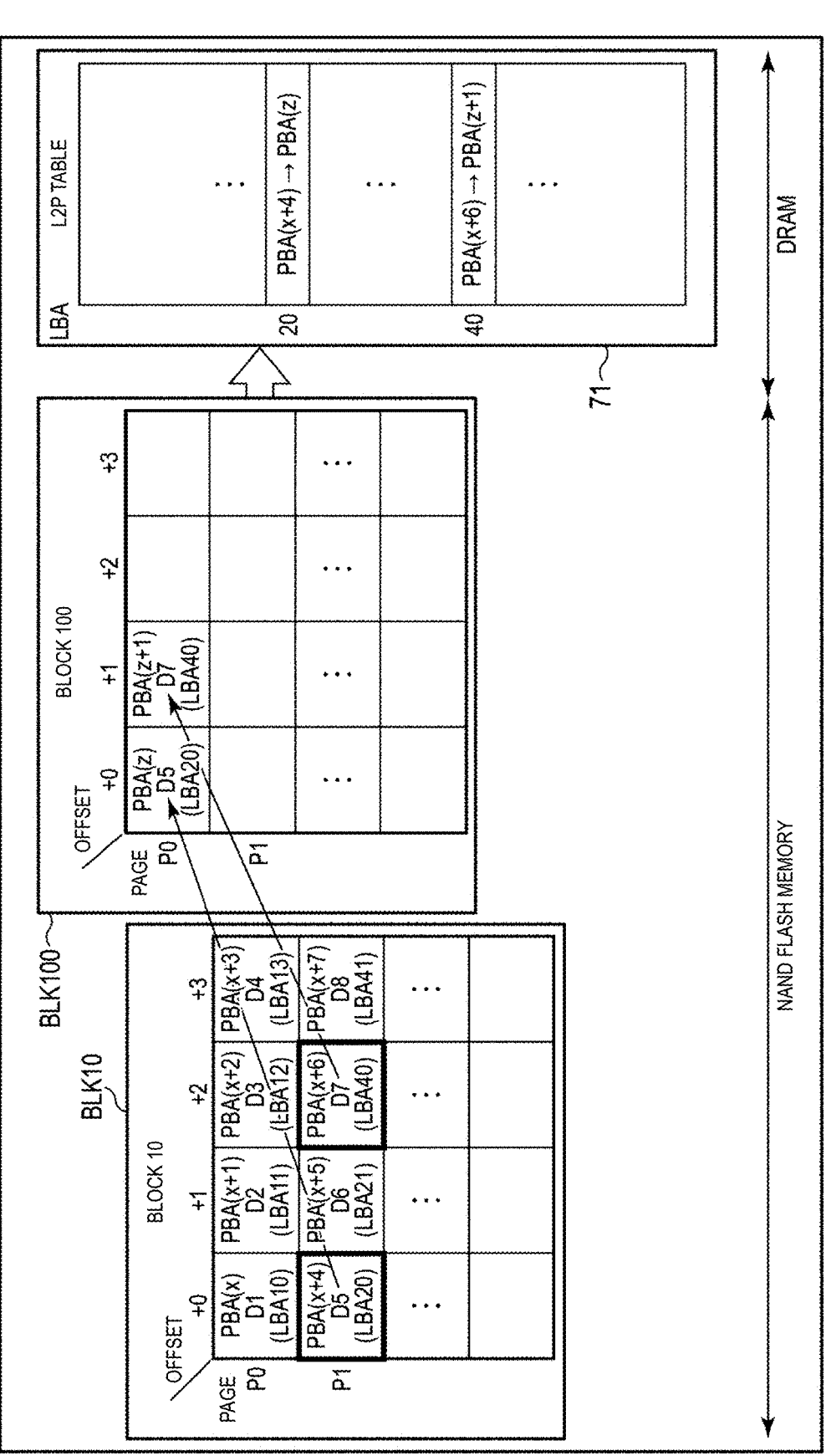
FIG. 23 is a block diagram illustrating a configuration example showing update of the L2P table during the garbage collection (that is, compaction) processing of the memory system according to the embodiment.

Next, a case where the second type log described in FIG. 12 is used will be described. FIG. 23 is a block diagram illustrating a configuration example showing updating of the L2P table in the garbage collection processing of the memory system according to the embodiment.

The garbage collection control unit 523 of the controller 5 starts the garbage collection processing in response to the number of free blocks in the SSD 3 being equal to or less than a threshold value. Here, in the garbage collection processing, the garbage collection control unit 523 selects the block BLK10 of the NAND memory 6 as the copy source block. For example, the garbage collection control unit 523 selects a block having a low proportion of valid data among the plurality of active blocks managed in the SSD 3 as the copy source block. In addition, the garbage collection control unit 523 selects the block BLK100 as the copy destination block from the free blocks. For example, the garbage collection control unit 523 selects a block in which the progress of the program/erase cycle is slow as the copy destination block from the plurality of free blocks.

In the page P0 of the block BLK10 selected as the copy source block, the storage locations specified by the offsets +0 to +3 are indicated by the physical addresses PBA(x) to PBA(x+3), respectively. In addition, in the page P1, the storage locations specified by the offsets +0 to +3 are indicated by the physical addresses PBA(x+4) to PBA(x+7), respectively.

The storage locations indicated by the physical addresses PBA(x) to PBA(x+3) respectively store the pieces of data D1 to D4. The data D1 to D4 corresponds to the logical addresses LBA10 to 13, respectively. In addition, the storage locations indicated by the physical addresses PBA(x+4) to PBA(x+7) respectively store the pieces of data D5 to D8. The data D5 to D8 corresponds to the logical addresses LBA20, 21, 40, and 41, respectively.

Here, among the data stored in the block BLK10, only the data D5 and the data D7 are valid data. The garbage collection control unit 523 selects the storage location indicated by PBA(x+4) and the storage location indicated by PBA(x+6) as the copy source storage location.

The garbage collection control unit 523 writes the data stored in the copy source storage location into the copy destination block. The data D5 stored in the storage location indicated by PBA(x+4) is written into the storage location of the page P0 of the block BLK100 at the offset +0. Thereby, the physical address indicating the storage location in which the data corresponding to the LBA20 is stored is a PBA(z). The data D7 stored in the storage location indicated by PBA(x+6) is written into the storage location of the page P0 of the block BLK100 at the offset +1. Thereby, the physical address indicating the storage location in which the data corresponding to the LBA40 is stored is a PBA(z+1).

By copying the data, the mapping information of the logical address corresponding to the copied data in the L2P table 71 in the DRAM 7 is updated. The mapping of the LBA20 is updated from the PBA(x+4) to the PBA(z). In addition, the mapping of the LBA40 is updated from the PBA(x+6) to the PBA(z+1). As a result, the data stored in the storage locations indicated by PBA(x+4) and PBA(x+6) becomes invalid data.

In this way, in the garbage collection, the mapping of the LBA is updated regardless of the write command received from the host 2. In updating of the mapping in the garbage collection, the controller 5 determines whether the PBA indicating the copy source storage location matches the PBA before the update. The controller 5 updates the mapping information to the PBA indicating the copy destination storage location only when the two PBAs match each other. As a result, when data writing occurs based on the write command received from the host 2 during the garbage collection, it is possible to prevent the L2P table 71 from being updated from the mapping information indicating the storage location in which new data is written to the mapping information indicating the storage location in which the data is copied by the garbage collection.

Therefore, the log stored in the log buffer 72 includes the physical address (old PBA) indicating the copy source storage location when the mapping information is updated based on the garbage collection.

Figure 24:
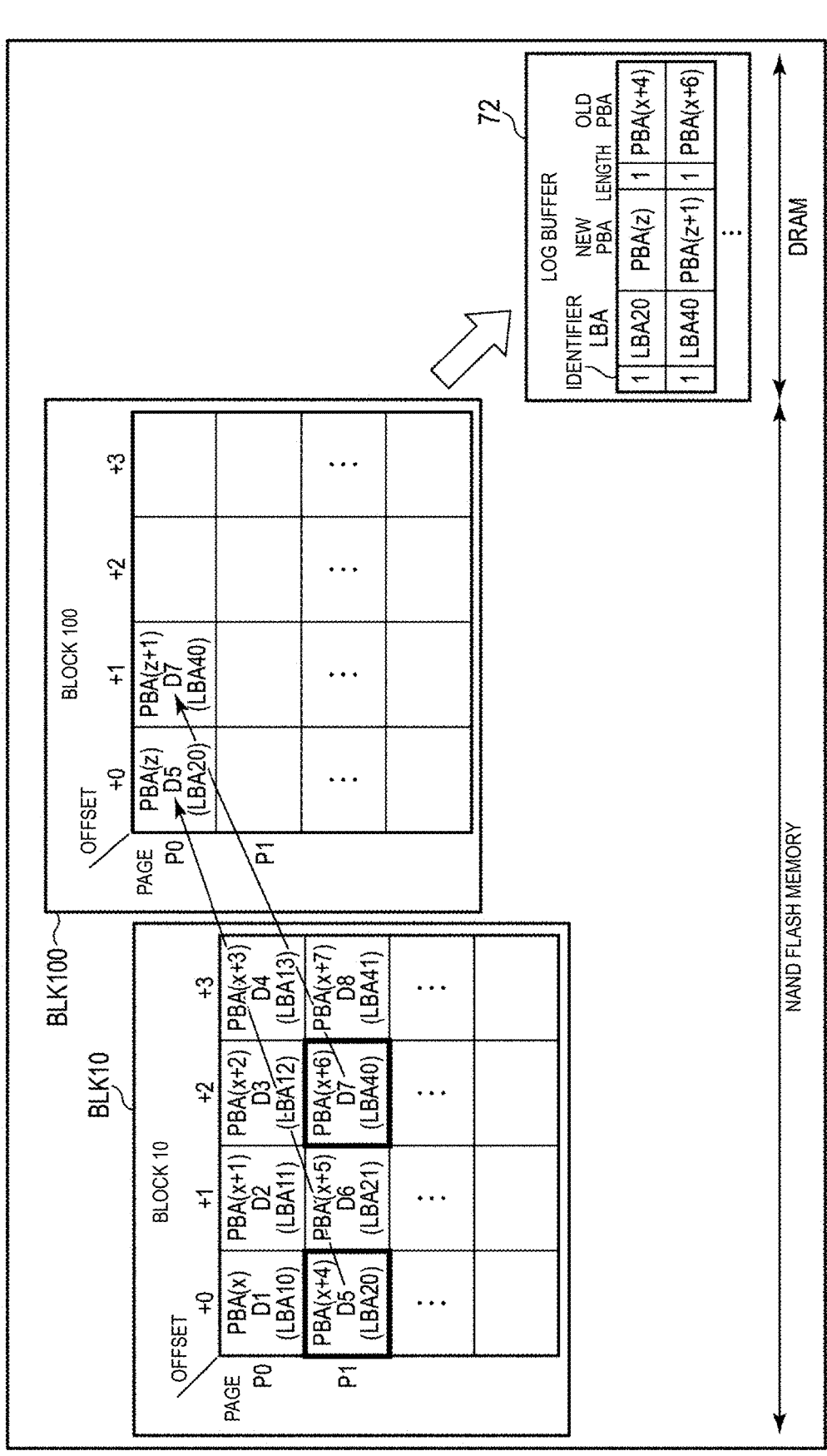
FIG. 24 is a block diagram illustrating a first configuration example showing a record of a log during the garbage collection processing of the memory system according to the embodiment.

First, a case where the same data as in FIG. 23 is copied will be described. FIG. 24 is a block diagram illustrating a first configuration example showing recording of a log in the garbage collection processing of the memory system according to the embodiment.

In FIG. 24, when the data is copied by the garbage collection described in FIG. 23, new log is stored in the log buffer 72. In response to the data D5 being copied from the block BLK10 to the block BLK100, the controller 5 stores a first log in the log buffer 72.

An identifier of the first log indicates that this log is the second type log. For example, the identifier is a value indicating 1.

The LBA of the first log indicates the LBA20, which is the logical address corresponding to the copied data.

The new PBA of the first log indicates the PBA(z), which is the physical address indicating the copy destination storage location.

A length of the first log corresponds to a size of the copied data. For example, when the size of the corresponding data is the same as the size of one sector, the length is 1.

The old PBA of the first log indicates the PBA(x+4), which is the physical address indicating the copy source storage location.

The controller 5 stores a second log in the log buffer 72 in response to the data D7 being copied from the block BLK10 to the block BLK100.

An identifier of the second log indicates that the log is a second type log. For example, the identifier is a value indicating 1.

The LBA of the second log indicates the LBA40, which is the logical address corresponding to the copied data.

The new PBA of the second log indicates the PBA(z+1), which is the physical address indicating the copy destination storage location.

A length of the second log corresponds to a size of the copied data. For example, when the size of the corresponding data is the same as the size of one sector, the length is 1.

The old PBA of the second log indicates the PBA(x+6), which is the physical address indicating the copy source storage location.

When the L2P table 71 is reconstructed, the L2P table rebuild processing unit 526 of the controller 5 acquires the PBA corresponding to the LBA provided in the second type log from the L2P table 71 in the DRAM 7 when the update log read from the L2P flash block includes the second type log.

When the old PBA provided in this second type log matches the PBA acquired from the L2P table 71, the L2P table rebuild processing unit 526 reflects the content of this second type log in the L2P table 71 in the DRAM 7 such that the new PBA provided in this second type log is associated with the LBA provided in this second type log.

The L2P table rebuild processing unit 526 does not reflect the content of the second type of log in the L2P table 71 in the DRAM 7 when the old PBA provided in the second type log does not match the PBA acquired from the L2P table 71. This is because, for example, the mapping of the logical address provided in this second type log is updated by the write operation based on the write command received from the host 2 during a copy operation corresponding to this second type log.

Figure 25:
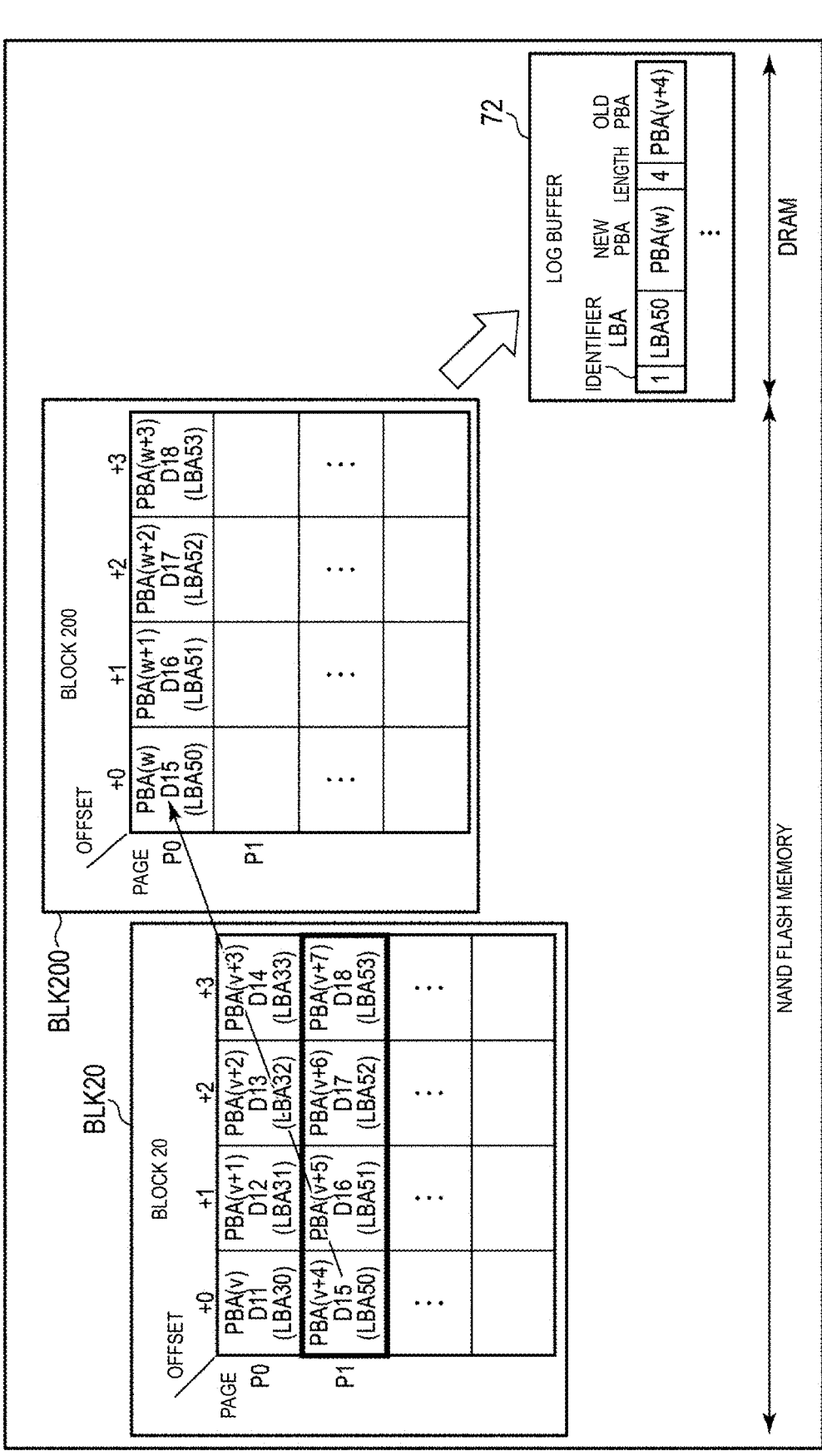
FIG. 25 is a block diagram illustrating a second configuration example showing a log recording during the garbage collection processing of the memory system according to the embodiment.

Next, a case where data sequentially written is copied will be described. FIG. 25 is a block diagram illustrating a second configuration example showing the recording of the log in the garbage collection processing of the memory system according to the embodiment.

In the garbage collection processing in FIG. 25, it is assumed that the garbage collection control unit 523 of the controller 5 selects the block BLK20 of the NAND memory 6 as the copy source block. In addition, the garbage collection control unit 523 selects the block BLK200 as the copy destination block from the free blocks.

In the page P0 of the block BLK20 selected as the copy source block, the storage locations specified by the offsets +0 to +3 are indicated by the physical addresses PBA(v) to PBA(v+3), respectively. In addition, in the page P1, the storage locations specified by the offsets +0 to +3 are indicated by the physical addresses PBA(v+4) to PBA(v+7), respectively.

The storage locations indicated by the physical addresses PBA(v) to PBA(v+3) respectively store the pieces of data D11 to D14. The data D11 to D14 corresponds to the logical addresses LBA30 to 33. In addition, the storage locations indicated by the physical addresses PBA(v+4) to PBA(v+7) respectively store the pieces of data D15 to D18. The data D15 to D18 corresponds to the logical addresses LBA50 to 53. That is, the storage locations indicated by the PBA(v) to PBA(v+3) store sequential data starting from the LBA30. In addition, the storage locations indicated by the PBA(v+4) to PBA(v+7) store sequential data starting from the LBA50.

Here, among the data stored in the block BLK20, only the data D15 to D18 are valid data. The garbage collection control unit 523 selects each of the storage locations indicated by PBA(v+4) to PBA(v+7) as the copy source storage location.

The garbage collection control unit 523 writes the data stored in the copy source storage location into the copy destination block. The data D15 to D18 stored in the storage locations indicated by PBA(v+4) to PBA(v+7) are written into the storage locations of the page P0 of the block BLK200 at the offsets +0 to +3, respectively. Thereby, the physical addresses indicating the storage locations in which the data corresponding to the LBA 50 to the LBA53 is stored are PBA(w) to PBA(w+3). Therefore, the storage locations indicated by the PBA(w) to PBA(w+3) store the sequential data starting from the LBA50.

Although not shown in FIG. 25, the mapping information of the logical address corresponding to the copied data in the L2P table 71 in the DRAM 7 is updated by copying the data. The mapping of the LBA50 to the LBA53 is updated from the PBA(v+4) to the PBA(v+7) to the PBA(w) to the PBA(w+3), respectively. Thereby, the data stored in the storage locations indicated by the PBA(v+4) to the PBA(v+7) becomes invalid data.

In response to the execution of the copy of the data, the controller 5 stores the log in the log buffer 72. At this time, since the LBAs corresponding to the copied data are continuous, one log corresponding to the entire copied data is stored in the log buffer 72.

An identifier of the log indicates that the log is the second type log. For example, the identifier is a value indicating 1.

The LBA of the log indicates LBA50, which is the logical address corresponding to the head data among the copied sequential data.

The new PBA of the log indicates the PBA(w) which is the physical address indicating the head storage location among the plurality copy destination storage locations to which the sequential data is copied.

A length of the log corresponds to a size of the copied data. For example, when the total size of the copied sequential data is the same as the size of the four sectors, the length is 4.

The old PBA of the log indicates the PBA(v+4) which is the physical address indicating the head storage location among the plurality copy source storage locations to which the sequential data is copied.

In this way, in the garbage collection, when the data corresponding to each of the contiguous LBAs is collectively copied, a log including the LBAs corresponding to the head data among the copied data, the new PBA, the old PBA, and the size of the entire copied data is stored in the log buffer 72.

When this log is read when the L2P table 71 is reconstructed, the L2P table rebuild processing unit 526 acquires the PBA corresponding to each contiguous LBA corresponding to this log from the L2P table 71. The L2P table rebuild processing unit 526 specifies an LBA that satisfies a condition in which the corresponding old PBA matches the PBA acquired from the L2P table 71, among each of the contiguous LBAs corresponding to this log. The L2P table rebuild processing unit 526 reflects the content of this log in the L2P table 71 in the DRAM 7 such that each new PBA corresponding to the specific LBA is associated with the specific LBA for only the specific LBA.

For the LBAs in which the corresponding old PBA do not match the PBAs acquired from the L2P table 71, the L2P table rebuild processing unit 526 does not reflect the content of this log in the L2P table 71 in the DRAM 7.

Figure 26:
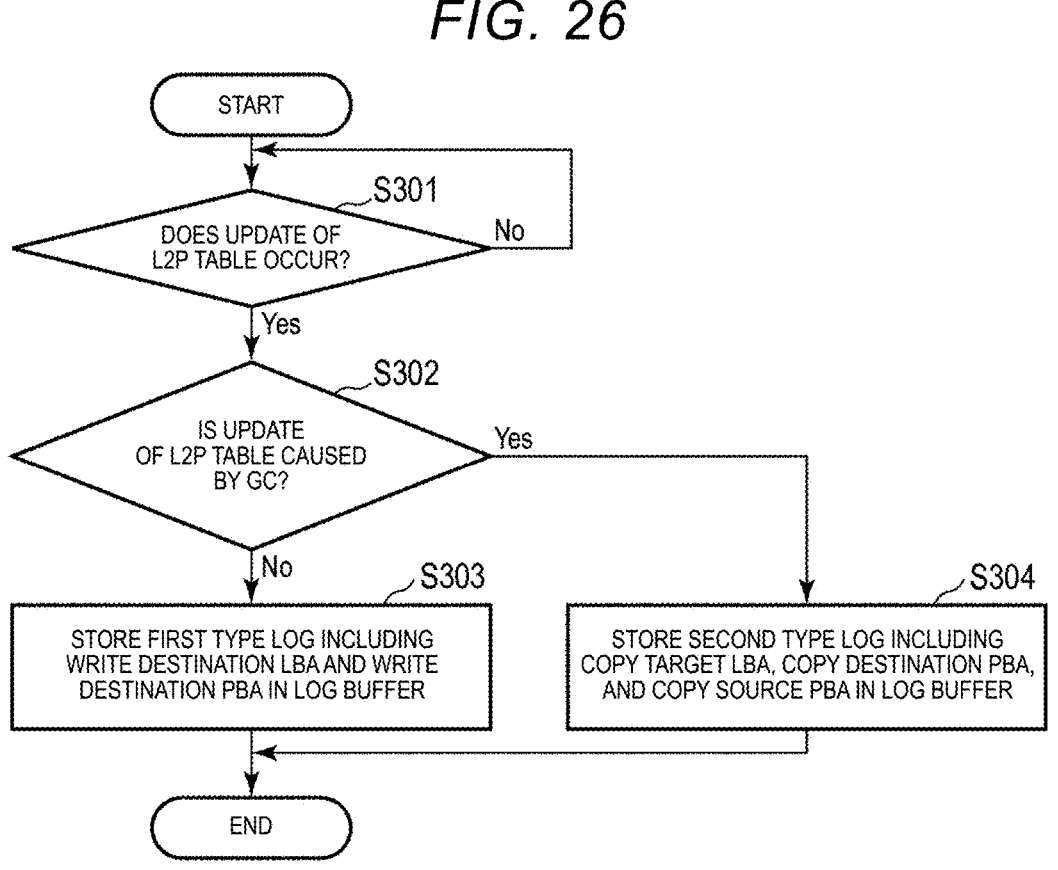
FIG. 26 is a flowchart showing log recording processing of the memory system according to the embodiment.

Next, log recording processing will be described. FIG. 26 is a flowchart showing the log recording processing of the memory system according to the embodiment.

The controller 5 determines whether the update of the L2P table 71 in the DRAM 7 has occurred (step S301).

When the update of the L2P table 71 does not occur (No in S301), the controller 5 waits.

When the update of the L2P table 71 occurs (Yes in S301), the controller 5 determines whether the update of the L2P table 71 determined in S301 is caused by the garbage collection (step S302).

When the update of the L2P table 71 determined in step S301 is caused by other than the garbage collection (No in step S302), the controller 5 stores the first type log including the write destination LBA and the write destination PBA in the log buffer 72 (step S303). The update of the L2P table 71 caused by other than the garbage collection is, for example, the update of the L2P table 71 caused by the writing of data based on the write command obtained from the host 2. In this case, the first type log includes the LBA designated by the write command as the write destination LBA, and includes the PBA indicating the storage location of the NAND memory 6 into which data associated with the write command is written as the write destination PBA. The first type log may further include an identifier indicating that the log is the first type and a length indicating a size of the data associated with the write command.

When the update of the L2P table 71 determined in step S301 is caused by the garbage collection (Yes in step S302), the controller 5 stores the second type log including a copy target LBA, a copy destination PBA, and a copy source PBA in the log buffer 72 (step S304). In this case, the second type log includes the LBA corresponding to the copied data as the copy target LBA, includes a PBA indicating the storage location into which the copied data is written as the copy destination PBA, and includes a PBA indicating a source storage location in which the copied data is stored as the copy source PBA. The second type log may further include an identifier indicating that the log is the second type and a length indicating a size of the copied data.

Next, the L2P table rebuild processing when the second type log may be used will be described. FIG. 27 is a flowchart showing another procedure of the L2P table rebuild processing of the memory system according to the embodiment.

First, the controller 5 determines whether the power to the SSD 3 is restored (step S401).

When the power to the SSD 3 is not restored (No in step S401), the controller 5 waits.

When the power to the SSD 3 is restored (Yes in step S401), the controller 5 notifies the host 2 that the SSD 3 is in the ready state (step S402).

The controller 5 determines whether data is readable from both of the two L2P flash blocks allocated to the table area of the L2P table 71 (step S403).

When data can be read from both of the two L2P flash blocks (Yes in step S403), the controller 5 reads the N/2 L2P fragments last written into the first block and the update log written together with each of the N/2 L2P fragments from the first block among both of the two L2P flash blocks (step S404).

The controller 5 reads the N/2 L2P fragments last written into the second block and the update log written together with each of the N/2 L2P fragments from the second block among both of the two L2P flash blocks (step S405). The read operation in S404 and the read operation in S405 may be executed at the same timing.

When data is not readable from any one of the two L2P flash blocks (No in step S403), the controller 5 reads the N L2P fragments and the update log written together with each of the N L2P fragments from the readable L2P flash block among the two L2P flash blocks (step S406).

The controller 5 determines whether the update log read in S204 and S205 or S206 includes the second type log (step S407).

When the second type log is provided (Yes in S407), the controller 5 determines whether the old PBA provided in the second type log matches the PBA currently mapped to the LBA provided in the second type log (step S408). The PBA currently mapped to the LBA provided in the second type log is the PBA correlated with the LBA provided in the second type log in the L2P table 71 in the DRAM 7 when it is determined whether the content of the second type log is reflected.

When the old PBA provided in the second type log does not match the PBA currently mapped to the LBA provided in the second type log (No in S408), the controller 5 does not use the second type log (step S409).

In addition, when the second type log is not provided (No in S407) or when the old PBA provided in the second type log matches the PBA currently mapped to the LBA provided in this second type log (Yes in S408), the controller 5 uses this log (step S410). That is, the controller 5 reflects the content of this log in the L2P table 71 in the DRAM 7.

The controller 5 executes processing of reconstructing the L2P table 71 in the DRAM 7 by using the read L2P fragment and the update log based on the results of the steps S407 to S410, in the steps S204 and S205 or S206 (step S411).

As described above, according to the present embodiment, the controller 5 selects one L2P fragment to be written into the first L2P flash block from among the N L2P fragments and selects the L2P fragment, which is N/2 behind or ahead of the one L2P fragment to be written into the first L2P flash block, from among the N L2P fragments as one L2P fragment to be written into the second L2P flash block such that the N L2P fragments provided in a certain table area of the L2P table 71 are stored in the L2P flash block of the NAND memory 6 in the first order. The controller 5 acquires the selected two L2P fragments from the table area of the L2P table 71 in the DRAM 7. The controller 5 acquires the update log indicating update contents for all the L2P fragments in this table area updated after acquiring the two L2P fragments from the log buffer 72. The controller 5 writes the acquired L2P fragment and the update log into the two L2P flash blocks.

In response to the power to the SSD 3 being restored after the power supply to the SSD 3 being cut off, the controller 5 reads the last N/2 L2P fragment and the update log from each of the two L2P flash blocks correlated with the table area of the L2P table 71. The controller 5 reconstructs the table area of the L2P table 71 in the DRAM 7 by using the N L2P fragments and the N/2 update logs read from the two L2P flash blocks.

Thereby, the controller 5 reduces the number of update logs to be read for reconstructing the table area of the L2P table 71 by N/2 as compared with when the update logs are read from one L2P flash block. Therefore, the controller 5 can more quickly reconstruct the L2P table 71 than when the number of L2P flash blocks assigned to a certain table area is one.

Further, when the table area of the L2P table 71 in the DRAM 7 is updated based on the garbage collection, the controller 5 stores the second type log in the log buffer 72. The second type log includes the LBA corresponding to the copied data, the new PBA indicating the copy destination storage location, and the old PBA indicating the copy source storage location.

When the L2P table 71 is reconstructed, the controller 5 determines whether the PBA correlated with the LBA provided in the second type log in the L2P table 71 is matched with the old PBA provided in the second type log, when the update log read from the L2P flash block includes the second type log. When the PBA associated with the LBA provided in the second type log in the L2P table 71 matches the old PBA provided in the second type log, the controller 5 reflects the content of the second type log in the L2P table 71. When the PBA associated with the LBA provided in the second type log in the L2P table 71 does not match the old PBA provided in the second type log, the controller 5 does not reflect the content of the second type log in the L2P table 71.

As a result, the controller 5 can prevent the mapping of the copy target LBA from being overwritten in the mapping update in the copy operation by the garbage collection processing when the write operation based on the write command received from the host 2 is executed during the copy operation in the garbage collection processing. Therefore, the controller 5 can more accurately reconstruct the L2P table 71.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system that is connectable to a host, the memory system comprising:
   a non-volatile memory including a plurality of blocks;
   a volatile memory; and
   a controller configured to manage a correspondence relationship between each of logical addresses included in a logical address space of the memory system and each of physical addresses of the non-volatile memory using a logical-to-physical address translation table stored in the volatile memory,
   wherein the logical-to-physical address translation table includes at least a first table area that stores N pieces of address translation information respectively corresponding to N logical address ranges, where N is an integer multiple of 2, and the controller is configured to:
   write the N pieces of address translation information, including first to (N)th pieces, repeatedly in a first block of the non-volatile memory according to a first order, so that the first, second, . . . , (N)th pieces are written in this order repeatedly in the first block;
   write the N pieces of address translation information repeatedly in a second block of the non-volatile memory according to a second order that is offset from the first order by N/2, so that (1+N/2)th, (2+N/2)th, . . . , (N)th, first, second, . . . , (N/2)th pieces are written in this order repeatedly in the second block, at the same time respective first, second, . . . , (N)th pieces are written in this order repeatedly into the first block;
   write an update log in the first block each time one of the N pieces is written in the first block, and in the second block each time one of the N pieces is written in the second block, wherein the update log contains all updates to the N pieces of address translation information since the last time the update log was written in the first block and the second block; and in response to power to the memory system being restored after the memory system is shutdown, read from the first block, N/2 pieces of address translation information last written into the first block and N/2 update logs last written into the first block, read from the second block, N/2 pieces of address translation information last written into the second block and N/2 update logs last written into the second block, and reconstruct the first table area of the logical-to-physical address translation table in the volatile memory from the N/2 pieces of address translation information read from the first block, the N/2 pieces of address translation information read from the second block, and the N/2 update logs read from either the first block or the second block.

2. The memory system according to claim 1,
wherein the update log includes logs that are of a first type or a second type, the first type log including a logical address corresponding to data written into the non-volatile memory in response to a write command and a physical address indicating a storage location in the non-volatile memory in which the data is written, and the second type log including a logical address corresponding to data copied during a garbage collection, a new physical address indicating a storage location in the non-volatile memory in which the copied data is written, and an old physical address indicating a storage location in the non-volatile memory from which the copied data is read.

3. The memory system according to claim 2, wherein the controller is further configured to:
when reconstructing the first table area,
    determine whether the second type log is included in the N/2 update logs, and
    acquire a physical address corresponding to a logical address included in the second type log from the first table area of the logical-to-physical address translation table in the volatile memory when the second type log is included in the N/2 update logs, to reflect content of the second type log in the first table area of the logical-to-physical address translation table in the volatile memory such that the new physical address included in the second type log is associated with the logical address included in the second type log when the old physical address included in the second type log matches the acquired physical address, and to not reflect the content of the second type log in the first table area of the logical-to-physical address translation table in the volatile memory when the old physical address included in the second type log does not match the acquired physical address.

4. The memory system according to claim 1,
wherein the controller is further configured to write, in response to an unexpected power loss, a first list indicating a list of logical addresses respectively corresponding to pieces of data lost because of the unexpected power loss among pieces of data received from the host, into the first block and the second block using power stored in a capacitor of the memory system.

5. The memory system according to claim 4,
wherein the controller is further configured to update the reconstructed first table area such that a value indicating an error is associated with each of the logical addresses respectively corresponding to the pieces of lost data, based on the first list.

6. The memory system according to claim 1,
wherein the controller is configured to read, when data is not normally readable from of the first block, N pieces of address translation information and N update logs last written into the second block, and to reconstruct the first table area of the logical-to-physical address translation table in the volatile memory based on the N pieces of address translation information and the N update logs read from the second block, and
the controller is configured to read, when data is not normally readable from the second block, N pieces of address translation information and N update logs last written into the first block, and to reconstruct the first table area of the logical-to-physical address translation table in the volatile memory based on the N pieces of address translation information and the N update logs read from the first block.

7. The memory system according to claim 1,
wherein the controller is configured to:
when reconstructing the first table area,
    store the N/2 pieces of address translation information read from the first block into the volatile memory,
    store the N/2 pieces of address translation information read from the second block into the volatile memory,
    select update logs from the N/2 update logs read from either the first block or the second block in an order from oldest to newest, and
    for each selected update log, select a group of pieces of address translation information written in the non-volatile memory before a time point when the selected update log was written into the first block and the second block, from the N pieces of address translation information including the N/2 pieces of address translation information read from the first block and the N/2 pieces of address translation information read from the second block, and reflect content of the selected update log in the selected group of pieces of address translation information.

8. The memory system according to claim 1,
wherein the first table area covers an entire logical address range included in the logical address space.

9. The memory system according to claim 1,
wherein the logical-to-physical address translation table includes at least the first table area and a second table area,
the first table area covers a first logical address range of the logical address space and the second table area covers a second logical address range of the logical address space that follows the first logical address range,
the N pieces of address translation information of the first table area respectively correspond to N logical address ranges belonging to the first logical address range, and
the second table area stores N pieces of address translation information respectively corresponding to N logical address ranges belonging to the second logical address range.

10. The memory system according to claim 9,
wherein the controller is further configured to allocate the first block and the second block to the first table area and to allocate a third block of the non-volatile memory and a fourth block of the non-volatile memory to the second table area.

11. The memory system according to claim 10, wherein the controller is configured to:

write the N pieces of address translation information of the second table area repeatedly in the third block of the non-volatile memory according to the first order;

write the N pieces of address translation information of the second table area repeatedly in the fourth block of the non-volatile memory according to the second order at the same time respective N pieces of address translation information of the second table area that are offset by N/2, are written repeatedly into the third block;

write an update log for the second table area in the third block each time one of the N pieces of address translation information of the second table area is written in the third block, and in the fourth block each time one of the N pieces of address translation information of the second table area is written in the fourth block, wherein the update log for the second table area contains all updates to the N pieces of address translation information of the second table area since the last time the update log for the second table area was written in the third block and the fourth block; and in response to power to the memory system being restored after the memory system is shutdown, read from the third block, N/2 pieces of address translation information of the second table area last written into the third block and N/2 update logs for the second table area last written into the third block, read from the fourth block, N/2 pieces of address translation information of the second table area last written into the fourth block and N/2 update logs for the second table area last written into the fourth block, and reconstruct the second table area of the logical-to-physical address translation table in the volatile memory from the N/2 pieces of address translation information of the second table area read from the third block, the N/2 pieces of address translation information of the second table area read from the fourth block, and the N/2 update logs for the second table area read from either the third block or the fourth block.

12. A memory system that is connectable to a host, the memory system comprising:

a non-volatile memory including a plurality of blocks;

a volatile memory; and a controller configured to manage a correspondence relationship between each of logical addresses included in a logical address space of the memory system and each of physical addresses of the non-volatile memory using a logical-to-physical address translation table stored in the volatile memory, wherein the logical-to-physical address translation table includes at least a first table area that stores N pieces of address translation information respectively corresponding to N logical address ranges, where N is an integer equal to or greater than 2, and the controller is configured to:

write the N pieces of address translation information, including first to (N)th pieces, repeatedly in a first block of the non-volatile memory according to a first order, so that the first, second, . . . , (N)th pieces are written in this order repeatedly in the first block;

write an update log in the first block each time one of the N pieces is written in the first block, wherein the update log contains all updates to the N pieces of address translation information since the last time the update log was written in the first block, wherein the update log includes logs that are of a first type or a second type, the first type log including a logical address corresponding to data written into the non-volatile memory in response to a write command and a physical address indicating a storage location in the non-volatile memory in which the data is written, and the second type log including a logical address corresponding to data copied during a garbage collection, a new physical address indicating a storage location in the non-volatile memory in which the copied data is written, and an old physical address indicating a storage location in the non-volatile memory from which the copied data is read;

in response to power to the memory system being restored after the memory system is shutdown, read from the first block, N pieces of address translation information last written into the first block and N update logs last written into the first block, and reconstruct the first table area of the logical-to-physical address translation table in the volatile memory from the N pieces of address translation information read from the first block and the N update logs read from the first block; and when reconstructing the first table area, determine whether the second type log is included in the N update logs, and acquire a physical address corresponding to a logical address included in the second type log from the first table area of the logical-to-physical address translation table in the volatile memory when the second type log is included in the N update logs, to reflect content of the second type log in the first table area of the logical-to-physical address translation table in the volatile memory such that the new physical address included in the second type log is associated with the logical address included in the second type log when the old physical address included in the second type log matches the acquired physical address, and to not reflect the content of the second type log in the first table area of the logical-to-physical address translation table in the volatile memory when the old physical address included in the second type log does not match the acquired physical address.

13. The memory system according to claim 12, wherein N is an integer multiple of 2, and the controller is further configured to:

write the N pieces of address translation information repeatedly in a second block of the non-volatile memory according to a second order that is offset from the first order by N/2, so that (1+N/2)th, (2+N/2)th, . . . , (N)th, first, second, . . . , (N/2)th pieces are written in this order repeatedly in the second block, at the same time respective first, second, . . . , (N)th pieces are written in this order repeatedly into the first block; and write the update log in the second block each time one of the N pieces is written in the second block.

14. The memory system according to claim 12, wherein the controller is further configured to write, in response to an unexpected power loss, a first list indicating a list of logical addresses respectively corresponding to pieces of data lost because of the unexpected power loss among pieces of data received from the host, into the first block using power stored in a capacitor of the memory system.

15. The memory system according to claim 14, wherein the controller is further configured to update the reconstructed first table area such that a value indicating an error is associated with each of the logical addresses respectively corresponding to the pieces of lost data, based on the first list.

16. The memory system according to claim 12, wherein the controller is configured to:

when reconstructing the first table area, store the N pieces of address translation information read from the first block into the volatile memory, select update logs from the N update logs read from the first block in an order from oldest to newest, for each selected update log, select a group of pieces of address translation information written in the non-volatile memory before a time point when the selected update log was written into the first block, from the N pieces of address translation information read from the first block, and reflect content of the selected update log in the selected group of pieces of address translation information.

17. The memory system according to claim 12, wherein the first table area covers an entire logical address range included in the logical address space.

18. The memory system according to claim 12, wherein the logical-to-physical address translation table includes at least the first table area and a second table area, the first table area covers a first logical address range of the logical address space and the second table area covers a second logical address range of the logical address space that follows the first logical address range, the N pieces of address translation information of the first table area respectively correspond to N logical address ranges belonging to the first logical address range, and the second table area stores N pieces of address translation information respectively corresponding to N logical address ranges belonging to the second logical address range.

19. The memory system according to claim 18, wherein the controller is configured to allocate the first block to the first table area and to allocate a second block of the non-volatile memory to the second table area.

20. The memory system according to claim 19, wherein the controller is configured to:

write the N pieces of address translation information of the second table area repeatedly in the second block according to the first order;

write an update log for the second table area in the second block each time one of the N pieces of address translation information of the second table area is written in the second block, wherein the update log for the second table area contains all updates to the N pieces of address translation information of the second table area since the last time the update log for the second table area was written in the second block; and in response to power to the memory system being restored after the memory system is shutdown, read from the second block, N pieces of address translation information of the second table area last written into the second block and N update logs for the second table area last written into the second block, and reconstruct the second table area of the logical-to-physical address translation table in the volatile memory from the N pieces of address translation information of the second table area read from the second block and the N update logs for the second table area read from the second block.

\* \* \* \* \*